(12) United States Patent
Tominaga

(10) Patent No.: US 7,779,115 B2
(45) Date of Patent: Aug. 17, 2010

(54) METHOD AND APPARATUS FOR PROCESSING CLIENT CAPABILITY INFORMATION OVER A NETWORK

(75) Inventor: Hiroyuki Tominaga, Kanagawa (JP)

(73) Assignee: Sony Corporation, Tokyo (JP)

(*) Notice: Subject to any disclaimer, the term of this patent is extended or adjusted under 35 U.S.C. 154(b) by 1158 days.

(21) Appl. No.: 10/652,426

(22) Filed: Sep. 2, 2003

(65) Prior Publication Data

US 2004/0117458 A1 Jun. 17, 2004

(30) Foreign Application Priority Data

Sep. 6, 2002 (JP) ............................. 2002-261428

(51) Int. Cl.
*G06F 15/173* (2006.01)
*G06F 15/16* (2006.01)
(52) U.S. Cl. ...................................... 709/224; 709/232
(58) Field of Classification Search ......... 709/204–207, 709/217–219, 224
See application file for complete search history.

(56) References Cited

U.S. PATENT DOCUMENTS

| | | | |
|---|---|---|---|
| 6,134,598 A * | 10/2000 | Raman | 709/246 |
| 6,535,505 B1 * | 3/2003 | Hwang et al. | 370/352 |
| 6,658,199 B1 * | 12/2003 | Hallberg | 386/68 |
| 7,035,923 B1 * | 4/2006 | Yoakum et al. | 709/224 |
| 7,080,078 B1 * | 7/2006 | Slaughter et al. | 707/10 |
| 7,139,797 B1 * | 11/2006 | Yoakum et al. | 709/204 |
| 7,257,641 B1 * | 8/2007 | VanBuskirk et al. | 709/223 |
| 7,284,046 B1 * | 10/2007 | Kreiner et al. | 709/223 |
| 2001/0010685 A1 * | 8/2001 | Aho | 370/329 |
| 2002/0023131 A1 * | 2/2002 | Wu et al. | 709/205 |
| 2002/0118809 A1 * | 8/2002 | Eisenberg | 379/202.01 |
| 2003/0028597 A1 * | 2/2003 | Salmi et al. | 709/204 |
| 2003/0037103 A1 * | 2/2003 | Salmi et al. | 709/203 |

(Continued)

FOREIGN PATENT DOCUMENTS

JP 10-28124 A 1/1998

(Continued)

OTHER PUBLICATIONS

Day et al. "A Model for Presnce and Instant Messaging" RFC 2778, Feb. 2000.*

(Continued)

*Primary Examiner*—Benjamin R Bruckart
(74) *Attorney, Agent, or Firm*—Oblon, Spivak, McClelland, Maier & Neustadt, L.L.P.

(57) ABSTRACT

In an instant message communication system, if a provider logs in to an instant message communication service, the provider supplies, via a server, main presence information to a consumer specified as a friend of the provider, wherein the main presence information is a basic part of presence information. The provider then acquires main presence information of the consumer. At the provider, consumers are registered in relation to respective capabilities of the provider. The provider supplies provider sub-presence information to each consumer to inform of the details of the capability related to the consumer. Furthermore, the provider acquires consumer sub-presence information indicating the details of a capability that the consumer has, and the provider manages the acquired information. Thus, information associated with the status of capabilities available in communication can be provided without imposing a high load on the transmission process.

43 Claims, 61 Drawing Sheets

U.S. PATENT DOCUMENTS

| | | | |
|---|---|---|---|
| 2003/0073440 A1* | 4/2003 | Mukherjee et al. | 455/435 |
| 2003/0078979 A1* | 4/2003 | Sagi | 709/206 |
| 2003/0108000 A1* | 6/2003 | Chaney et al. | 370/260 |
| 2003/0108002 A1* | 6/2003 | Chaney et al. | 370/261 |
| 2003/0208543 A1* | 11/2003 | Enete et al. | 709/206 |
| 2004/0003090 A1* | 1/2004 | Deeds | 709/227 |
| 2004/0015553 A1* | 1/2004 | Griffin et al. | 709/206 |
| 2004/0138834 A1* | 7/2004 | Blackett et al. | 702/62 |
| 2005/0162685 A1* | 7/2005 | Heiles et al. | 358/1.15 |

FOREIGN PATENT DOCUMENTS

| | | |
|---|---|---|
| JP | 11-154950 A | 6/1999 |
| JP | 2000-47957 A | 2/2000 |
| JP | 2001-14247 A | 1/2001 |
| JP | 2002-215483 A | 8/2002 |

OTHER PUBLICATIONS

Peterson, "Common Profile for Instant Messaging", RFC 3860, Aug. 2004.*

* cited by examiner

FIG. 2

```
<presence>
    <status>on line</status>
</presence>
```

FIG. 12

```
<presence>
<status>on line</status>
<service>
    <announce provider_ep="1" profile="MPEG4 Streaming">
        <show>available</show>
    </announce>
    <announce provider_ep="2" profile="MPEG2 Streaming">
        <show>available</show>
    </announce>
</service>
</presence>
```

FIG. 14

```
<presence>
    <status>online</status>
    <service>
        <announce provider_ep="1" profile="MPEG4 Streaming">
            <show>unavailable</show>
        </announce>
        <announce provider_ep="2" profile="MPEG2 Streaming">
            <show>available</show>
        </announce>
    </service>
</presence>
```

FIG. 15

```
<presence>
<status>on line</status>
<service>
    <announce provider_ep="1" profile="MPEG4 Streaming">
        <show>unavailable</show>
    </announce>
</service>
</presence>
```

FIG. 17

```
<presence>
    <status>on line</status>
    <service>
        <announce provider_ep="1" profile="MPEG4 Streaming">
            <show>available</show>
        </announce>
        <announce provider_ep="2" profile="MPEG2 Streaming">
            <show>unavailable</show>
        </announce>
    </service>
</presence>
```

FIG. 27

```
<presence>
  <status>on line</status>
  <service>
    <announce provider_ep="1" profile="MPEG4 Streaming"/>
    <announce provider_ep="2" profile="MPEG2 Streaming"/>
  </service>
</presence>
```

FIG. 30

```
<iq type="set" to="A@imsg">
    <query xmins="x:service:register">
        <method>registration</method>
        <register provider_ep="1" consumer_ep="1"/>
    </query>
</iq>
```

FIG. 31

```
<iq type="set" to="A@imsg">
    <query xmins="x:service:register">
        <method>registration</method>
        <register provider_ep="2" consumer_ep="2"/>
    </query>
</iq>
```

FIG. 32

```
<iq type="set" to="A@imsg">
    <query xmins="x:service:register">
        <method>registration</method>
        <register provider_ep="1" consumer_ep="1"/>
    </query>
</iq>
```

FIG. 33A
```
<iq type="result" to="B@imsg">
    <result>ok</result>
</iq>
```

FIG. 33B
```
<iq type="result" to="B@imsg">
    <result>ok</result>
</iq>
```

FIG. 33C
```
<iq type="result" to="C@imsg">
    <result>ok</result>
</iq>
```

FIG. 33D
```
<iq type="result" to="C@imsg">
    <result>reject</result>
</iq>
```

FIG. 35A

```
<iq type="set" to="A@imsg">
  <query xmlns="x:service.register">
    <method>unregistration</method>
    <register provider_ep="1" consumer_ep="1"/>
  </query>
</iq>
```

FIG. 35B

```
<iq type="result" to="C@imsg">
  <result>ok</result>
</iq>
```

FIG. 35C

```
<presence type="unavailable" from="A@imsg">
```

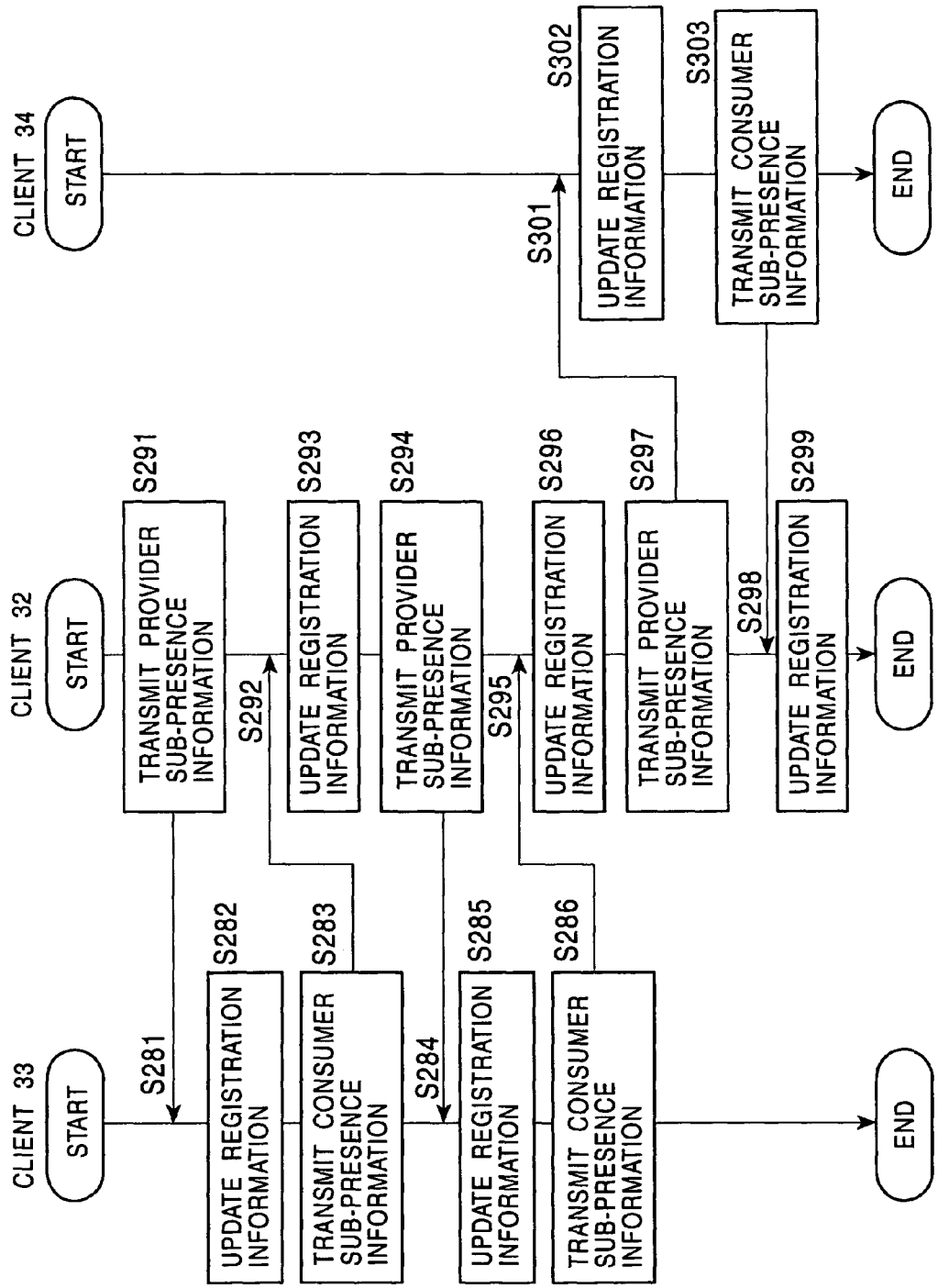

FIG. 38

```
<presence to="B@imsg" presence_type="provider">
    <show>available</show>
    <service>
        <announce provider_ep="1"/>
    </service>
</presence>
```

FIG. 39

```
<presence to="B@imsg" presence_type="provider">
    <show>available</show>
    <service>
        <announce provider_ep="2"/>
    </service>
</presence>
```

FIG. 40

```
<presence to="C@imsg" presence_type="provider">
    <show>available</show>
    <service>
        <announce provider_ep="1"/>
    </service>
</presence>
```

FIG. 43

```
<presence to="B@imsg" presence_type="provider">
    <show>unavailable</show>
    <service>
        <announce provider_ep="1"/>
    </service>
</presence>
```

FIG. 44

```
<presence to="C@imsg" presence_type="provider">
    <show>unavailable</show>
    <service>
        <announce provider_ep="1"/>
    </service>
</presence>
```

FIG. 47

```
<presence to="B@imsg" presence_type="provider">
    <show>unavailable</show>
    <service>
        <announce provider_ep="2"/>
    </service>
</presence>
```

FIG. 48

```
<presence to="A@imsg" presence_type="consumer">
    <show>unavailable</show>
    <service>
        <announce consumer_ep="2"/>
    </service>
</presence>
```

FIG. 50

```
<presence>
     <status> on line </status>
</presence>
```

FIG. 51

```
<presence>
    <status>on line </status>
    <service>
        <announce provider_ep="1" profile="MPEG4 Streaming"/>
        <announce provider_ep="2" profile="MPEG2 Streaming"/>
    </service>
</presence>
```

FIG. 52

```
<presence>
    <status>on line</status>
    <service>
        <announce provider_ep="1" profile="MPEG4 Streaming"/>
    </service>
</presence>
```

FIG. 54

```
<iq type="set" to="B@imsg">
    <query xmins="x:service:register">
        <method>registration</method>
        <register provider_ep="1" consumer_ep="1"/>
    </query>
</iq>
```

FIG. 55

```
<iq type="set" to="B@imsg">
    <query xmins="x:service:register">
        <method>registration</method>
        <register provider_ep="2" consumer_ep="2"/>
    </query>
</iq>
```

FIG. 56

```
<iq type="set" to="C@imsg">
    <query xmlns="x:service:register">
        <method>registration</method>
        <register provider_ep="1" consumer_ep="1"/>
    </query>
</iq>
```

FIG. 64

```
531 ─  MAIN PRESENCE INFORMATION
       A@imsg   : AWAY FROM DESK
       B@imsg   : AWAY FOR MEAL
       C@imsg   : ON THE JOB
                                                        ─ 530
532 ─  SUB-PRESENCE INFORMATION
       A@imsg provider_ep=1 : available
               send to B@imsg, C@imsg
       A@imsg provider_ep=2 : available
               send to B@imsg B@imsg consumer_ep=1 : available
               send to A@imsg
       B@imsg consumer_ep=2 : available
               send to A@imsg C@imsg consumer_ep=1 : available
               send to A@imsg 533 ─  A@imsg  FRIEND LIST
       B@imsg
       C@imsg 534 ─  B@imsg  FRIEND LIST
       A@imsg 535 ─  C@imsg  FRIEND LIST
       A@imsg
```

FIG. 65

A@imsg provider_ep=1 :
    send to B@imsg
A@imsg provider_ep=2 :
    send to B@imsg B@imsg consumer_ep=1 :
    send to A@imsg
B@imsg consumer_ep=2 :
    send to A@imsg

FIG. 66

A@imsg provider_ep=1 : available
A@imsg provider_ep=2 : available

B@imsg consumer_ep=1 : available
B@imsg consumer_ep=2 : available

METHOD AND APPARATUS FOR PROCESSING CLIENT CAPABILITY INFORMATION OVER A NETWORK

BACKGROUND OF THE INVENTION

1. Field of the Invention

The present invention relates to a method, an apparatus and a program for processing information, and more particularly, to a method, an apparatus and program for processing information, which allow a reduction in load imposed on a process of transmitting and receiving information associated with statuses of available capabilities among communication devices.

2. Description of the Related Art

In recent years, the Internet has become very popular, and many people transmit and receive various data to or from other people via the Internet. An example of a system for transmitting data among users via the Internet is an instant message communication system which allows text data to be transmitted on real time among users.

The instant message communication system is generally constructed using an IMPP (Instant Message and Presence Protocol) such that presence information can be transmitted and received among communication terminals.

In general, the presence information is managed by a server which provides the instant message communication service, and the presence information is not varied depending on a user. That is, when presence information is transmitted, the same presence information is transmitted to all apparatuses registered as friends (to have communication with).

FIG. 1 shows an example of a conventional instant message communication system using the IMPP.

In FIG. 1, a server 1 is connected to a network 5, typified by the Internet, whereby the server 1 provides instant message service to clients 2 to 4 connected to the network 5.

The server 1 has a list 11 in which information associated with the clients of the instant message service is described. More specifically, A@imsg, B@imsg, and C@imsg are assigned as IDs (IDentifications) to the respective clients 2 to 4, and the statuses of the clients are managed using those IDs.

As shown in FIG. 1, the list 11 includes a presence information list 11-1 and friend lists 11-2, 11-3, and 11-4, wherein information indicating the status of the respective clients 2 to 4 (or users thereof) is described in the presence information list 11-1, and clients specified as friends by the respective clients are described in the friend lists 11-2, 11-3, and 11-4.

In the example shown in FIG. 1, B@imsg (client 3) and C@imsg (client 4) are specified as friends (to communicate with) by A@imsg (client 2), and A@imsg is specified as a friend by both B@imsg and C@imsg. The presence information indicates that A@imsg is on line, B@imsg is away for meal, and C@imsg is on the job.

Presence information is supplied to the server 1 from each client when the client logs in to the server 1. In response to receiving the presence information, the server 1 incorporates the received presence information into the presence information list 11-1 in the list 11, and the server 1 retains and manages the presence information.

Transmission of presence information is performed in a TCP/IP session established between the server 1 and a particular one of the clients 2 to 4.

For example, when only B@imsg is connected with the server 1, if A@imsg logs in to the server 1, presence information is transmitted from A@imsg (client 2) to the server 1, and the server 1 records the received presence information in the presence information list 11-1. The server 1 then transmits the resultant presence information to B@imsg (client 3) which is registered as a friend of A@imsg and which is already connected with the server 1.

Figure 2:
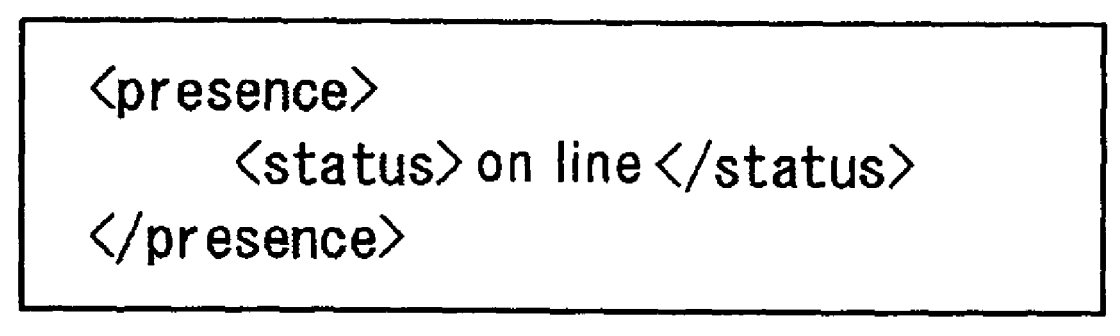

FIG. 2 shows an example of presence information supplied from A@imsg to the server 1. In FIG. 2, the presence information is described between a tag <presence> and a tag </presence>, and information "on line" is described between a tag <status> and a tag </status> in the presence information list 11-1.

The server 1 transmits B@imsg's presence information indicating that B@imsg is "away for meal" described in the presence information list 11-1 to A@imsg.

In this state, if C@imsg further logs in to the server 1, the server 1 receives presence information (indicating that the user of C@imsg is "on the job") from C@imsg and the server 1 records the received presence information in the presence information list 11-1. In accordance with the friend list 11-4, the server 1 supplies the presence information associated with C@imsg to A@imsg, and, furthermore, the server 1 supplies the presence information associated with A@imsg (indicating that A@imsg is "on line") recorded in the presence information list 11-1 to C@imsg.

FIG. 3 shows a manner in which the presence information is updated in the instant message communication system shown in FIG. 1.

As shown in FIG. 3, if A@imsg (client 2) transmits new presence information 21-1 to the server 1 via the network 5 to inform that the user of A@imsg is "away from desk", the server 1 updates the presence information list 11-1 in the list 11 such that the received presence information 21-1 is reflected.

Thereafter, in accordance with the friend list 11-2 indicating the friends of A@imsg, the server 1 transmits presence information 21-2 and presence information 21-3 to B@imsg and C@imsg, respectively, to inform that A@imsg is "away from desk".

The concepts of such an instant message communication system are disclosed in IMPP (for example, refer to "Common Presence and Instant Messaging (CPIM) Presence Information Data Format", H. Sugano et al., IETF Internet-Draft <draft-ietf-impp-cpim-pidf-05.txt>, May, 2002 (available, as of Aug. 27, 2002, at http://www.ietf.org/internet-drafts/draft-ietf-impp-cpim-pidf-05.txt)).

The instant message communication system allows not only text information but also other information such as that indicating the status of service provided by each client to be transmitted among clients.

However, in the conventional instant message communication system described above, information indicating the status of service provided by each client is supplied on a client-by-client basis, and information is not provided on a service-by-service basis. Therefore, when information associated with service provided by clients is supplied using the instant message communication system, unnecessary information is also supplied, which causes a large load to be imposed on the process of transmitting information.

SUMMARY OF THE INVENTION

In view of the above, it is an object of the present invention to provide a technique of reducing the load needed in transmitting information indicating the statuses of capabilities available in communication among clients.

The present invention provides a first program for causing a computer to execute a process, the computer being responsible for controlling an information processing apparatus which communicates via a network with a plurality of other information processing apparatuses registered in advance as information processing apparatuses to communicate with, the process comprising the steps of outputting first information associated with the present information processing apparatus, for use by the other information processing apparatuses, in response to a request from a particular one of the other information processing apparatuses, registering the particular one of the other information processing apparatuses and a capability that the particular one of the other information processing apparatuses has, in relation to a capability that the present information processing apparatus has, thereby producing registration information, and in accordance with the registration information, outputting second information associated with the details of the capability that the present information processing apparatus has, for use by the particular one of the other information processing apparatuses registered in the registration step.

The first program may further comprise the step of managing third information output from the particular one of the other information processing apparatuses in relation to corresponding registration information, the third information being associated with the details of the capability of the particular one of the other information processing apparatuses registered in the registration step.

In the step of outputting the first information, the first information may be output to an information managing apparatus which manages the information associated with the other information processing apparatuses and the information associated with the present information processing apparatus.

The first information may include information indicating, in the form of a list, the status of the present information processing apparatus and capabilities that the present information processing apparatus has, the second information may include information indicating the status of each capability of the present information processing apparatus, and outputting of the first information and outputting of the second information may be performed using an instant message presence capability.

The present invention also provides a first information processing method comprising outputting first information associated with the present information processing apparatus, for use by the other information processing apparatuses, in response to a request from a particular one of the other information processing apparatuses, registering the particular one of the other information processing apparatuses and a capability that the particular one of the other information processing apparatuses has, in relation to a capability that the present information processing apparatus has, thereby producing registration information, and in accordance with the registration information, outputting second information associated with the details of the capability that the present information processing apparatus has, for use by the particular one of the other information processing apparatuses registered in the registration step.

The first information processing method may further comprise the step of managing third information output from the particular one of the other information processing apparatuses in relation to corresponding registration information, the third information being associated with the details of the capability of the particular one of the other information processing apparatuses registered in the registration step.

In this first information processing method, in the step of outputting the first information, the first information may be output to an information managing apparatus which manages the information associated with the other information processing apparatuses and the information associated with the present information processing apparatus, and in the step of outputting the second information, the second information may be output to the information managing apparatus.

In this first information processing method, the first information may include information indicating, in the form of a list, the status of the present information processing apparatus and capabilities that the present information processing apparatus has, the second information may include information indicating the status of each capability of the present information processing apparatus, and outputting of the first information and outputting of the second information may be performed using an instant message presence capability.

The present invention also provides a first information processing apparatus comprising first output means for outputting first information associated with the present information processing apparatus, for use by the other information processing apparatuses, registration means for, in response to a request from a particular one of the other information processing apparatuses, registering the particular one of the other information processing apparatuses and a capability that the particular one of the other information processing apparatuses has, in relation to a capability that the present information processing apparatus has, thereby producing registration information, and second output means for, in accordance with the registration information, outputting second information associated with the details of the capability of the present information processing apparatus, the second information being for use by the particular one of the other information processing apparatuses registered by the registration means.

The first information processing apparatus may further comprise management means for managing third information output from the particular one of the other information processing apparatuses in relation to corresponding registration information, the third information being associated with the details of the capability of the particular one of the other information apparatuses registered by the registration means.

In this first information processing apparatus, the first output means may output the first information to an information managing apparatus which manages the information associated with the other information processing apparatuses and the information associated with the present information processing apparatus, and the second output means may output the second information to the information managing apparatus.

In this first information processing apparatus, the first information may include information indicating, in the form of a list, the status of the present information processing apparatus and capabilities that the present information processing apparatus has, the second information may include information indicating the status of each capability of the present information processing apparatus, and outputting of the first information and outputting of the second information may be performed using an instant message presence capability.

The present invention also provides a second program for causing a computer to execute a process, the computer being responsible for controlling an information processing apparatus which communicates via a network with a plurality of other information processing apparatuses registered in advance as information processing apparatuses to communicate with, the process comprising the steps of outputting first information associated with the present information processing apparatus, for use by the other information processing apparatuses, requesting, via the network, one or more of the other information processing apparatuses having an available capability to register the present information processing apparatus and a capability that the present information processing apparatus has, in relation to the capability of the one or more of the other information processing apparatuses, and outputting second information associated with the details of the capability of the present information processing apparatus, for use by the one or more of the other information processing apparatuses to which the registration request is issued in the registration request step.

The second program may further comprise the step of managing third information in relation to a corresponding capability that the present information processing apparatus has, the third information being associated with the details of the capability of the one or more of the other information processing apparatuses to which the registration request is issued in the registration request step, the third information being output from the one or more of other information processing apparatuses to which the registration request is issued in the registration request step.

In this second program, in the step of outputting the first information, the first information may be output to an information managing apparatus which manages the information associated with the other information processing apparatuses and the information associated with the present information processing apparatus, and in the step of outputting the second information, the second information may be output to the information managing apparatus.

In this second program, the first information may include information indicating the status of the present information processing apparatus, the second information may include information indicating the status of each capability of the present information processing apparatus, and outputting of the first information and outputting of the second information may be performed using an instant message presence capability.

The present invention also provides a second information processing method comprising the steps of outputting first information associated with the present information processing apparatus, for use by the other information processing apparatuses, requesting, via the network, one or more of the other information processing apparatuses having an available capability to register the present information processing apparatus and a capability that the present information processing apparatus has, in relation to the capability of the one or more of the other information processing apparatuses, and outputting second information associated with the details of the capability of the present information processing apparatus, for use by the one or more of the other information processing apparatuses to which the registration request is issued in the registration request step.

The second information processing method may further comprise the step of managing third information in relation to a corresponding capability that the present information processing apparatus has, the third information being associated with the details of the capability of the particular one of the other information processing apparatuses to which the registration request is issued in the registration request step, the third information being output from the particular one of other information processing apparatuses to which the registration request is issued in the registration request step.

In this second information processing method, in the step of outputting the first information, the first information may be output to an information managing apparatus which manages the information associated with the other information processing apparatuses and the information associated with the present information processing apparatus, and in the step of outputting the second information, the second information may be output to the information managing apparatus.

In this second information processing method, the first information may include information indicating the status of the present information processing apparatus, the second information may include information indicating the status of each capability of the present information processing apparatus, and outputting of the first information and outputting of the second information may be performed using an instant message presence capability.

The present invention also provides a second information processing apparatus comprising first output means for outputting first information associated with the present information processing apparatus, for use by the other information processing apparatuses, registration request means for requesting, via the network, one or more of the other information processing apparatuses having an available capability to register the present information processing apparatus and a capability that the present information processing apparatus has, in relation to the capability of the one or more of the other information processing apparatuses, and second output means for outputting second information associated with the details of the capability of the present information processing apparatus, for use by the one or more of the other information processing apparatuses to which the registration request is issued by the registration request means.

The second information processing apparatus may further comprise management means for managing third information in relation to a corresponding capability that the present information processing apparatus has, the third information being associated with the details of the capability of the one or more of the other information processing apparatuses to which the registration request is issued by the registration request means, the third information being output from the one or more of other information processing apparatuses to which the registration request is issued.

In this second information processing apparatus, the first output means may output the first information to an information managing apparatus which manages the information associated with the other information processing apparatuses and the information associated with the present information processing apparatus, and the second output means may output the second information to the information managing apparatus.

In this second information processing apparatus, the first information may include information indicating the status of the present information processing apparatus, the second information may include information indicating the status of each capability of the present information processing apparatus, and outputting of the first information and outputting of the second information may be performed using an instant message presence capability.

The present invention also provides a third program for causing a computer to execute a process, the computer being responsible for controlling an information processing apparatus which communicates via a network with a plurality of other information processing apparatuses registered in advance as information processing apparatuses to communicate with, the process comprising the steps of outputting first information associated with the present information processing apparatus, for use by the other information processing apparatuses, in response to a request from a particular one of the other information processing apparatuses, registering the particular one of the other information processing apparatuses and a capability that the particular one of the other information processing apparatuses has, in relation to a capability that the present information processing apparatus has, thereby producing registration information, in accordance with the registration information, outputting second information associated with the details of the capability that the present information processing apparatus has, for use by the particular one of the other information processing apparatuses registered in the registration step, requesting, via the network, one or more of the other information processing apparatuses having an available capability to register the present information processing apparatus and a capability that the present information processing apparatus has, in relation to the capability of the one or more of the other information processing apparatuses, and outputting third information associated with the details of the capability that the present information processing apparatus has, the third information corresponding to the registration request issued in the registration request step and the third information being for use by the one or more of the other information processing apparatuses to which the registration request is issued in the registration request step.

The third program may further comprise the steps of a first management step of managing fourth information output from the particular one of the other information processing apparatuses in relation to corresponding registration information, the fourth information being associated with the details of the capability of the particular one of the other information processing apparatuses registered in the registration step, and a second management step of managing fifth information in relation to the capability that the present information processing apparatus has, the fifth information being associated with the details of the capability of one or more of the other information processing apparatuses to which the registration request is issued in the registration request step, the fifth information being output from the one or more of other information processing apparatuses to which the registration request is issued in the registration request step.

In this third program, in the step of outputting the first information, the first information may be output to an information managing apparatus which manages the information associated with the other information processing apparatuses and the information associated with the present information processing apparatus, in the step of outputting the second information, the second information may be output to the information managing apparatus, and in the step of outputting the third information, the third information may be output to the information managing apparatus.

In this third program, the first information may include information indicating, in the form of a list, the status of the present information processing apparatus and capabilities that the present information processing apparatus has, the second information may include information indicating the status of each capability of the present information processing apparatus, the third information may include status information indicating the status of a capability which is one of capabilities that the present information processing apparatus has and which is different from the capability whose status information is included in the second information, and outputting of the first, second, and third information may be performed using an instant message presence capability.

The present invention also provides a third information processing method comprising the steps of outputting first information associated with the present information processing apparatus, for use by the other information processing apparatuses, in response to a request from a particular one of the other information processing apparatuses, registering the particular one of the other information processing apparatuses and a capability that the particular one of the other information processing apparatuses has, in relation to a capability that the present information processing apparatus has, thereby producing registration information, in accordance with the registration information, outputting second information associated with the details of the capability of the present information processing apparatus to the particular one of the other information processing apparatuses registered in the registration step, requesting, via the network, one or more of the other information processing apparatuses having an available capability to register the present information processing apparatus and a capability that the present information processing apparatus has, in relation to the capability of the one or more of the other information processing apparatuses, and outputting third information associated with the details of the capability that the present information processing apparatus has, the third information corresponding to the registration request issued in the registration request step and the third information being for use by the one or more of the other information processing apparatuses to which the registration request is issued in the registration request step.

The third information processing method may further comprise the steps of a first management step of managing fourth information output from the particular one of the other information processing apparatuses in relation to corresponding registration information, the fourth information being associated with the details of the capability of the particular one of the other information processing apparatuses registered in the registration step, and a second management step of managing fifth information in relation to the capability that the present information processing apparatus has, the fifth information being associated with the details of the capability of one or more of the other information processing apparatuses to which the registration request is issued in the registration request step, the fifth information being output from the one or more of other information processing apparatuses to which the registration request is issued in the registration request step.

In this third information processing method, in the step of outputting the first information, the first information may be output to an information managing apparatus which manages the information associated with the other information processing apparatuses and the information associated with the present information processing apparatus, in the step of outputting the second information, the second information may be output to the information managing apparatus, and in the step of outputting the third information, the third information may be output to the information managing apparatus.

In this third information processing method, the first information may include information indicating, in the form of a list, the status of the present information processing apparatus and capabilities that the present information processing apparatus has, the second information may include information indicating the status of each capability of the present information processing apparatus, the third information may include status information indicating the status of a capability which is one of capabilities that the present information processing apparatus has and which is different from the capability whose status information is included in the second information, and outputting of the first, second, and third information may be performed using an instant message presence capability.

The present invention also provides a third information processing apparatus comprising first output means for outputting first information associated with the present information processing apparatus, for use by the other information processing apparatuses, registration means for, in response to a request from a particular one of the other information processing apparatuses, registering the particular one of the other information processing apparatuses and a capability that the particular one of the other information processing apparatuses has, in relation to a capability that the present information processing apparatus has, thereby producing registration information, second output means for, in accordance with the registration information, outputting second information associated with the details of the capability of the present information processing apparatus, the second information being for use by the particular one of the other information processing apparatuses registered by the registration means, registration request means for requesting, via the network, one or more of the other information processing apparatuses having an available capability to register the present information processing apparatus and a capability that the present information processing apparatus has, in relation to the capability of the one or more of the other information processing apparatuses, and third output means for outputting third information associated with the details of the capability that the present information processing apparatus has, the third information corresponding to the registration request issued by the registration request means and the third information being for use by the one or more of the other information processing apparatuses to which the registration request is issued.

The third information processing apparatus may further comprise first management means for managing fourth information output from the particular one of the other information processing apparatuses in relation to corresponding registration information, the fourth information being associated with the details of the capability of the particular one of the other information processing apparatuses registered by the registration means, and second management means for managing fifth information in relation to a capability that the present information processing apparatus has, the fifth information being associated with the details of the capability of the one or more of the other information processing apparatuses to which the registration request is issued by the registration request means, the fifth information being output from the one or more of other information processing apparatuses to which the registration request is issued.

In this third information processing apparatus, the first output means may output the first information to an information managing apparatus which manages the information associated with the other information processing apparatuses and the information associated with the present information processing apparatus, the second output means may output the second information to the information managing apparatus, and the third output means may output the third information to the information managing apparatus.

In this third information processing apparatus, the first information may include information indicating, in the form of a list, the status of the present information processing apparatus and capabilities that the present information processing apparatus has, the second information may include information indicating the status of each capability of the present information processing apparatus, the third information may include status information indicating the status of a capability which is one of capabilities that the present information processing apparatus has and which is different from the capability whose status information is included in the second information, and outputting of the first, second, and third information may be performed using an instant message presence capability.

The present invention also provides a fourth program for causing a computer to execute a process, the computer being responsible for controlling an information processing apparatus which manages information transmitted and received via a network among a plurality of other information processing apparatuses registered in advance as information processing apparatuses to communicate with, the process comprising the steps of managing first information supplied from the other information processing apparatuses, the first information being associated with the other information processing apparatuses, outputting the first information managed in the step of managing the first information, for use by the other information processing apparatuses, managing second information in which capabilities of the other respective information processing apparatuses are related to one another, and in accordance with the second information managed in the step of managing the second information, outputting third information associated with the details of capabilities that the other information processing apparatuses have, the third information being supplied from the other information processing apparatuses, so that the third information is supplied to proper one or more of the other information processing apparatuses.

The fourth program may further comprise the step of, in response to a request from a particular one of the other information processing apparatuses, registering the particular one of the other information processing apparatuses and a capability that the particular one of the other information processing apparatuses has, in relation to a capability of one or more of the other information processing apparatuses requested to be related, thereby producing the second information.

In this fourth program, the first information may include information indicating, in the form of a list, the status of the other information processing apparatuses or capabilities that the other information processing apparatuses have, the third information may include status information indicating the status of the other information processing apparatuses, and outputting of the first information and outputting of the second information may be performed using an instant message presence capability.

The present invention also provides a fourth information processing method comprising the steps of managing first information supplied from the other information processing apparatuses, the first information being associated with the other information processing apparatuses, outputting the first information managed in the step of managing the first information, for use by the other information processing apparatuses, managing second information in which capabilities of the other respective information processing apparatuses are related to one another, and in accordance with the second information managed in the step of managing the second information, outputting third information associated with the details of capabilities that the other information processing apparatuses have, the third information being supplied from the other information processing apparatuses, so that the third information is supplied to proper one or more of the other information processing apparatuses.

The fourth information processing method may further comprise the step of, in response to a request from a particular one of the other information processing apparatuses, registering the particular one of the other information processing apparatuses and a capability that the particular one of the other information processing apparatuses has, in relation to a capability of one or more of the other information processing apparatuses requested to be related, thereby producing the second information.

In this fourth information processing method, the first information may include information indicating, in the form of a list, the status of the other information processing apparatuses or capabilities that the other information processing apparatuses have, the third information may include status information indicating the status of the other information processing apparatuses, and outputting of the first information and outputting of the second information may be performed using an instant message presence capability.

The present invention also provides a fourth information processing apparatus comprising first management means for managing first information supplied from the other information processing apparatuses, the first information being associated with the other information processing apparatuses, first output means for outputting the first information managed by the first management means, for use by the other information processing apparatuses, second management means for managing second information in which capabilities of the other respective information processing apparatuses are related to one another, and second output means for, in accordance with the second information managed by the second management means, outputting third information associated with the details of capabilities that the other information processing apparatuses have, the third information being supplied from the other information processing apparatuses, so that the third information is supplied to proper one or more of the other information processing apparatuses.

The fourth information processing apparatus may further comprise registration means for, in response to a request from a particular one of the other information processing apparatuses, registering the particular one of the other information processing apparatuses and a capability that the particular one of the other information processing apparatuses has, in relation to a capability of one or more of the present information processing apparatus requested to be related, thereby producing the second information.

In this fourth information processing apparatus, the first information may include information indicating, in the form of a list, the status of the other information processing apparatuses or capabilities that the other information processing apparatuses have, the third information may include status information indicating the status of the other information processing apparatuses, and outputting of the first information and outputting of the second information may be performed using an instant message presence capability.

In an aspect of the present invention, first information associated with an information processing apparatus, for use by other information processing apparatuses, is output. In response to a request from a particular one of the other information processing apparatuses, the particular one of the other information processing apparatuses and a capability that the particular one of the other information processing apparatuses has are registered in relation to a capability that the present information processing apparatus has, thereby producing registration information. Furthermore, in accordance with the registration information, second information associated with the details of the capability of the present information processing apparatus for use by the particular one of the registered other information processing apparatuses is output.

In another aspect of the present invention, first information associated with an information processing apparatus, for use by other information processing apparatuses, is output, and a registration request is issued via a network to one of the other information processing apparatuses having an available capability to request that the present information processing apparatus and a capability of the present information processing apparatus be registered in relation to the capability of the one of the other information processing apparatuses. Furthermore, second information, associated with the details of the capability of the present information processing apparatus for use by the particular one of the registered other information processing apparatuses to which the registration request is issued, is output.

In another aspect of the present invention, first information associated with an information processing apparatus for use by other information processing apparatuses is output, and in response to a request from a particular one of the other information processing apparatuses, the particular one of the other information processing apparatuses and a capability that the particular one of the other information processing apparatuses has are registered in relation to a specified capability that the present information processing apparatus has, thereby producing registration information. In accordance with the registration information, second information associated with the details of the capability of the present information processing apparatus for use by the particular one of the registered other information processing apparatuses is output. A registration request is issued via a network to one of the other information processing apparatuses having an available capability to request that the present information processing apparatus and a capability that of the present information processing apparatus be registered in relation to the capability of the one of the other information processing apparatuses, and third information is output which indicates the details of the capability of the present information processing apparatus to be registered and which is for use by the one of the other information processing apparatuses to which the registration request has been issued.

In another aspect of the present invention, first information supplied from the other information processing apparatuses concerning the other information processing apparatuses is managed, first information managed is output for use by other information processing apparatuses, second information, in which capabilities of the other respective information processing apparatuses are related to one another, is managed, and, in accordance with the second information being managed, third information associated with the details of capabilities of the other information processing apparatuses and supplied from the other information processing apparatuses is output to proper one or more of the other information processing apparatuses.

BRIEF DESCRIPTION OF THE DRAWINGS

FIG. 2 is a diagram showing an example of presence information supplied from a client to a server shown in FIG. 1;

FIG. 12 is a diagram showing an example of presence information provided by the client 32 in the example shown in FIG. 11;

FIG. 14 is a diagram showing an example of presence information provided by the client 32 in the example shown in FIG. 13;

FIG. 15 is a diagram showing another example of presence information;

FIG. 17 is a diagram showing an example of presence information provided by the client 32 in the example shown in FIG. 16;

FIG. 27 is a diagram showing an example of main presence information;

FIG. 30 is a diagram showing an example of registration request data;

FIG. 31 is a diagram showing another example of registration request data;

FIG. 32 is a diagram showing still another example of registration request data;

FIGS. 33A to 33D are diagrams showing examples of data returned to response to a registration request;

FIGS. 35A to 35C are diagrams showing examples of data transmitted to cancel registration;

FIG. 36 is a timing chart showing a flow of a process of transmitting and receiving sub-presence information;

FIG. 38 is a diagram showing an example of provider sub-presence information data;

FIG. 39 is a diagram showing another example of provider sub-presence information data;

FIG. 40 is a diagram showing still another example of provider sub-presence information data;

FIG. 43 is a diagram showing an example of provider sub-presence information;

FIG. 44 is a diagram showing another example of provider sub-presence information;

FIG. 47 is a diagram showing an example of provider sub-presence information;

FIG. 48 is a diagram showing another example of provider sub-presence information;

FIG. 50 is a diagram showing an example of main presence information;

FIG. 51 is a diagram showing another example of main presence information;

FIG. 52 is a diagram showing still another example of main presence information;

FIG. 54 is a diagram showing an example of registration request data;

FIG. 55 is a diagram showing another example of registration request data;

FIG. 56 is a diagram showing still another example of registration request data;

FIG. 64 is a diagram showing an example of a list managed by the server shown in FIG. 63;

FIG. 65 is a diagram showing an example of updated sub-presence information;

FIG. 66 is a diagram showing another example of updated sub-presence information.

DESCRIPTION OF THE PREFERRED EMBODIMENTS

Figure 4:
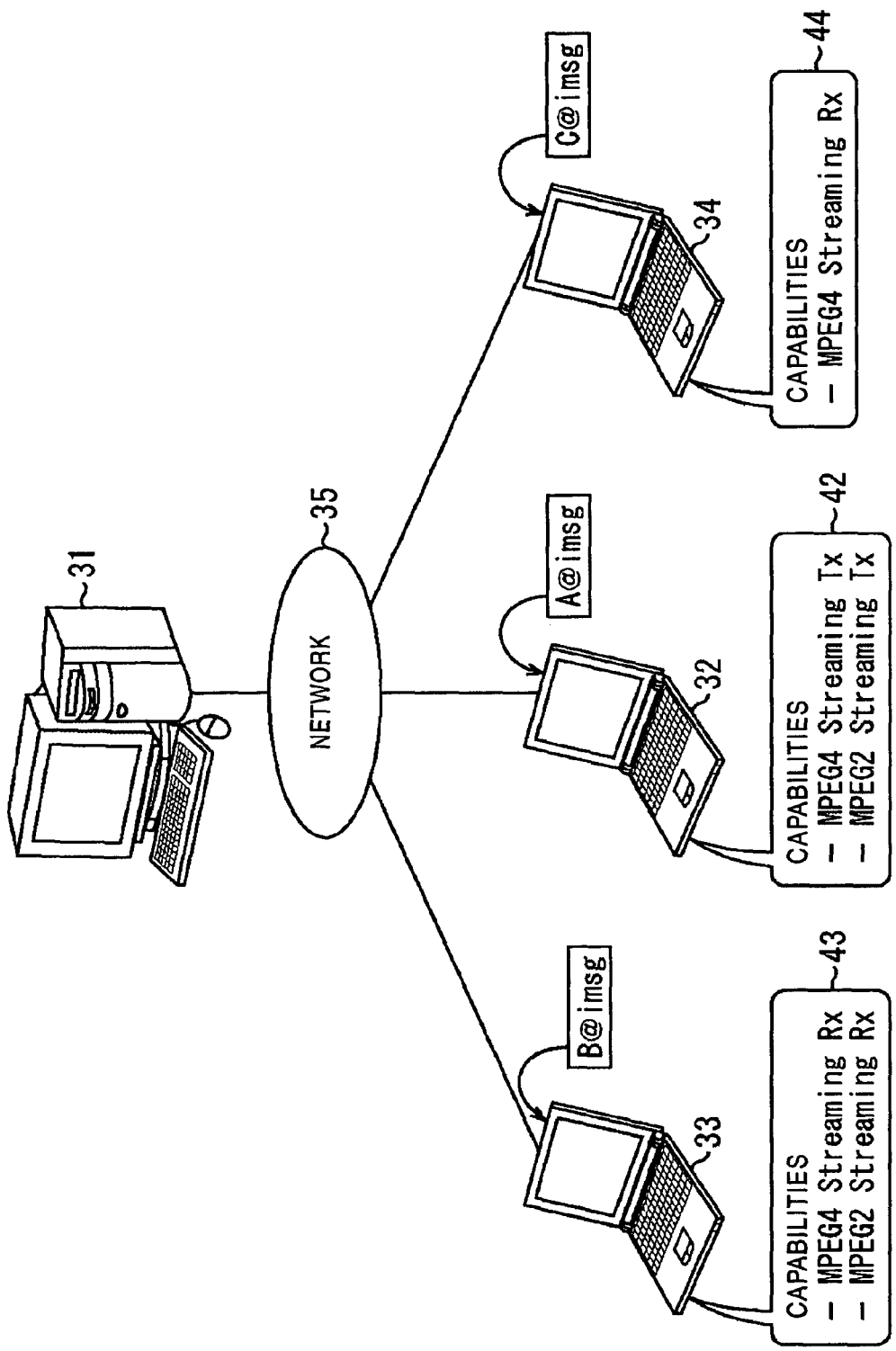
FIG. 4 is a diagram showing an example of an instant message communication system according to the present invention.

FIG. 4 shows an example of an instant message communication system according to the present invention.

In FIG. 4, a server 31 is connected to a network 35, typified by the Internet, whereby the server 31 provides instant message service to clients 32 to 34 connected to the network 35.

Figure 1:
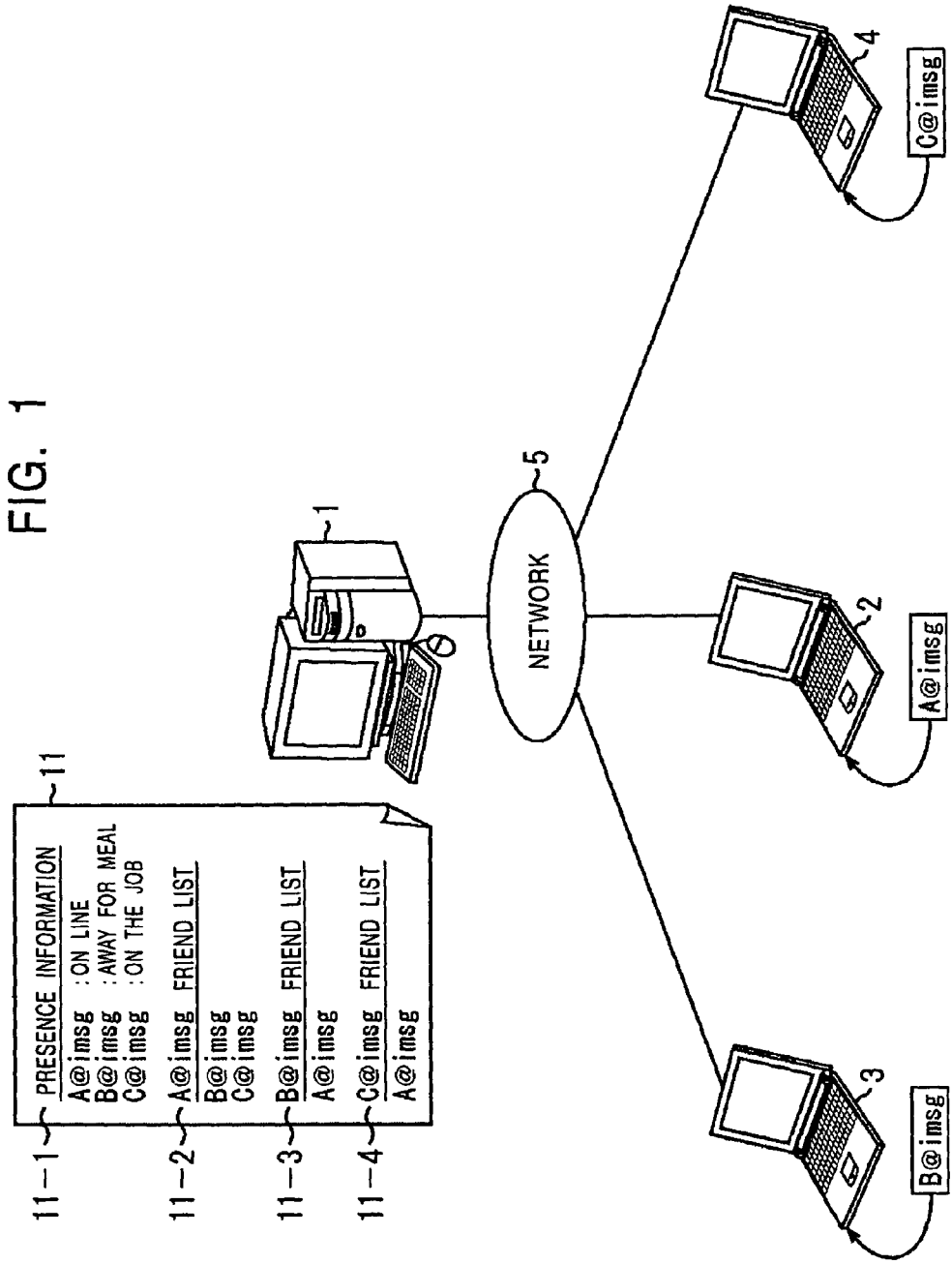
FIG. 1 is a diagram showing an example of a conventional instant message communication system using the IMPP.
Figure 3:
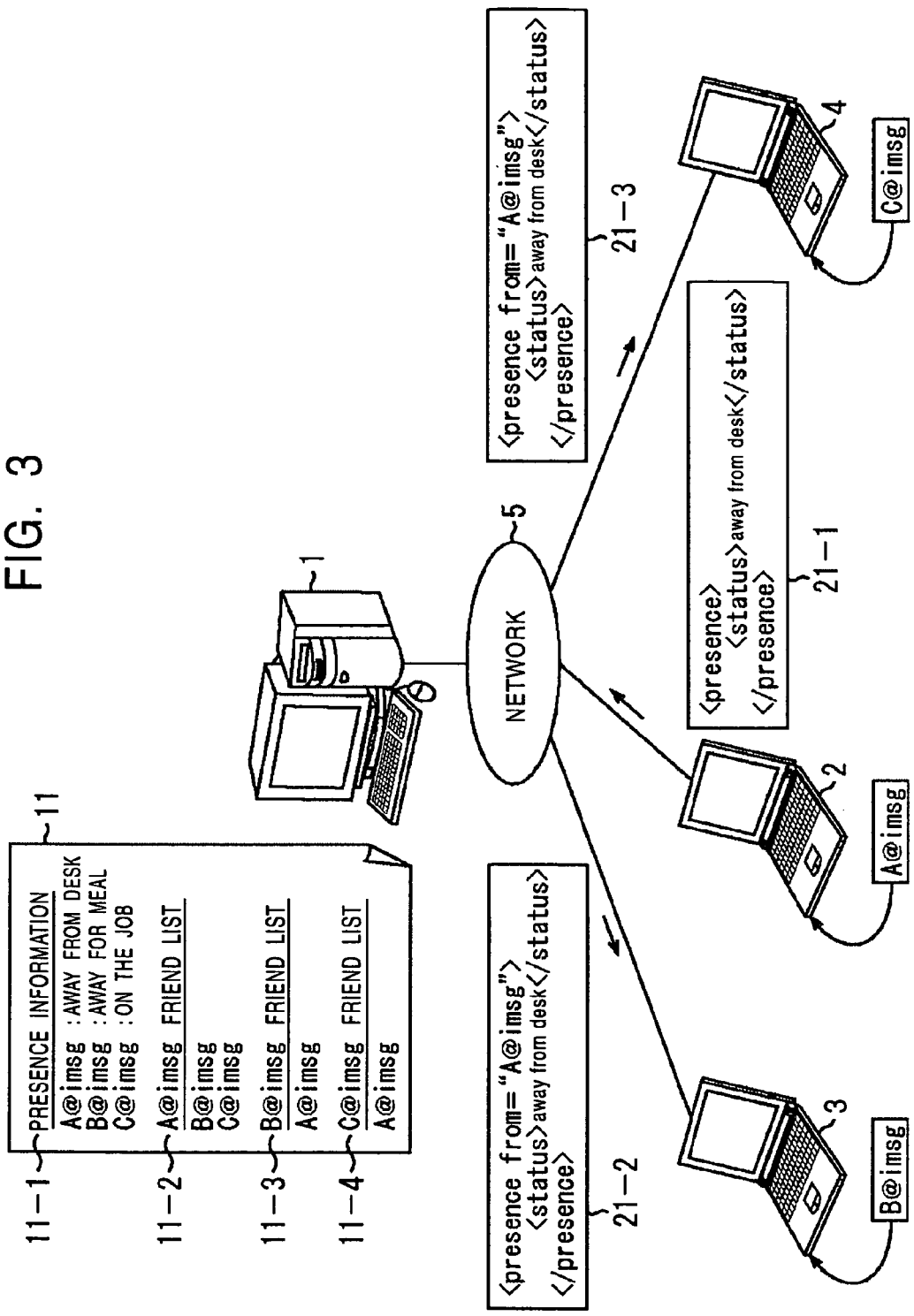
FIG. 3 is a diagram showing a manner in which the presence information is updated in the instant message communication system shown in FIG. 1.

The server 31 assigns A@imsg, B@imsg, and C@imsg as IDs to the respective clients 32 to 34. Also in this example, as in the example shown in FIG. 1, B@imsg (client 3) and C@imsg (client 4) are specified as friends (to communicate with) by A@imsg (client 2), A@imsg is specified as a friend by both B@imsg and C@imsg. Information indicating the above friend relationship is registered in the server 31.

The client 32 is a personal computer having a MPEG-4 (Moving Picture Expert Group 4) streaming transmission capability and a MPEG-2 streaming transmission capability, as shown in a capability list 42. The client 33 is a personal computer having a MPEG-4 streaming reception capability and a MPEG-2 streaming reception capability, as shown in a capability list 43. The client 34 is a personal computer having a MPEG-4 streaming reception capability, as shown in a capability list 44.

The MPEG-4 streaming transmission capability possessed by the client 32 allows one channel of MPEG-4 data to be transmitted at a time, and the MPEG-2 streaming transmission capability allows one channel of MPEG-2 data to be transmitted at a time.

On the other hand, the MPEG-4 streaming reception capability possessed by the clients 33 and 34 allows one channel of MPEG-4 data to be received at a time, and the MPEG-2 streaming reception capability possessed by the client 33 allows one channel of MPEG-2 data to be received at a time.

By using those capabilities, the client 32 can transmit one channel of MPEG-4 data and one channel of MPEG-2 data at the same time to the client 33 via the network 35. The client 32 can also transmit one channel of MPEG-4 data to the client 34 via the network 35.

Using the instant message communication service provided by the server 31, the clients 32 to 34 acquire information indicating what capabilities are currently available at respective clients to communicate with. More specifically, using presence information of the instant message communication service, each of the clients 32 to 34 informs another client, to communicate with, of the status of the capability of each client, and each client acquires information indicating the capability of another client to communicate with.

Actually, the presence information is supplied among clients not directly but via the server 31, although the process of passing presence information via the server 31 is not described for the purpose of simplicity.

Figure 5:
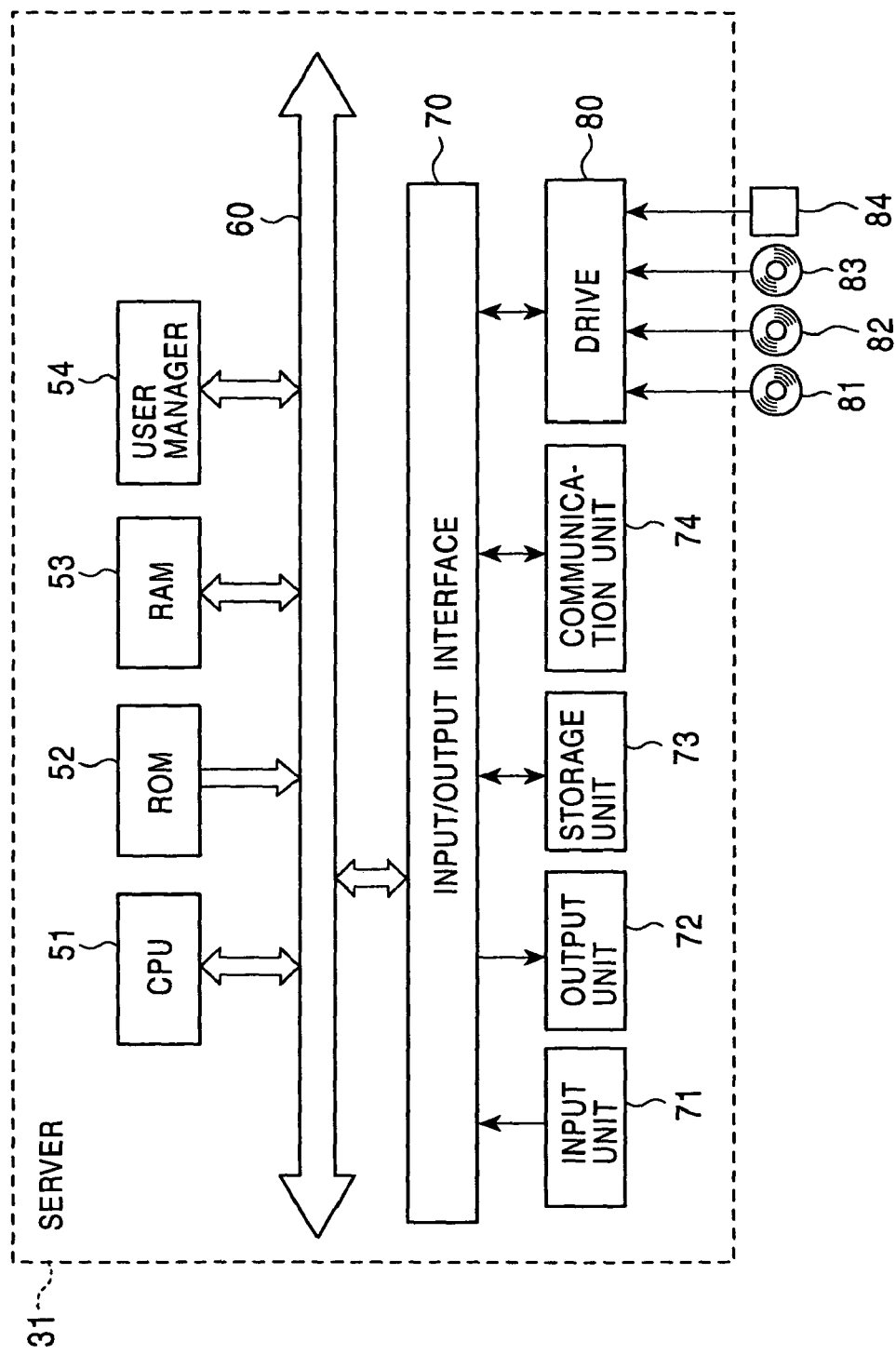
FIG. 5 is a block diagram showing an example of a construction of a server shown in FIG. 4.

FIG. 5 shows an example of a construction of the server 31 shown in FIG. 4.

In FIG. 5, a CPU (Central Processing Unit) 51 executes various processes in accordance with a program stored in a ROM (Read Only Memory) 52 or a program loaded in a RAM (Random Access Memory) 53 from a storage unit 73. The RAM 53 is also used to store data necessary in processes executed by the CPU 51.

A user manager 54 manages, under the control of the CPU 51, information associated with clients to which to provide instant message communication service. More specifically, the user manager 54 manages a friend list of each client and also manages the status of each client. In accordance with the information managed by the user manger 54, the server 31 supplies presence information received from a client to another client specified as a friend (to communicate with).

The CPU 51, the ROM 52, the RAM 53, and the user manager 54 are connected to each other via a bus 60. The bus 60 is also connected to an input/output interface 70.

The input/output interface 70 is also connected to an input unit 71 including a keyboard, mouse, and the like, an output unit 72 including a display such as a CRT (Cathode Ray Tube) or a LCD (Liquid Crystal Display) and a speaker, a storage unit 73 such as a hard disk drive, and a communication unit 74 such as a modem, a terminal adapter, or a LAN adapter.

In addition to storing programs or data necessary in the instant message communication service, the storage unit 73 is also used to store other information such as friend lists registered in response to requests from clients. As required, the information stored in the storage unit 73 is supplied to the CPU 51, the RAM 53, or the user manager 54.

The communication unit 24, having communication capability using a modem or a terminal adapter, may also have communication capability according to the USB (Universal Serial Bus) standard, the IEEE (Institute of Electrical and Electronic Engineers) 1394 standard, the RS-232C (Recommended Standard 232 revision C) standard, or the SCSI (Small Computer System Interface) standard.

A drive 80 is also connected to the input/output interface 70 as required, and a magnetic disk 81, an optical disk 82, a magnetooptical disk 83, or a semiconductor memory 84 is mounted on the drive 80, as required, to install a computer program therefrom into the storage unit 73.

Figure 6:
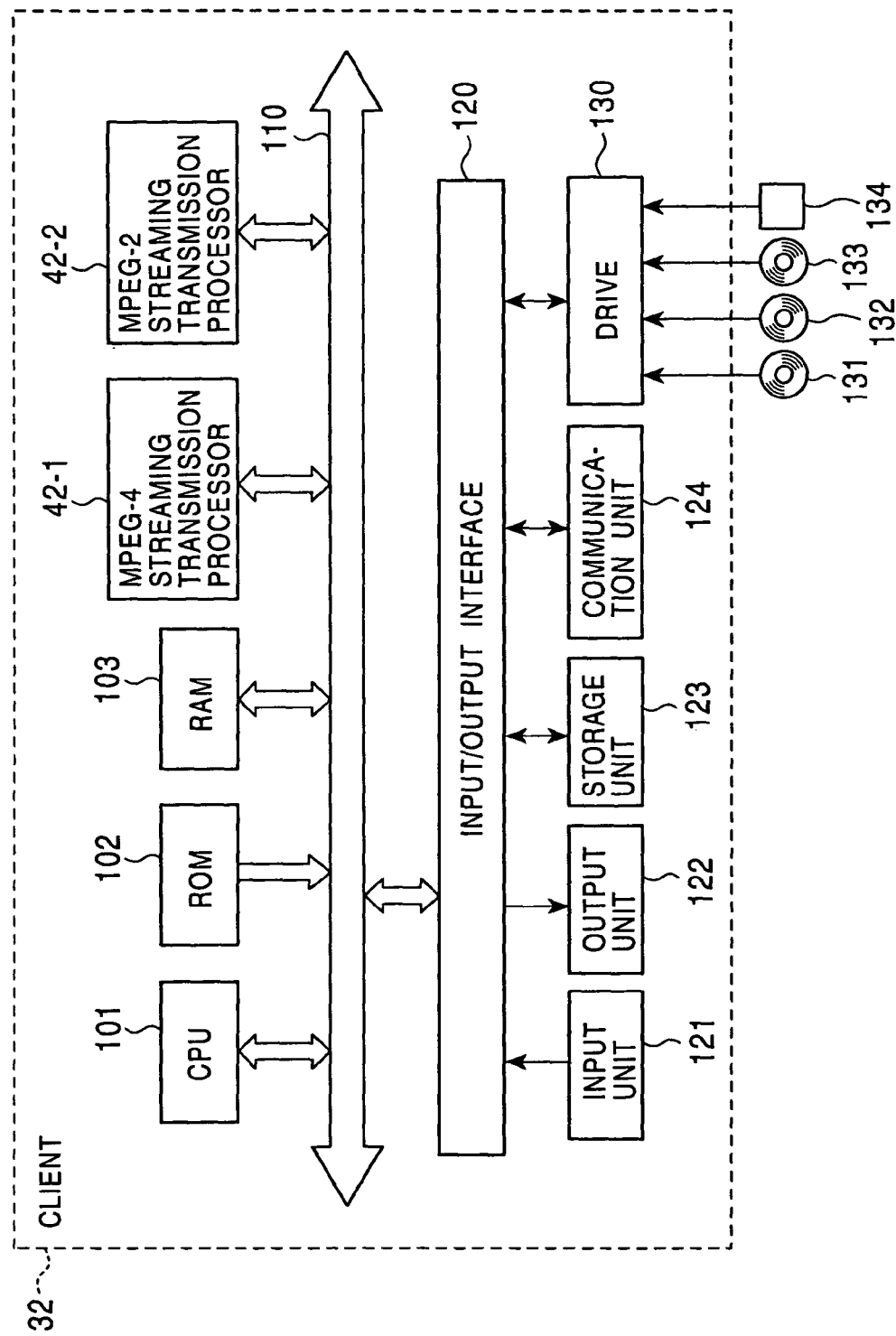
FIG. 6 is a block diagram showing an example of a construction of a client 32 shown in FIG. 4.

FIG. 6 shows an example of a construction of the client 32 shown in FIG. 4.

In FIG. 6, a CPU 101 executes various processes in accordance with a program stored in a ROM 102 or a program loaded in a RAM 103 from a storage unit 123. The RAM 103 is also used to store data necessary in processes executed by the CPU 101.

A MPEG-4 streaming transmission processor 42-1 performs, under the control of the CPU 101, processing associated with transmission of MPEG-4 streaming data via a communication unit 124, thereby achieving the MPEG-4 streaming transmission capability described in a capability list 42 shown in FIG. 4. Similarly, a MPEG-2 streaming transmission processor 42-2 performs, under the control of the CPU 101, processing associated with transmission of MPEG-2 streaming data via the communication unit 124, thereby achieving the MPEG-2 streaming transmission capability described in the capability list 42 shown in FIG. 4.

The CPU 101 transmits MPEG-4 or MPEG-2 streaming data to the client 33 or 34 via the network 35, by controlling the communication unit 124, the MPEG-4 streaming transmission processor 42-1, and the MPEG-2 streaming transmission processor 42-2.

The CPU 101, the ROM 102, the RAM 103, the MPEG-4 streaming transmission processor 42-1, and the MPEG-2 streaming transmission processor 42-2 are connected to each other via a bus 110. The bus 110 is also connected to an input/output interface 120.

The input/output interface 120 is also connected to an input unit 121 including a keyboard, mouse, and the like, an output unit 122 including a display such as a CRT or a LCD and a speaker, a storage unit 123 such as a hard disk drive, a communication unit 124 such as a modem, a terminal adapter, or a LAN adapter.

A drive 130 is also connected to the input/output interface 120 as required, and a magnetic disk 131, an optical disk 132, a magnetooptical disk 133, or a semiconductor memory 134 is mounted on the drive 130, as required, to install a computer program therefrom into the storage unit 123.

Figure 7:
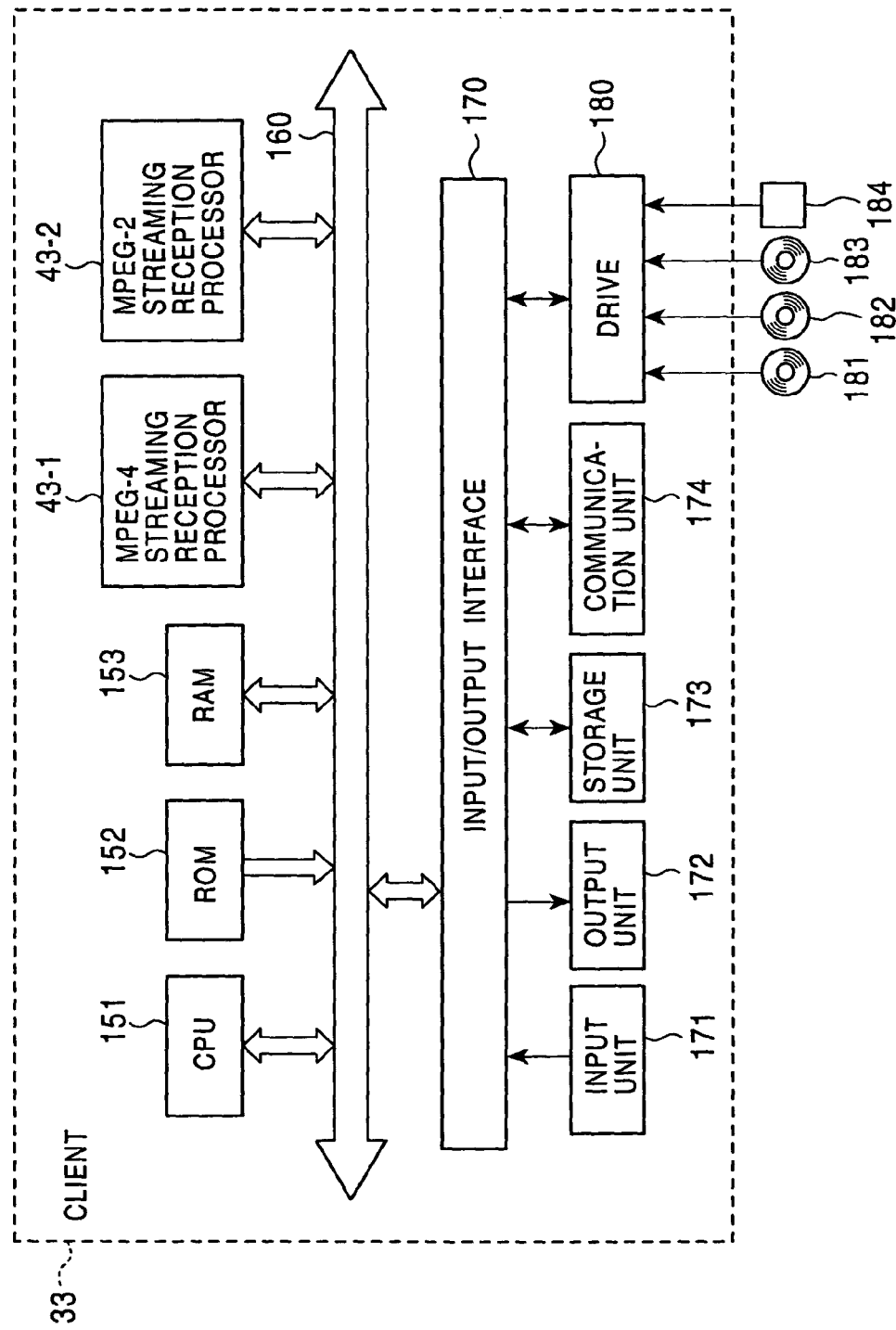
FIG. 7 is a block diagram showing an example of a construction of another client 33 shown in FIG. 4.

FIG. 7 shows an example of a construction of the client 33 shown in FIG. 4.

In FIG. 7, components such as a CPU 151, . . . , a RAM 153, a bus 160, . . . , a semiconductor memory 184 are similar to corresponding components such as the CPU 101, . . . , the RAM 103, the bus 110, . . . , the semiconductor memory 134 of the client 32 shown in FIG. 6, and thus they are not described in further detail herein.

A MPEG-4 streaming transmission reception processor 43-1 connected to the bus 160 performs, under the control of the CPU 151, processing associated with reception of MPEG-4 streaming data via a communication unit 174, thereby achieving the MPEG-4 streaming reception capability described in a capability list 43 shown in FIG. 4. Similarly, a MPEG-2 streaming transmission reception processor 42-2 connected to the bus 160 performs, under the control of the CPU 151, processing associated with reception of MPEG-2 streaming data via a communication unit 174, thereby achieving the MPEG-2 streaming Rx capability described in the capability list 43 shown in FIG. 4.

The CPU 151 receives MPEG-4 or MPEG-2 streaming data transmitted from the client 32 via the network 35, by controlling the communication unit 174, the MPEG-4 streaming reception processor 43-1, and the MPEG-2 streaming reception processor 43-2.

Figure 8:
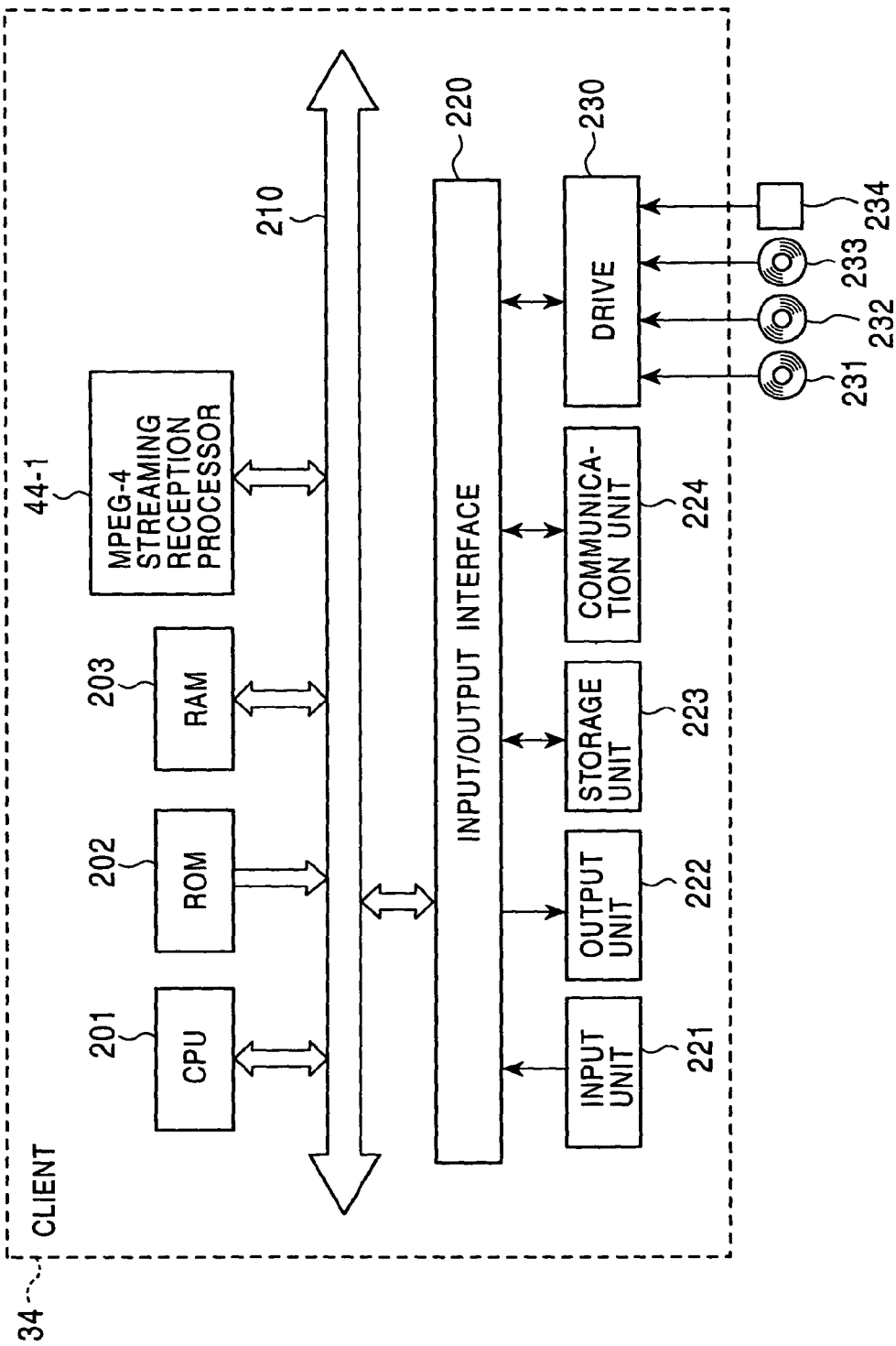
FIG. 8 is a block diagram showing an example of a construction of still another client 34 shown in FIG. 4.

FIG. 8 shows an example of a construction of the client 34 shown in FIG. 4.

In FIG. 8, components such as a CPU 201, ..., a RAM 203, a bus 210, ..., a semiconductor memory 234 are similar to corresponding components such as the CPU 101, ..., the RAM 103, the bus 110, ..., the semiconductor memory 134 of the client 32 shown in FIG. 6, and thus they are not described in further detail herein.

A MPEG-4 streaming transmission reception processor 44-1 connected to the bus 210 performs, under the control of the CPU 201, processing associated with reception of MPEG-4 streaming data via a communication unit 224, thereby achieving the MPEG-4 streaming reception capability described in a capability list 44 shown in FIG. 4.

The CPU 201 receives MPEG-4 streaming data transmitted from the client 32 via the network 35, by controlling the communication unit 224, and the MPEG-4 streaming reception processor 44-1.

Referring again to FIG. 4, A@imsg (client 32) has (as a provider) the capability of transmitting MPEG-4 and MPEG-2 streaming data and provides, using the instant message communication service provided by the server 31, presence information associated with the capability possessed by A@imsg acting as the provider to B@imsg (client 33) and C@imsg (client 34) having (as consumers) the capability of receiving MPEG-4 or MPEG-2 streaming data.

In the following description, an apparatus (the client 32 in the example shown in FIG. 4) having the capability of transmitting MPEG-4 or MPEG-2 streaming data will be referred to as a provider, and an apparatus (clients 33 and 34 in the example shown in FIG. 4) having the capability of receiving MPEG-4 or MPEG-2 streaming data will be referred to as a consumer.

Referring to a flow chart shown in FIG. 9, a process performed by the provider (client 32) to supply presence information associated with the capability of the provider to consumers (clients 33 and 34) in the example shown in FIG. 4 is described below.

First, in step S1, the CPU 101 of the client 32 acting as a provider controls necessary parts so as to produce service information as presence information associated with the capability (MPEG-4 streaming transmission and MPEG-2 streaming transmission) of the client 32 and supply the resultant service information to the clients 33 and 34 specified as friends (to communicate with).

If the clients 33 and 34 receive the service information, they determine what capability is available in transmission, on the basis of the received service information. This makes it possible for the consumers (the clients 33 and 34) to know what capability is provided by the client 32 acting as the provider and what state the clients 32 is in, and thus, using the available capability, the consumers (the clients 33 and 34) can communicate with the client 32 which is the supplier of the service information.

In step S2, after the completion of step S1, the CPU 101 monitors the status of the MPEG-4 streaming transmission capability and the MPEG-2 streaming transmission capability to detect a change in the service status. For example, if communication with the client 33 acting as a consumer is started using the MPEG-4 streaming transmission capability (that is, transmission of MPEG-4 streaming data is started), it becomes impossible to transmit another MPEG-4 streaming data at the same time. That is, the CPU 101 controls the MPEG-4 streaming transmission processor 42-1 and the MPEG-2 streaming transmission processor 42-2 to determine whether a change has occurred in the status of the MPEG-4 streaming transmission capability or the MPEG-2 streaming transmission capability.

If a change in the service status is detected, the process proceeds to step S3. In step S3, the CPU 101 updates the service information and supplies the updated service information to the consumers via the communication unit 124. Thereafter, the CPU 101 advances the process to step S4.

However, if no change in the service status is detected in step S2, the CPU 101 advances the process to step S4 without performing step S3.

In step S4, the CPU 101 determines whether to end the presence information provision process. If it is determined that the process should not be ended, the CPU 101 returns the process to step S2 to repeat step S2 and following steps.

On the other hand, if it is determined that the presence information provision process should be ended because the service has been ended or for any other reason, the CPU 101 advances the process to step S5 in which the CPU 101 performs an end process to complete the presence information provision process.

That is, when the client 32 logs in to the instant message communication service, the CPU 101 supplies presence information, as service information, indicating the state of the capability of the client 32 to clients 33 and 34 specified as friends. If a change in the status of service occurs, the CPU 101 updates the service information and supplies the updated service information.

In the manner described above, the client 32 acting as a provider supplies presence information indicating the capability possessed by the client 32 to consumers.

In the process described above, the client 32 acting as the provider supplies service information to the clients 32 and 33 via the server 31, and the server 31 stores the service information and manages it. If a client specified as a friend of the client 32 newly logs in, the server 31 supplies the service information associated with the client 32 to the new client.

Thus, the client 32 can provide newest service information to all clients which are specified as friends of the client 32 and which are currently logging in, simply by supply the newest service information only when a change in the status of service occurs.

For example, when the clients 33 and 34 have already logged in to the instant message communication service, if the client 32 shown in FIG. 4 further logs in, then presence information is processed as described below with reference to a timing chart shown in FIG. 10.

Figure 9:
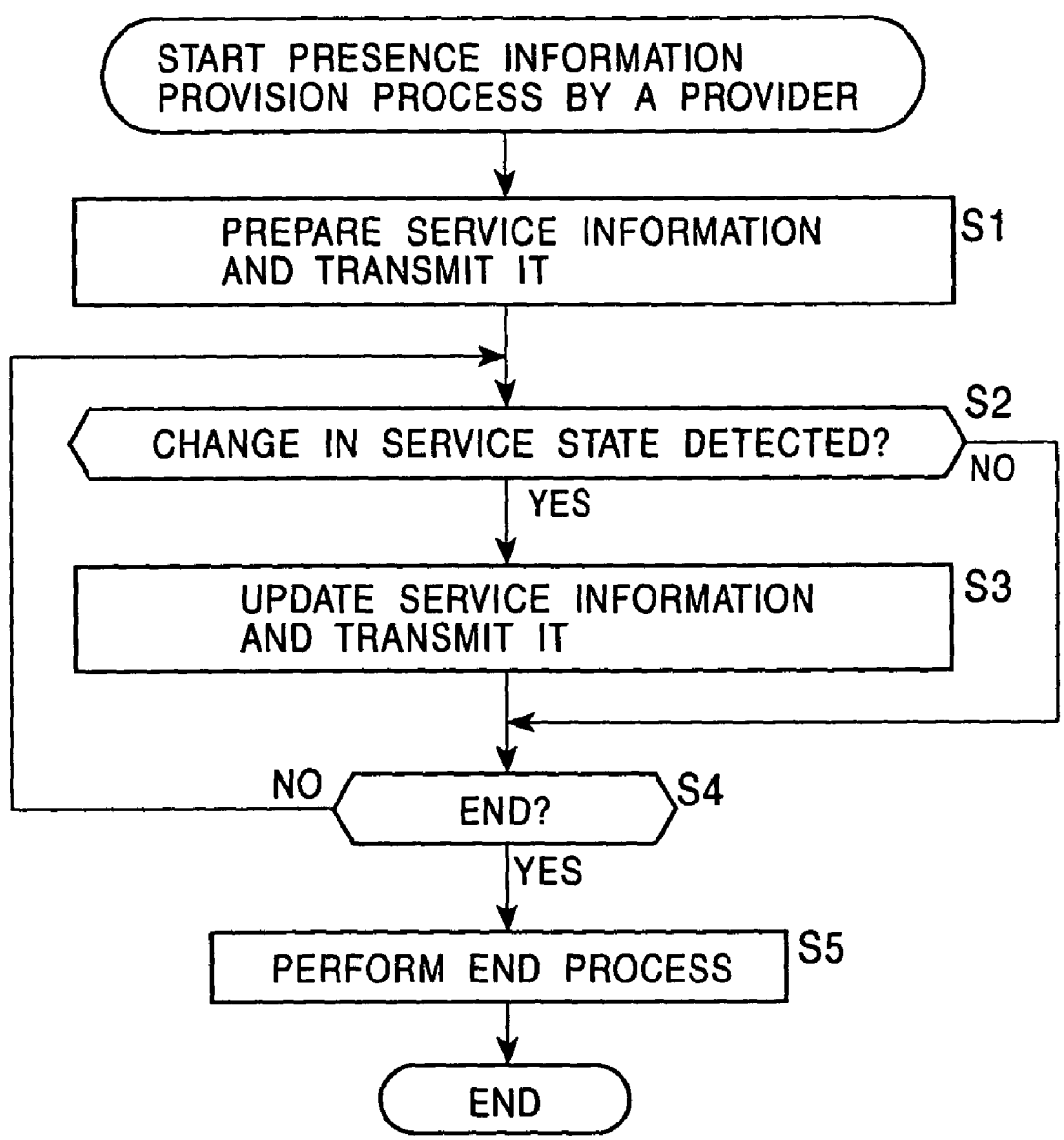
FIG. 9 is a flow chart showing a presence information provision process performed by a provider.

In step S41 after the client 32 logs in to the instant communication message service, the client 32 prepares service information and supplies it to clients 33 and 34 specified as friends, as in step S1 in FIG. 9. If the client 33 receives the service information in step S31, then, in next step S32, the client 33 analyzes the received service information. Similarly, if the client 34 receives, in step S51, the service information transmitted from the client 32, then, in the next step S52, the client 34 analyzes the received service information. Thus, the clients 33 and 34 can know what capability the client 32 has and in what status the capability is.

Figure 11:
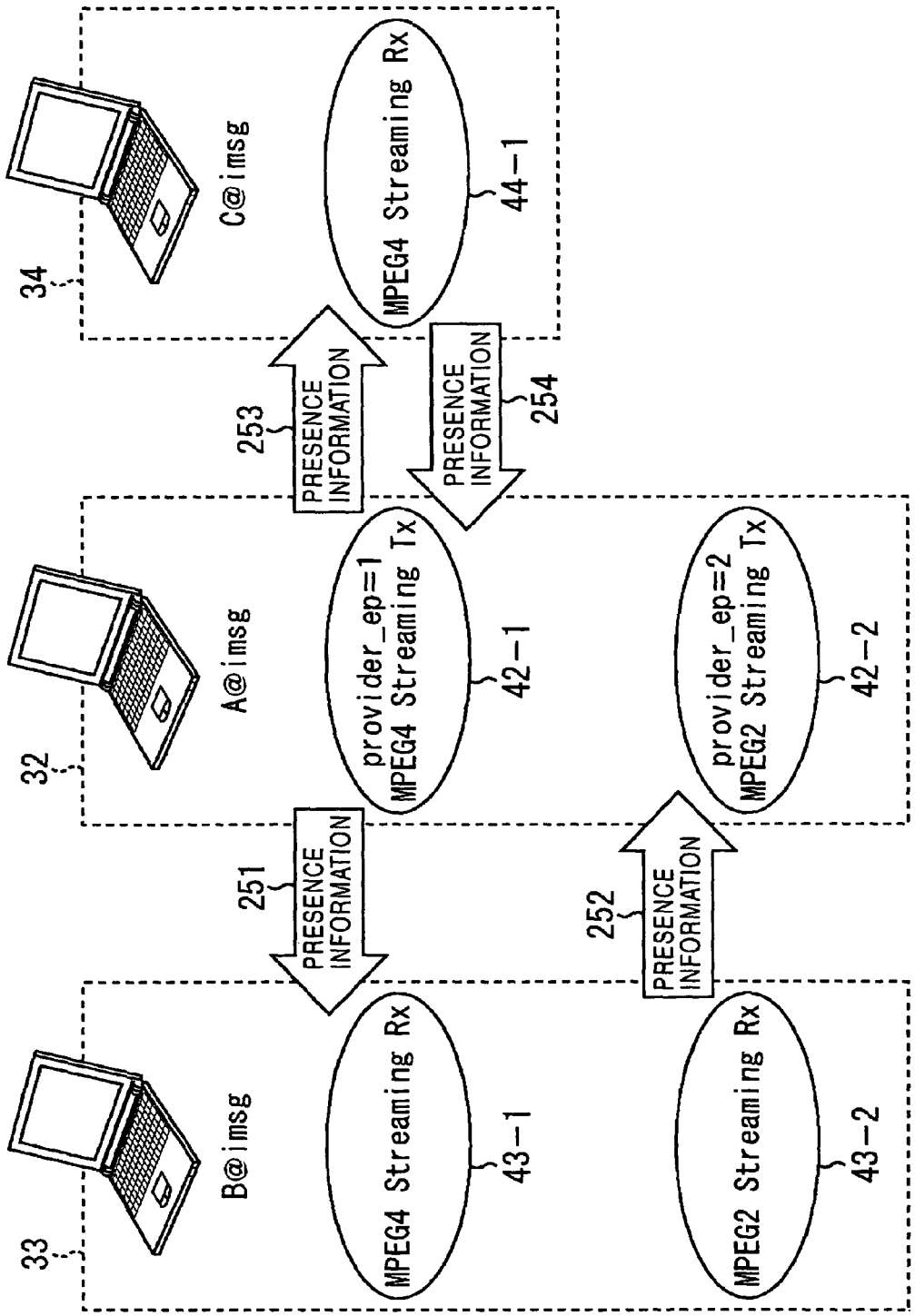
FIG. 11 is a diagram showing a manner in which, in the example shown in FIG. 10, the client 32 shown in FIG. 4 provides presence information to other clients 33 and 34.

FIG. 11 shows a manner in which the client 32 supplies presence information to the clients 33 and 34.

In FIG. 11, the MPEG-4 streaming transmission capability 42-1 and the MPEG-2 streaming transmission capability 42-2, possessed by the client 32, are respectively assigned serial numbers (provider_eq) indicating provider's capabilities. More specifically, provider_ep=1 is assigned to the MPEG-4 streaming transmission capability 42-1, and provider_ep=2 is assigned to the MPEG-2 streaming transmission capability 42-2.

The client 32 supplies presence information such as that shown in FIG. 12 to the clients 33 and 34, as represented by arrows 251 and 253.

As shown in FIG. 12, presence information is described between a tag <presence> and a tag </presence>. Information described between a tag <status> and a tag </status> indicates the status of A@imsg (client 32), wherein the status is "on line" in the specific example shown in FIG. 12. Information associated with the capability that the client 32 acting as a provider has (wherein, in the specific example shown in FIG. 12, the client 32 has the MPEG-4 streaming transmission capability and the MPEG-2 streaming transmission capability) is described between a tag <service> and a tag </service>.

More specifically, information associated with the MPEG-4 streaming transmission capability 42-1 shown in FIG. 11 is described between a tag <announce provider_ep="1" profile="MPEG4 Streaming" and a tag <announce>, wherein information indicating the status of this capability is described between a tag <show> and a tag </show>. In the specific example shown in FIG. 12, the information between the tags <shot> and </show> indicates that the MPEG-4 streaming transmission capability 42-1 is in an "available" status in which MPEG-4 data can be transmitted.

Similarly, information associated with the MPEG-2 streaming transmission capability 42-2 is described between a tag <announce provider_ep="2" profile="MPEG2 Streaming" and a tag <announce>. In the specific example shown in FIG. 12, the MPEG-2 streaming transmission capability 42-2 is in an "available" status in which MPEG-2 data can be transmitted.

Referring again to FIG. 10, if it is determined, as a result of analysis on service information, to perform communication using the capability that the client 32 acting as the provider has, then, in step S33, the client 33 transmits a communication start request to the client 32. If the client 32 receives the communication start request in step S42, then, in the next step S43, the client 32 performs a pre-communication process in preparation for starting transmission of streaming data using the capability of the provider.

Starting of transmission of streaming data results in a change in status of service. Thus, in step S44, the client 32 updates the service information, as in step S3 in FIG. 9, and supplies the updated service information to the clients 33 and 34.

If the client 33 receives the service information in step S34, then, in the next step S35, the client 33 analyzes the received service information. Similarly, if the client 35 receives, in step S53, the service information transmitted from the client 32, then, in the next step S54, the client 35 analyzes the received service information. Thus, the clients 33 and 34 can obtain newest information associated with the status of the capability that the client 32 acting as the provider has.

In step S45, the client 32 starts requested transmission, and, in step S36, the client 33 starts reception of data transmitted from the client 32.

Figure 13:
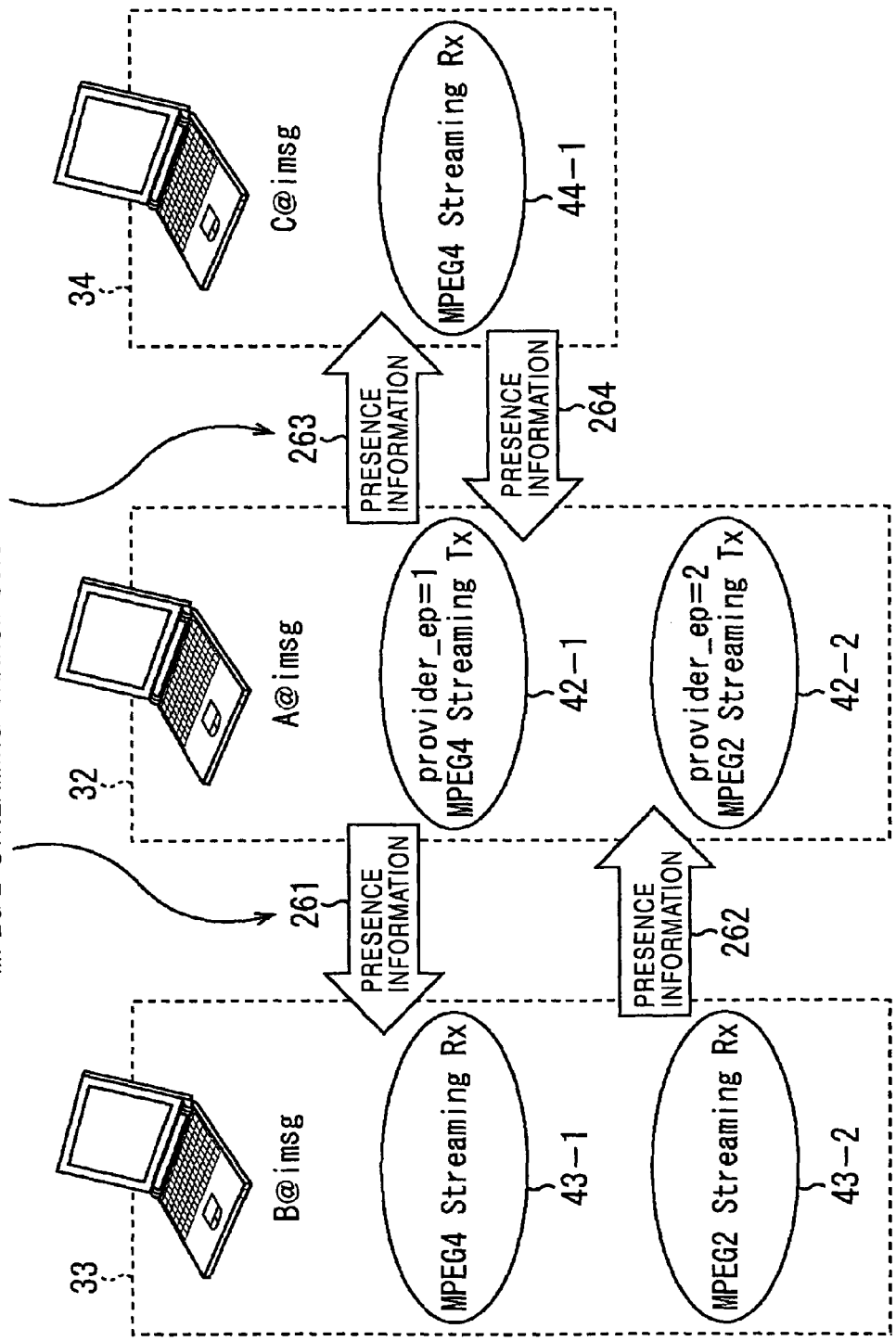
FIG. 13 is a diagram showing a manner in which the clients 32 and 33 communicate with each other after starting streaming.

FIG. 13 shows a process performed after streaming transmission and reception between the clients 32 and 33 are started.

Figure 10:
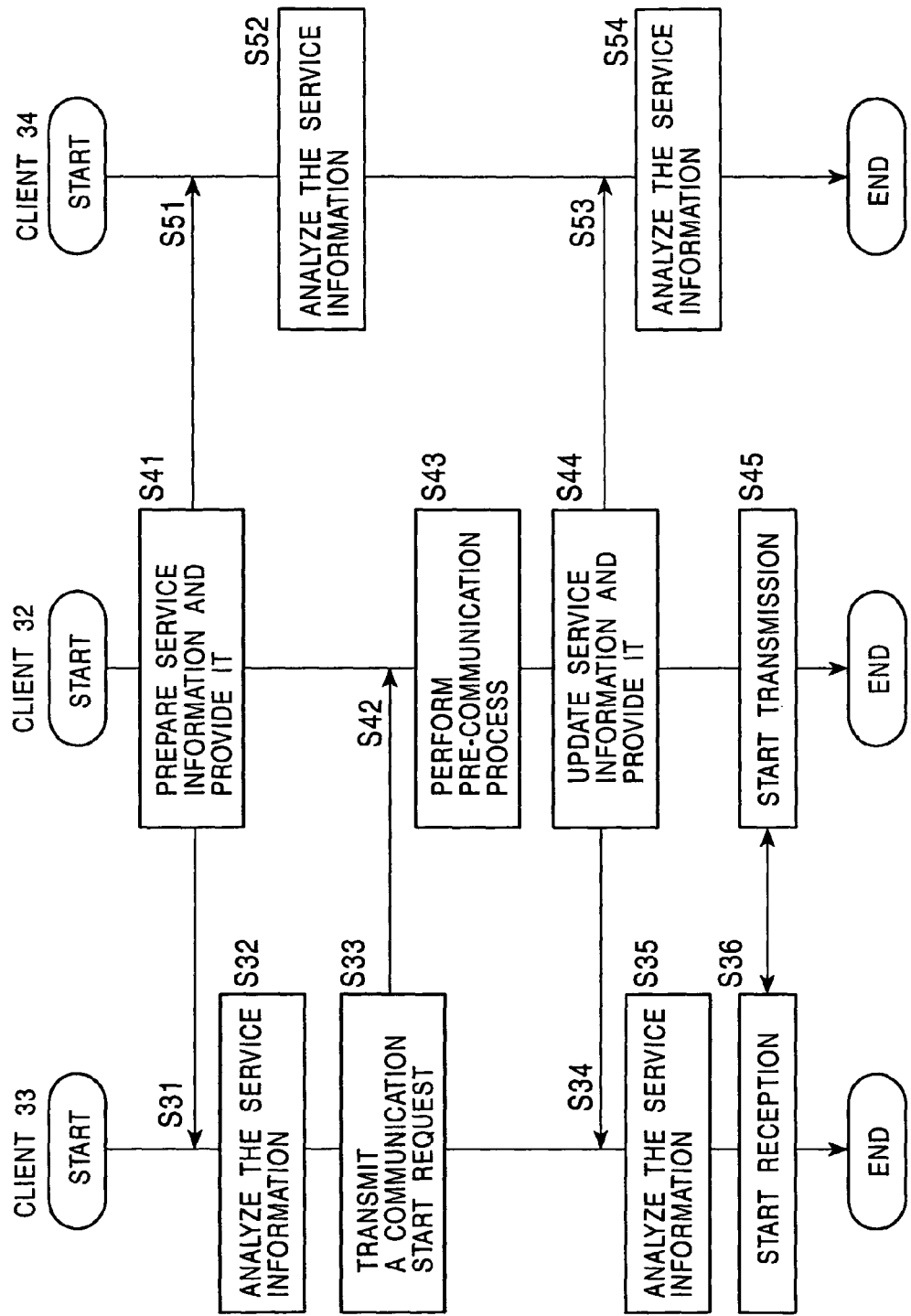
FIG. 10 is a timing chart showing a flow of processing presence information.

If streaming communication using the MPEG-4 streaming transmission capability 42-1 of the client 32 is started in response to a request issued by the client 33 in step S33 in FIG. 10, the MPEG-4 streaming transmission capability 42-1 becomes unavailable for another transmission. Thus, in step S44 in FIG. 10, the client 32 updates the service information and supplies the presence information such as that shown in FIG. 14 to the clients 33 and 34 as represented by arrows 261 and 263.

As shown in FIG. 14, the presence information indicates that the MPEG-4 streaming transmission capability 42-1 is "unavailable".

As described above, in transmission using capabilities of respective clients, the statuses of the capabilities are informed using the presence information of the instant message communication service, thereby allowing a reduction in load imposed on the process.

The presence information shown in FIG. 14 also includes information indicating the status of the MPEG-2 streaming transmission capability 42-2. In the specific example shown in FIG. 14, the presence information is issued for the purpose to inform that the MPEG-4 streaming transmission capability 42-1 becomes unavailable as shown in FIG. 13. Therefore, for the present purpose, information associated with the MPEG-2 streaming transmission capability 42-2 is not necessary.

However, because the client 32 supplies only newest presence information, if the client 32 updates the presence information and supplies information indicating only a difference, that is, in the present example, if the client 32 supplies only information associated with the MPEG-4 streaming transmission capability 42-1 as shown in FIG. 15, then a user who newly logs in receives only the presence information such as that shown in FIG. 15 and cannot obtain all necessary information. To avoid the above problem, the client 32 updates the presence information and supplies the newest presence information including all information as shown in FIG. 14.

Figure 16:
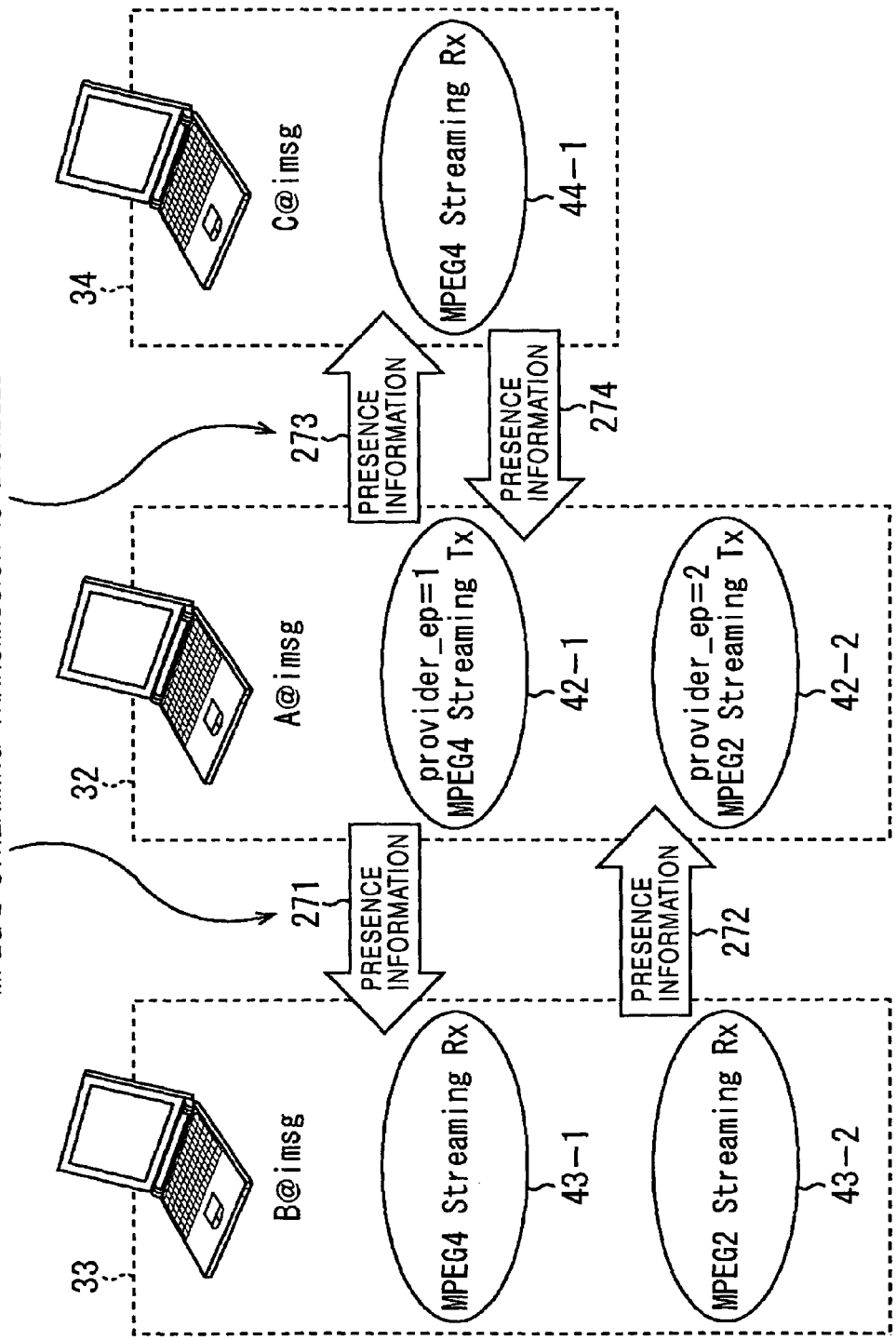
FIG. 16 is a diagram showing another example of a manner in which the clients 32 and 33 communicate with each other after starting streaming.

FIG. 16 shows another example of a manner in which communication is performed between the clients 32 and 33 after the streaming transmission is started.

In the example shown in FIG. 16, MPEG-2 streaming transmission is started between the clients 32 and 33.

In this case, the client 32 is required to inform only the client 33 having the MPEG-2 streaming reception capability that the MPEG-2 streaming transmission capability 42-2 has become unavailable.

However, as in the case shown in FIG. 13, the client 32 supplies, to the clients 33 and 34, presence information including information associated with the MPEG-4 streaming transmission capability 42-1 and information associated with the MPEG-2 streaming transmission capability 42-2, as shown in FIG. 17.

In this case, the clients 33 and 34 receive the information including unnecessary information indicating the status of the MPEG-4 streaming transmission capability 42-1 which is exactly the same as information which has been received before. Furthermore, to the client 34, the information indicating the status of the MPEG-2 streaming transmission capability 42-2 is also unnecessary.

Figure 18:
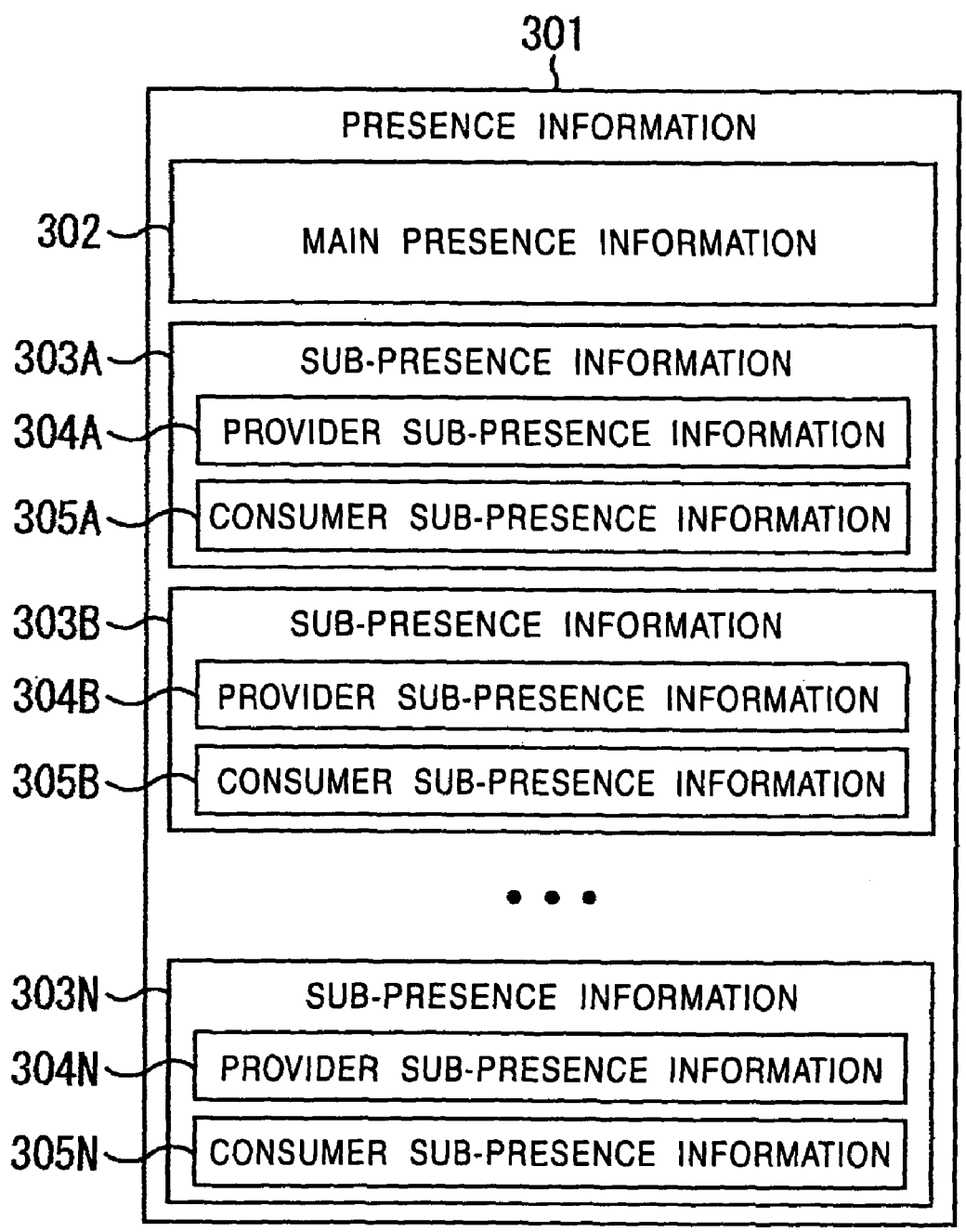
FIG. 18 is a diagram showing an example of a data format of presence information according to the present invention.

To avoid the redundancy described above, presence information is organized into two categories, as shown in FIG. 18.

That is, the presence information 301 includes main presence information 302 and sub-presence information 303A to 303N, wherein the main presence information 302 includes information indicating the capabilities of clients and information indicating the statuses ("on line", "on the job", etc.) of clients, and each of sub-presence information 303A to 303N indicates the status of each capability.

The main presence information is supplied to the server 31 when a client logs on or when a change in status occurs. The server 31 manages the received main presence information and automatically supplies it to clients which need the main presence information.

The sub-presence information 303A includes provider sub-presence information 304A associated with the capability of a provider and consumer sub-presence information 305A associated with the capability of a consumer. Each of sub-presence information 303B to 303N also includes similar provider sub-presence information and consumer sub-presence information.

The sub-presence information 303A to sub-presence information 303N are produced for respective capabilities that the client has, and thus there are as many pieces of sub-presence information as the client has capabilities.

For example, the client 32 acting as a provider has the MPEG-4 streaming transmission capability 42-1 and the MPEG-2 streaming transmission capability 42-2, and the presence information includes two pieces of sub-presence information 303A and 303B corresponding to the two capabilities. The sub-presence information 303A includes provider sub-presence information 304A, and the sub-presence information 303B includes provider sub-presence information 304B.

On the other hand, the client 33 acting as a consumer has the MPEG-4 streaming reception capability 43-1 and the MPEG-2 streaming reception capability 43-2, and thus the presence information includes two pieces of sub-presence information 303A and 303B corresponding to the above two capabilities. The sub-presence information 303A includes consumer sub-presence information 305A, and the sub-presence information 303B includes consumer sub-presence information 305B.

The client 34 acting as a consumer has the MPEG-4 streaming reception capability 44-1, and thus the presence information includes one piece of sub-presence information 303A corresponding to this capability. The sub-presence information 303A includes consumer sub-presence information 305A.

Hereinafter, when it is not needed to distinguish capabilities from one another, they are generically referred to as sub-presence information 303. Similarly, when it is not needed to specify one of provider sub-presence information 304A to 304N or one of consumer sub-presence information 305A to 305N, they are generically referred to as provider sub-presence information 304 or consumer sub-presence information 305.

As will be described later, a client acting as a provider has client registration information associated with clients acting as consumers. In accordance with the registration information, sub-presence information 303 is supplied to a proper consumer.

The process performed by the system provider to manage the presence information shown in FIG. 18 in the instant message communication system shown in FIG. 4, and the process performed by a consumer to manage the presence information are described below. First, referring to a flow chart shown in FIG. 19, a process performed by the provider to manage the main presence information is described.

Figure 19:
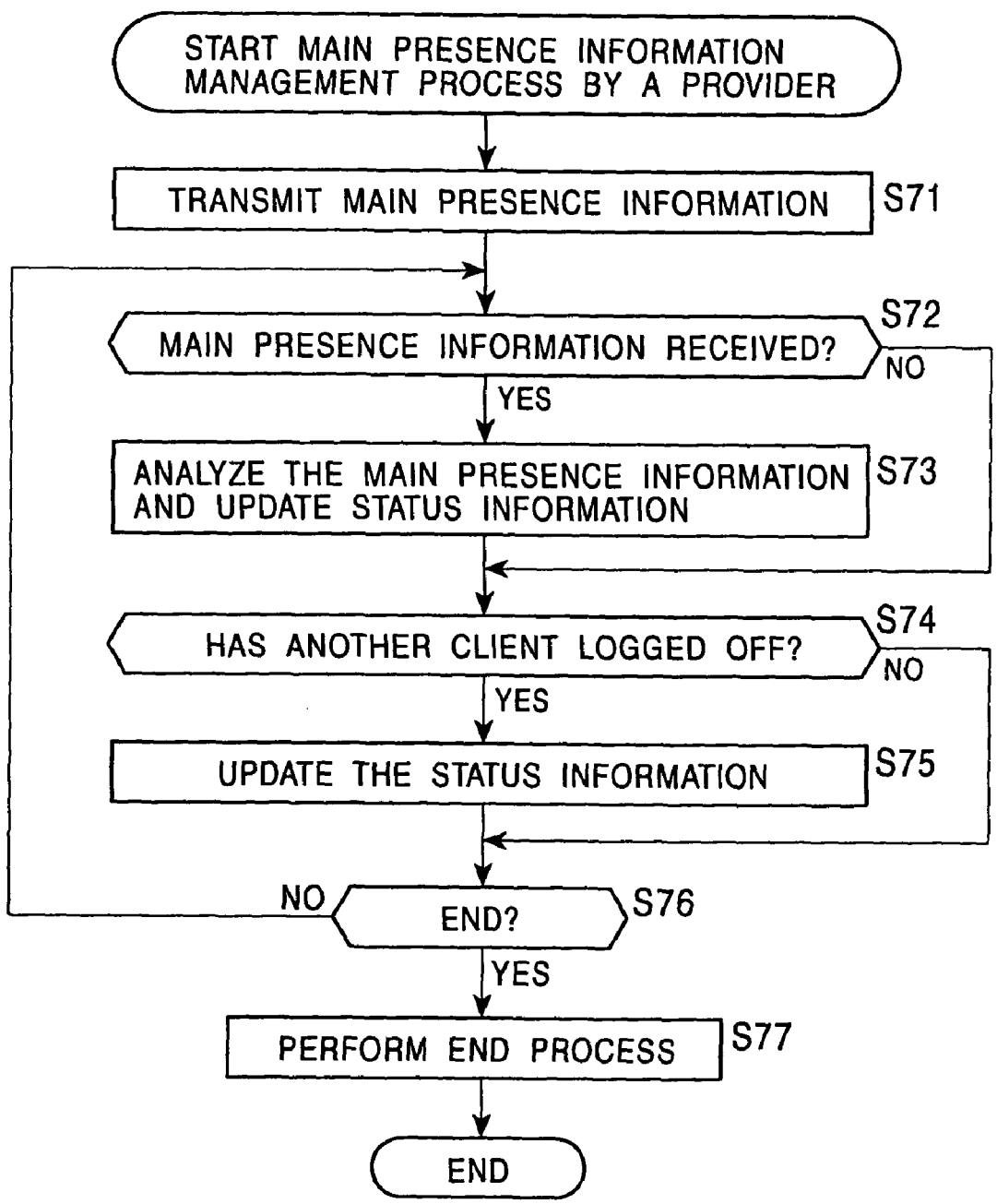
FIG. 19 is a flow chart showing a process of managing main presence information, performed by a provider.

If the client 32 acting as the provider shown in FIG. 4 logs in to the instant message communication service, the client 32 performs the main presence management process as shown in the flow chart shown in FIG. 19.

First, in step S71, the CPU 101 of the client 32 reads the main presence information stored in advance in the RAM 103 or the storage unit 123 and supplies it to the server 31 via the communication unit 124 and the network 35.

The server 31 manages the received main presence information as information associated with A@imsg (client 32) and supplies it to B@imsg (client 33) and C@imsg (client 34) which have already logged in and which are specified as friends (to have communication with) of A@imsg, as will be described in further detail later.

The server 31 has main presence information associated with B@imsg and C@imsg received from B@imsg and C@imsg and supplies those pieces of information to A@imsg. When a new friend of A@imsg logs in, the server 31 supplies main information associated with that friend to A@imsg.

In step S72, the CPU 101 controls the communication unit 124 to determine whether the main presence information transmitted from the server 31 has been acquired. If it is determined that the main presence information has been acquired, the CPU 101 analyzes the acquired main presence information and updates the status information stored in the RAM 103 and indicating the statuses of B@imsg and C@imsg specified as friends. Thereafter, the CPU 101 advances the process to step S74.

However, if it is determined in step S72 that the main presence information has not been acquired, the CPU 101 advances the process to step S74 without performing step S73.

If a client logs off, the server 31 informs relating clients that the client has logged off.

In step S74, the CPU 101 controls the communication unit 124 to determines whether the information indicating that the client has logged off has been received from the server 31, thereby determining whether the client has logged off. If it is determined that the client has logged off, then, in step S75, the CPU 101 updates the status information in accordance with the received information. Thereafter, the CPU 101 advances the process to step S76.

However, if it is determined in step S74 that any other client has not yet logged off, the CPU 101 advances the process to step S76 without performing step S75.

In step S76, the CPU 101 determines whether to end the presence information management process in response to a command issued by a user. If it is determined that the process should not be ended, the CPU 101 returns the process to step S72 to repeat step S72 and following steps.

On the other hand, if it is determined that the main presence information management process should be ended to log off or for any other reason, the CPU 101 advances the process to step S77 in which the CPU 101 performs an end process to complete the main presence information management process.

That is, after the client acting as the provider logs in to the instant message communication service, the CPU 101 of the provider controls the communication unit 124 to supply main presence information to the server 31, and the CPU 101 retains status information associated with other clients until the provider logs off. When main presence information is received or when another client which is a friend of the provider logs off, the CPU 101 updates the status information associated with that client.

Now, referring to a flow chart shown in FIG. 20, a process performed by the provider to manage registration is described below.

If a consumer acquires main presence information associated with the provider, the consumer transmits a registration request to the provider in accordance with a command issued by a user of the consumer, as will be described in further detail later.

In step S91, the CPU 101 of the client 32 acting as the provider controls the communication unit 124 to determine whether the registration request has been received from the consumer. If it is determined that the registration request has been received, then, in step S92, the CPU 101 determines whether to accept the registration request. If it is determined to accept the registration request, the CPU 101 advances the process to step S93. In step S93, the CPU 101 updates the registration information which is stored in the RAM 103 and which is used in management of registration. In step S94, the CPU 101 controls the communication unit 124 to return a response message to the consumer which is the issuer of the registration request to inform that registration has been made. Thereafter, the CPU 101 advances the process to step S96.

If it is determined in step S92 that the registration request should not be accepted, then, in step S95, the CPU 101 returns a rejection response to the consumer which is the issuer of the registration request to inform that the registration request has been rejected. Thereafter, the CPU 101 advances the process to step S96.

If it is determined in step S91 that the registration request has not been received, the CPU 101 advances the process to step S96 without performing the above-described steps.

In step S96, the CPU 101 controls the communication unit 124 to determine whether consumer sub-presence information has been received from a consumer. When a change in the status of a consumer occurs, the consumer updates consumer sub-presence information and transmits the updated consumer sub-presence information to the provider.

If it is determined that consumer sub-presence information has been received, then, in step S97, the CPU 101 updates the registration information in accordance with the received information. Thereafter, the CPU 101 advances the process to step S98.

However, if it is determined in step S96 that the consumer sub-presence information has not been acquired, the CPU 101 advances the process to step S98 without performing step S97.

In step S98, the CPU 101 controls the communication unit 124 to determines whether a deregistration request has been received. When a consumer wants to cancel the registration at the provider, the consumer sends a deregistration request to the provider.

If it is determined that a deregistration request has been received, then, in step S99, the CPU 101 updates the registration information in accordance with the received deregistration request. In step S100, the CPU 101 returns a response message to the consumer which is the issuer of the deregistration request to inform that the registration has been cancelled. After completion of step S100, the CPU 101 advances the process to step S101.

However, if it is determined in step S98 that the deregistration request has not been received, the CPU 101 advances the process to step S101 without performing steps S99 and S100.

In step S101, the CPU 101 controls the communication unit 124 to determine whether a consumer has logged off, on the basis of information supplied from the server 31. If it is determined that a consumer has logged off, then, in step S102, the CPU 101 updates the registration information. Thereafter, the CPU 101 advances the process to step S103.

However, if it is determined in step S101 that no consumer has logged off, the CPU 101 advances the process to step S103 without performing step S102.

In step S103, the CPU 101 determines whether to end the registration management process. If it is determined that the registration management process should not be ended, the CPU 101 returns the process to step S91 to repeat step S91 and following steps.

On the other hand, if it is determined, in step S103, that the registration management process should be ended, in accordance with a command issued by a user, the CPU 101 advances the process to step S104 in which the CPU 101 performs an end process to complete the registration management process.

Figure 21:
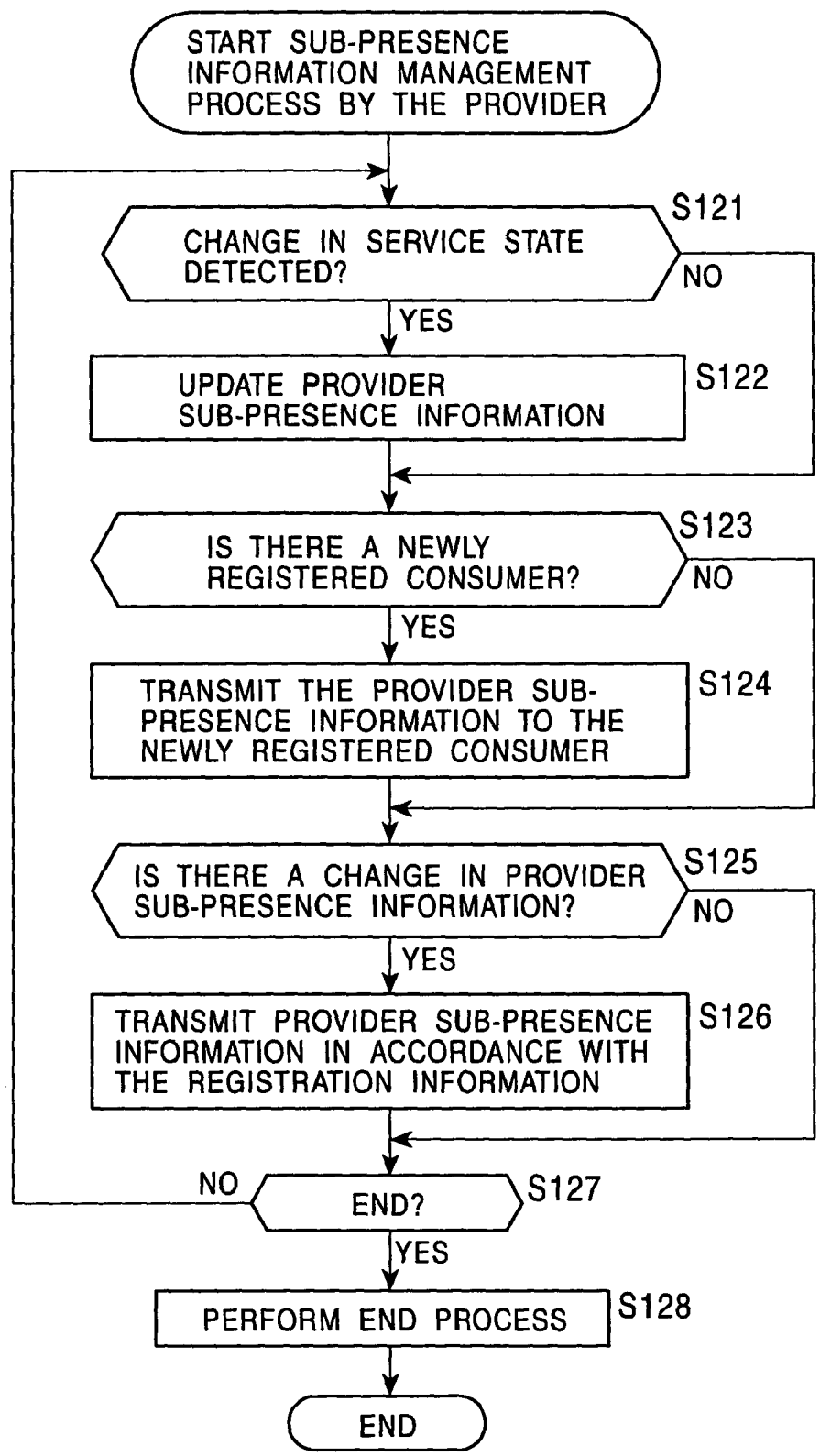
FIG. 21 is a flow chart showing a process of managing sub-presence information, performed by the provider.

Now, referring to a flow chart shown in FIG. 21, a process performed by the provider to manage sub-presence information is described.

First, in step S121, the CPU 101 of the client 32 acting as the provider controls the MPEG-4 streaming transmission processor 42-1 and the MPEG-2 streaming transmission processor 42-2 to detect a change in the service status. If a change in the service status is detected as a result of, for example, starting communication using the MPEG-4 streaming transmission capability 42-1, then, in step S122, the CPU 101 updates the provider sub-presence information such that the detected change in the service status is reflected in the provider sub-presence information. Thereafter, the CPU 101 advances the process to step S123.

However, if no change in the service status is detected in step S121, the CPU 101 advances the process to step S123 without performing step S122.

In step S123, the CPU 101 determines, on the basis of the registration information, whether there is a consumer which has been newly registered. If it is determined that there is such a consumer, then, in step S124, the CPU 101 supplies provider sub-presence information to the newly registered consumer. Thereafter, the CPU 101 advances the process to step S125.

However, if it is determined in step S123 that there is no newly registered consumer, the CPU 101 advances the process to step S125 without performing step S124.

In step S125, the CPU 101 determines whether a change has occurred in provider sub-presence information, which may occur, for example, when step S122 is performed. If a change is detected, then, in step S126, the CPU 101 supplies the provider sub-presence information in accordance with the registration information. Thereafter, the CPU 101 advances the process to step S127.

However, if it is determined in step S125 that no change in the provider sub-presence information has occurred, the CPU 101 advances the process to step S127 without performing step S126.

In step S127, the CPU 101 determines whether to end the sub-presence information management process. If it is determined that the process should not be ended, the CPU 101 returns the process to step S121 to repeat step S121 and following steps.

On the other hand, if it is determined in step S127 in accordance with a command issued by a user that the sub-presence information management process should be ended, the CPU 101 advances the process to step S128 in which the CPU 101 performs an end process to complete the sub-presence information management process.

In the manner described above, the provider manages the presence information 301 shown in FIG. 18 and makes registration of consumers, whereby the provider informs consumers of the capability of the provider, without having to transmit redundant information, as will be described in further detail later.

A process performed by a consumer to manage presence information is described below, wherein this process corresponds to the above-described process performed by the provider.

Figure 22:
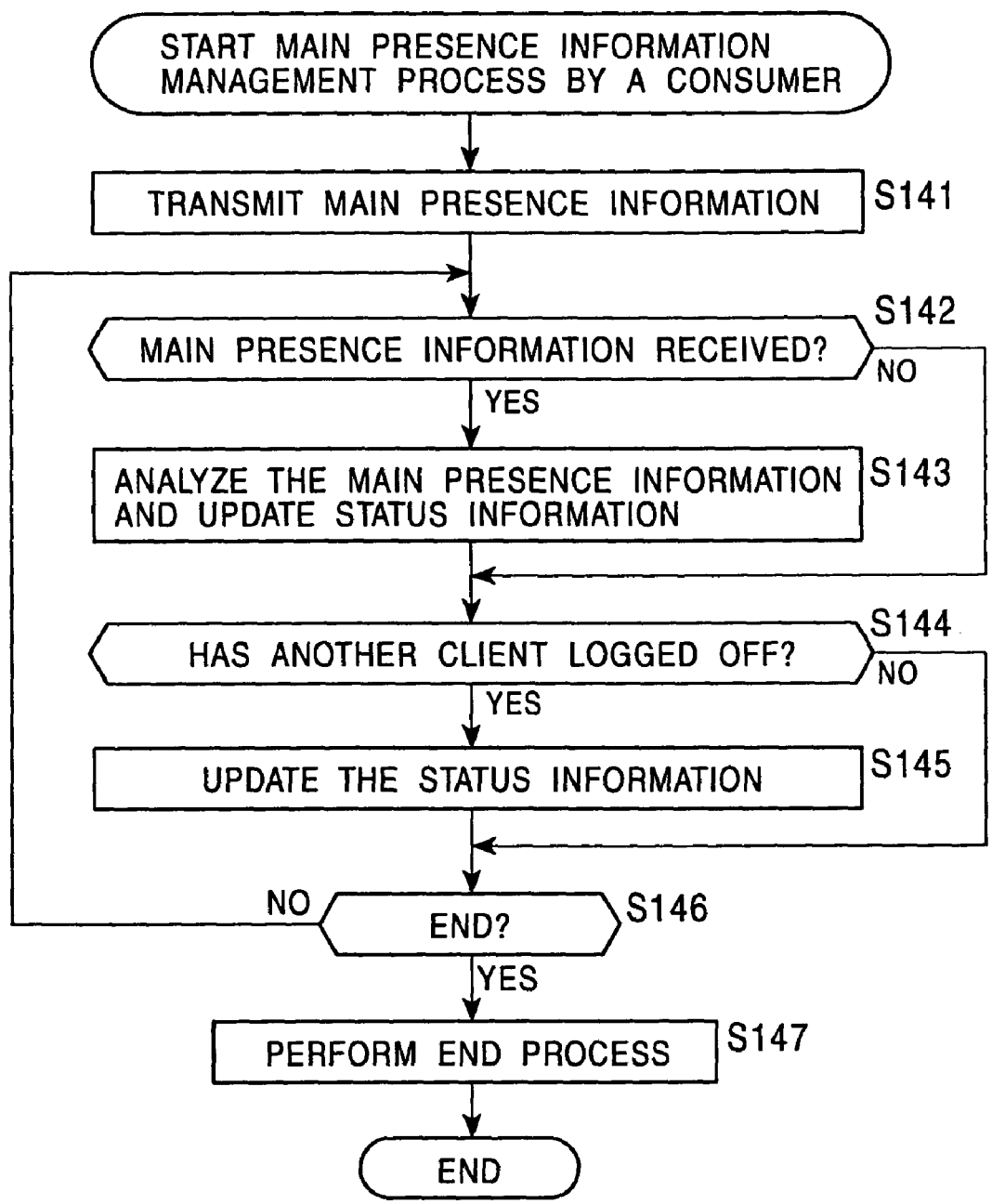
FIG. 22 is a flow chart showing a process of managing main presence information, performed by a consumer.

First, referring to a flow chart shown in FIG. 22, a process performed by a consumer to manage main presence information is described. Herein, it is assumed, by way of example, that the consumer is the client 33 shown in FIG. 4.

If the client 33 acting as a consumer logs in to the instant message communication service provided by the server 31, the CPU 151 of the client 33 supplies main presence information stored in the RAM 153 or the storage unit 173 to the server 31 via the communication unit 174 and the network 35.

The server 31 manages the received main presence information as information associated with B@imsg (client 33). In accordance with a friend list registered in advance, the server 31 supplies the main presence information to A@imsg (client 32) specified as a friend of B@imsg. The server 31 also has main presence information associated with A@imsg received from A@imsg, and the server 31 supplies it to B@imsg.

In step S142, the CPU 151 of the client 33 controls the communication unit 174 to determines whether the main presence information transmitted from the server 31 has been acquired.

If it is determined that the main presence information has been received, then, in step S143, the CPU 151 the CPU 101 analyzes the acquired main presence information and updates the status information stored in the RAM 153 and indicating the statuses of other clients. Thereafter, the CPU 151 advances the process to step S144.

However, if it is determined in step S142 that the main presence information has not been acquired, the CPU 151 advances the process to step S144 without performing step S143.

In step S144, the CPU 151 controls the communication unit 174 to determine whether another client has logged off, on the basis of information supplied from the server 31.

If it is determined that another client has logged off, then, in step S145, the CPU 151 updates the status information such that the logoff is reflected in the status information. Thereafter, the CPU 151 advances the process to step S146.

However, if it is determined in step S144 that the other client has not yet logged off, the CPU 151 advances the process to step S146 without performing step S145.

In step S146, the CPU 151 determines whether to end the main presence information management process. If it is determined that the process should not be ended, the CPU 151 returns the process to step S141 to repeat step S141 and following steps.

On the other hand, if it is determined, in accordance with a command issued by a user, that the main presence information management process should be ended, the CPU 151 advances the process to step S147 in which the CPU 151 performs an end process to complete the main presence information management process.

Now, referring to a flow chart shown in FIG. 23, a process performed by a consumer to manage registration is described below.

In step S161, the CPU 151 of the client 33 acting as the consumer controls the communication unit 174 to determine whether the provider sub-presence information transmitted from the client 32 acting as the provider has been received.

If it is determined that the provider sub-presence information has been received, then, in step S162, the CPU 151 updates the registration information stored in the RAM 153, in accordance with the provider sub-presence information. Thereafter, the CPU 151 advances the process to step S163.

However, if it is determined in step S161 that the provider sub-presence information has not been received, the CPU 151 advances the process to step S163 without performing step S162.

In step S163, the CPU 151 determines, on the basis of the registration information, whether to send a registration request to the client 32 acting as the provider.

In the case in which the registration of the client 33 has not yet been made and thus it is determined that the registration request should be sent in accordance with a command issued by a user, the CPU 151 advances the process to step S164 in which the CPU 151 controls the communication unit 174 to send the registration request to the client 32 acting as the provider. The registration request sent herein is received by the client 32 in step S91 in FIG. 20. After completion of sending the registration request, the CPU 151 advances the process to step S165.

However, if it is determined in step S163 that the registration request is not to be issued, because the registration has already been made or for any other reason, the CPU 151 advances the process to step S165 without performing step S164.

In step S165, the CPU 151 determines whether to send a deregistration request in accordance with a command issued by the user. If it is determined to send the deregistration request, the CPU 151 advances the process to step S166. In step S166, the CPU 151 controls the communication unit 174 to send the deregistration request to the client 32 acting as the provider. Thereafter, the CPU 151 advances the process to step S167.

However, if it is determined in step S165 that the deregistration request should not be issued, the CPU 151 advances the process to step S167 without performing step S166.

In step S167, the CPU 151 determines whether to end the registration management process in accordance with a command issued by a user. If it is determined that the process should not be ended, the CPU 151 returns the process to step S161 to repeat step S161 and following steps.

On the other hand, if it is determined that the registration management process should be ended, the CPU 151 advances the process to step S178 in which the CPU 151 performs an end process to complete the registration management process.

Figure 24:
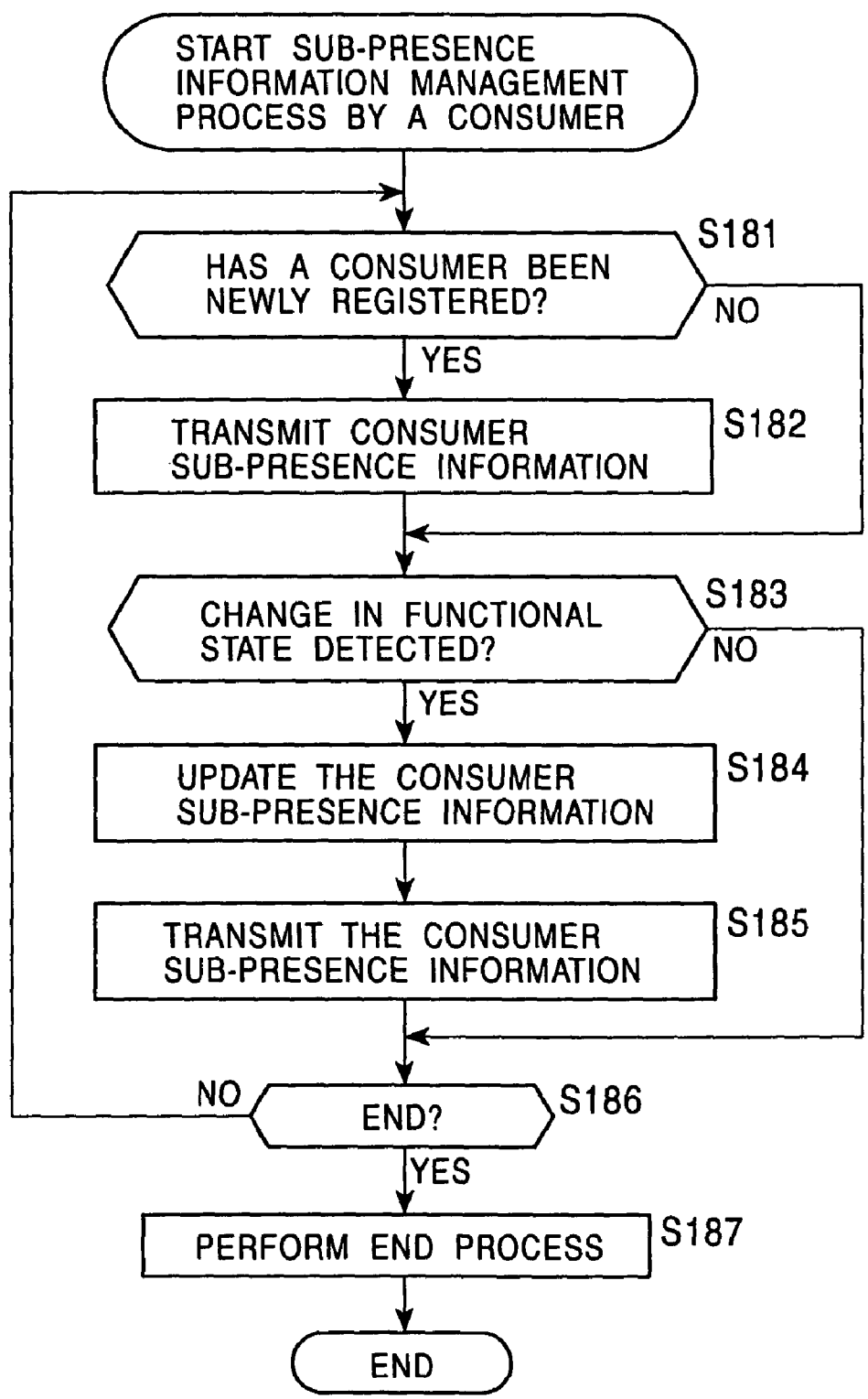
FIG. 24 is a flow chart showing a process of managing sub-presence information, performed by a consumer.

Now, referring to a flow chart shown in FIG. 24, a process performed by a consumer to manage sub-presence information is described.

In step S181, the CPU 151 of the client 33 acting as a consumer determines, on the basis of the registration information, whether the registration associated with the client 33 has been newly performed by the provider. If it is determined that the registration has been made, the CPU 151 advances the process to step S182. In step S182, the CPU 151 controls the communication unit 174 to transmit the consumer sub-presence information to the provider. Thereafter, the CPU 151 advances the process to step S183.

However, if it is determined in step S181 that no new registration has been performed, the CPU 151 advances the process to step S183 without performing step S182.

In step S183, the CPU 151 controls the MPEG-4 streaming reception processor 43-1 and the MPEG-2 streaming reception processor 43-2 to determine whether a change in capability status has occurred.

If a change in capability status is detected, which may occur, for example, when transmission using a capability is started, the CPU 151 advances the process to step S184. In step S184, the CPU 151 updates the consumer sub-presence information. In step S185, the CPU 151 transmits the updated consumer sub-presence information to the provider at which the client 33 is registered. Thereafter, the CPU 151 advances the process to step S186.

However, if no change in status is detected in step S183, the CPU 151 advances the process to step S186 without performing steps S184 and S185.

In step S186, the CPU 151 determines whether to end the sub-presence information management process. If it is determined that the process should not be ended, the CPU 181 returns the process to step S181 to repeat step S181 and following steps.

On the other hand, if it is determined that the sub-presence information management process should be ended, the CPU 151 advances the process to step S187 in which the CPU 151 performs an end process to complete the sub-presence information management process.

In the manner described above, the consumer manages the presence information 301 shown in FIG. 18.

For example, when B@imsg (client 33) and C@imsg (client 34) have already logged in to the instant message communication service in the system shown in FIG. 4, if A@imsg (client 32) further logs in, then presence information is processed as described below.

Figure 25:
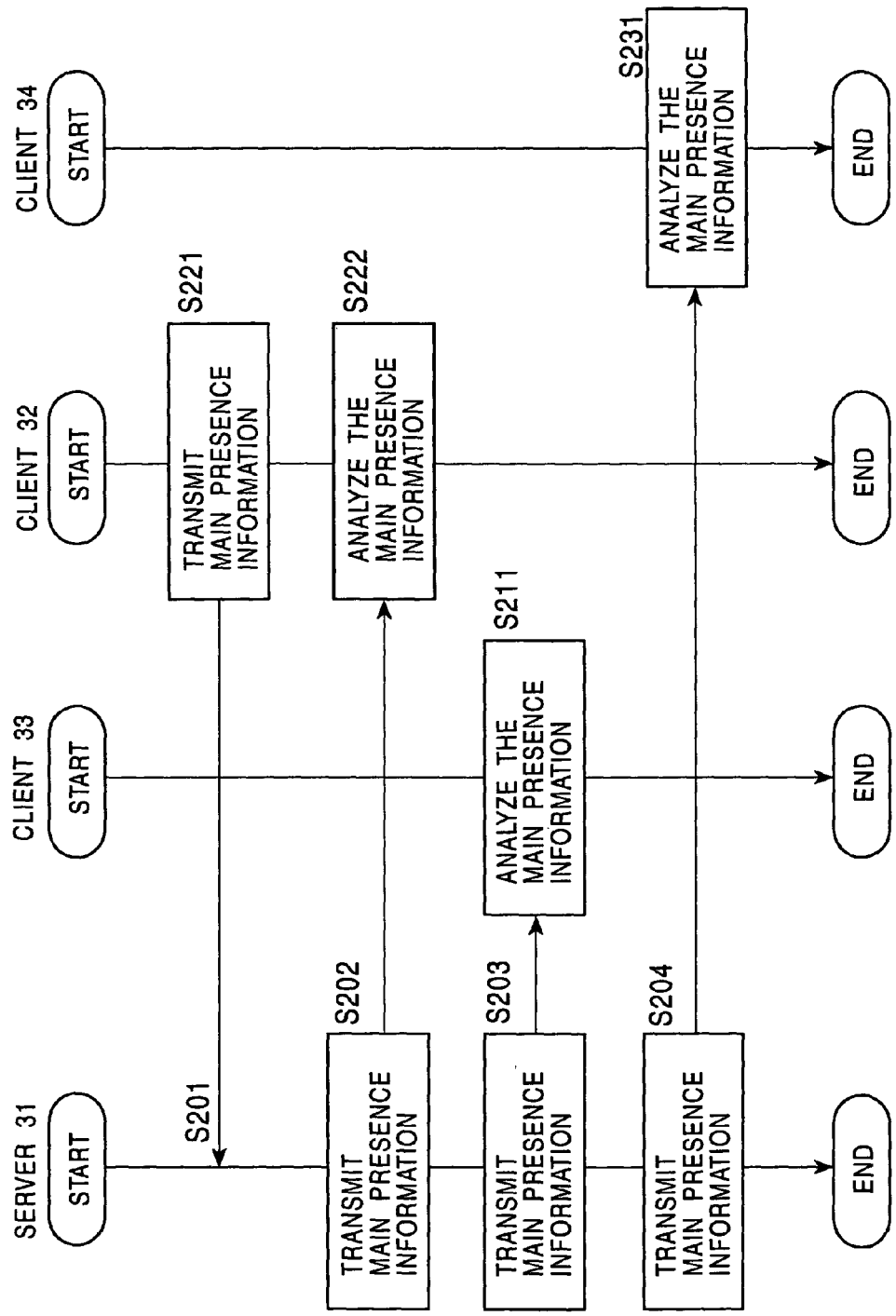
FIG. 25 is a timing chart showing a flow of a process of transmitting and receiving main presence information.

First, referring to a timing chart shown in FIG. 25, a process of transmitting and receiving main presence information is described. In the following description, FIGS. 26 and 27 will also be referred to as required.

If the client 32 logs in to the instant message communication service, the client 32 sends, in step S221, main presence information to the server 31.

If the server 31 receives the main presence information in step S201, the server 31 stores it and manages it. In step S202, the server 31 supplies the main presence information associated with B@imsg (client 33) and C@imsg (client 34) specified as friends of A@imsg (client 32) to A@imsg.

In step S222, the client 32 analyzes the received main presence information associated with B@imsg and C@imsg and updates the status information. The updated status information is retained by the client 32.

In step S203, the server 31 transmits the main presence information associated with A@imsg to B@imsg specified a friend of A@imsg. In step S211, the client 33 receives the main presence information transmitted from the server 31 and analyzes it. In accordance with the result of the analysis, the client 33 updates the status information and stores it.

Similarly, in step S204, the server 31 transmits main presence information associated with A@imsg to C@imsg specified as a friend of A@imsg. In step S231, the client 34 receives the main presence information transmitted from the server 31 and analyzes it. In accordance with the result of the analysis, the client 34 updates the status information and stores it.

Figure 26:
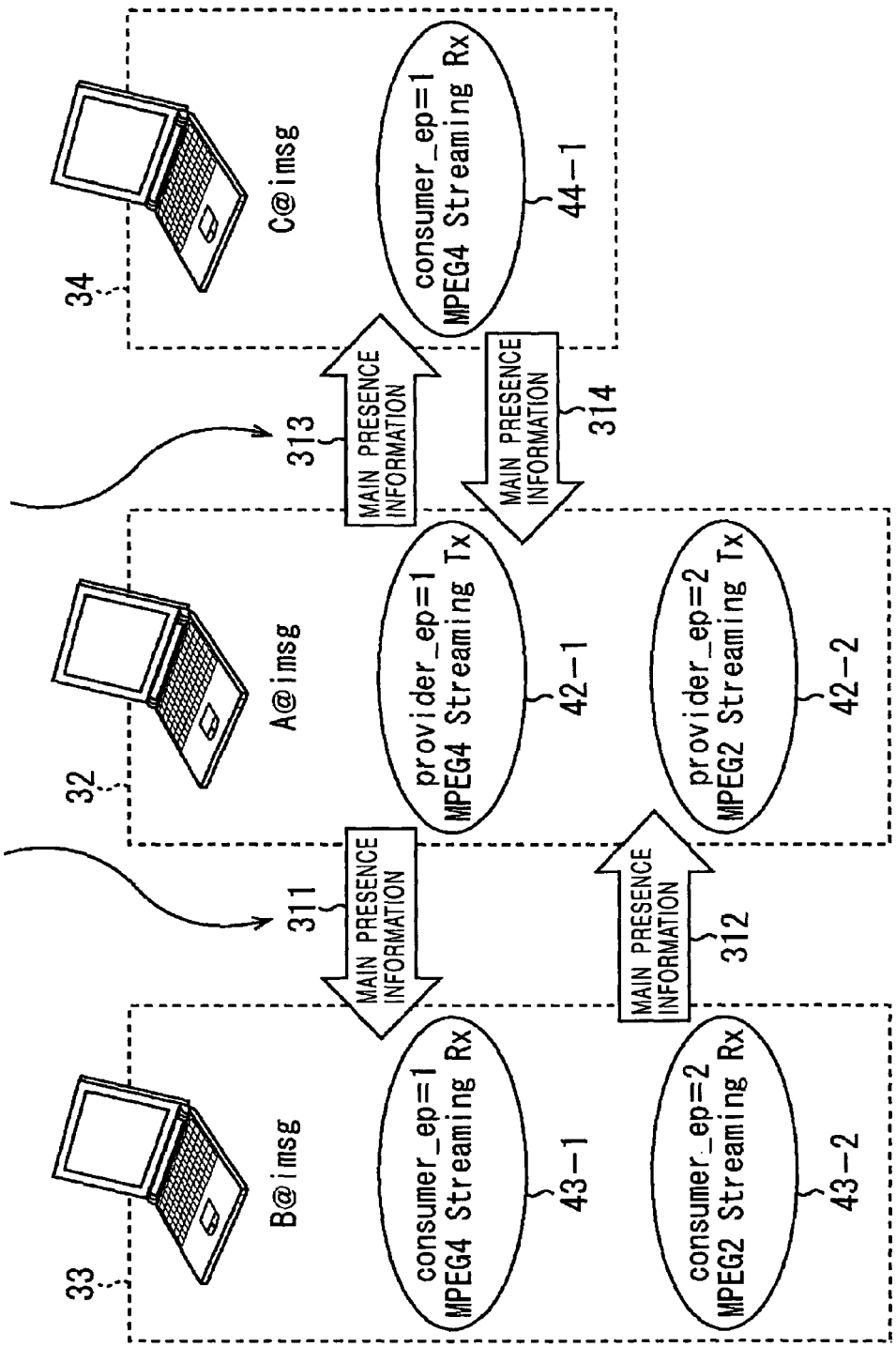
FIG. 26 is a diagram showing a manner in which main presence information is transmitted among clients.

That is, as shown in FIG. 26, when A@imsg (client 32) logs on, A@imsg supplies, via the server 31, main presence information including the status information associated with A@imsg and information associated with the capability of A@imsg to B@imsg (client 33) and C@imsg (client 34) which are friends of A@imsg and which have already logged in (as represented by arrows 311 and 313).

FIG. 27 shows an example of main presence information supplied in step S221 in FIG. 25 from the client 32 to the server 31.

In the example shown in FIG. 27, the main presence information (described between a tag <presence> and a tag </presence>) includes information associated with the status of the client 32 (described between a tag <status> and a tag </status>) and information associated with the capability that the client 32 has (described between a tag <service> and a tag </service>).

In the specific example shown in FIG. 27, A@imsg (client 32) is in a status "on line" and has MPEG-4 streaming transmission capability 42-1 as "provider_ep=1" and MPEG-2 streaming transmission capability 42-2 as "provider_ep=2".

As described above, the server 31 manages main presence information and supplies it to clients as required.

Figure 28:
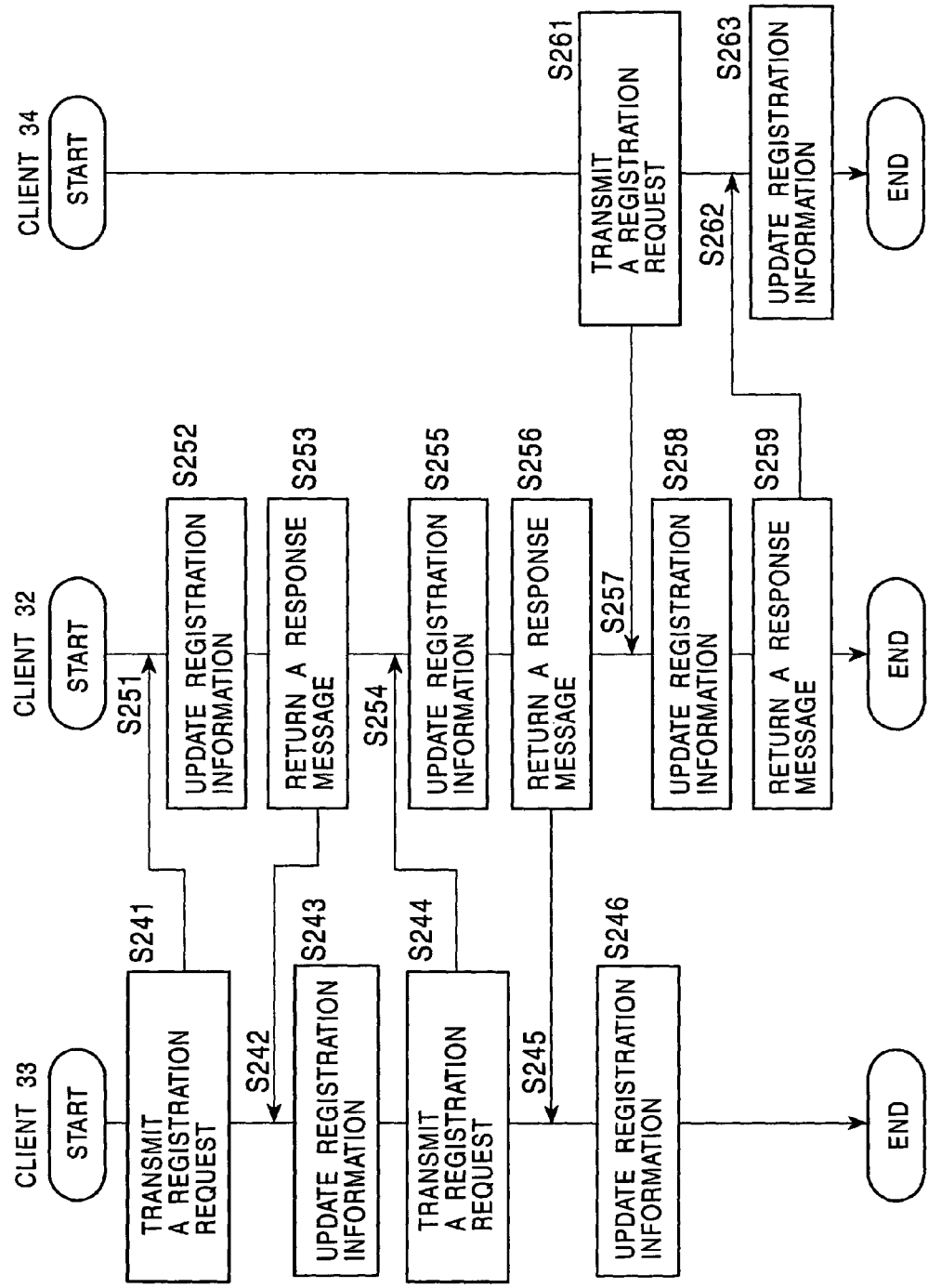
FIG. 28 is a timing chart showing a flow of a process of making registration.

Now, referring to a timing chart shown in FIG. 28, a process performed by the client 32 acting as the provider to register the capabilities of the clients 33 and 34 acting as consumers.

In step S241, after completion of analyzing the main presence information associated with the client 32, the client 33 sends, in response to a command issued by a user, a request for registration in relation to the MPEG-4 streaming transmission capability 42-1 of the client 32 to the client 32.

If the client 32 receives the registration request in step S251, then, in step S252, the client 32 updates the registration information so as to make requested registration. In step S253, the client 32 returns a response message to the client 33.

If the client 33 receives the response message in step S242, then, in step S243, the client 33 updates the registration information.

Note that registration is performed in a similar manner for each capability of the client 32. Thus, for example, the client 33 may further issue a request for registration in relation to the MPEG-2 streaming transmission capability 42-2 of the client 32.

In this case, in step S244, the client 33 further sends a registration request to the client 32. If the client 32 receives this registration request in step S254, then, in step S255, the client 32 updates the registration information. In step S256, the client 32 returns a response message to the client 33 to inform that requested registration has been made.

If the client 33 receives the response message in step S245, the client 33 updates the registration information in accordance with the response message.

As described above, the client 32 can make registration associated with the client 33 for each capability of the client 32.

The client 32 can also make registration for the client 34 in a similar manner to the manner in which registration for the client 33 is made.

That is, in step S261, the client 34 sends a request for registration in relation to the MPEG-4 streaming transmission capability 42-1 of the client 32 to the client 32.

If the client 32 receives the request in step S257, then, in step S258, the client 32 updates the registration information. In step S259, the client 32 returns a response message to the client 34.

If the client 34 receives this registration request in step S262, then, in step S263, the client 34 updates the registration information.

As described above, the client 32 can make registration of each client specified as a friend of the client for each capability of the client 32.

Figure 29:
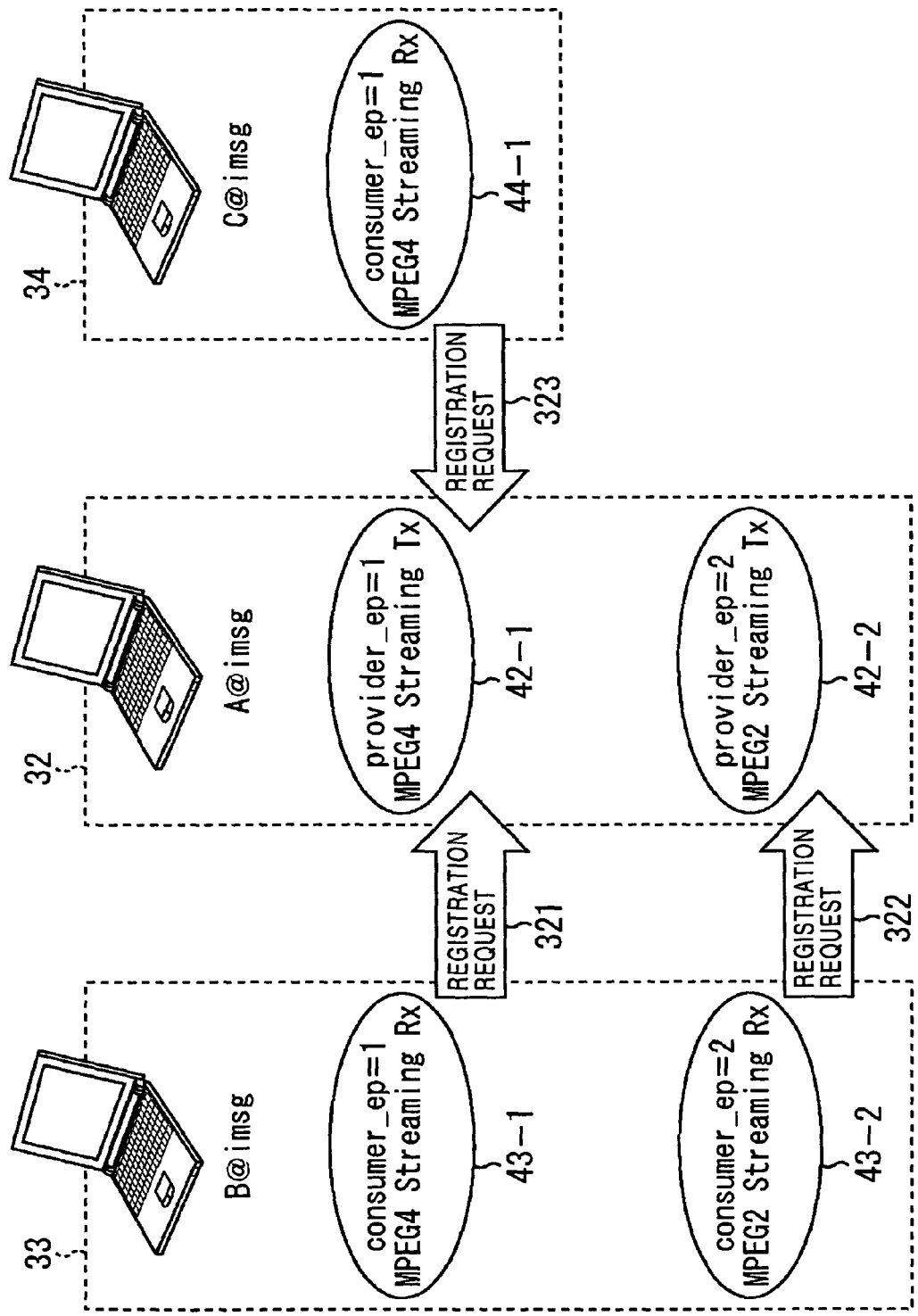
FIG. 29 is a diagram showing a manner in which a consumer sends a registration request to a provider.

FIG. 29 shows an example of a manner in which the client 32 makes registration of the clients 33 and 34 for each capability of the client 32.

As shown in FIG. 29, on the basis of the main presence information associated with the client 32, the clients 33 and 34 send a request for registration in relation to each capability of the client 32 (as represented by arrows 321 to 323).

FIGS. 30 to 32 show examples of registration requests issued by the clients 33 and 34.

In the example shown in FIG. 30, the registration request is addressed to "A@imsg" (client 32) to request that "consumer_ep=1" (MPEG-4 streaming reception capability 43-1) of B@imsg (client 33) be registered in relation to "provider_ep=1" (MPEG-4 streaming transmission capability 42-1) of A@imsg.

In the example shown in FIG. 31, the registration request is addressed to "A@imsg" to request that "consumer_ep=2" (MPEG-2 streaming reception capability 43-2) of B@imsg be registered in relation to "provider_ep=2" (MPEG-2 streaming transmission capability 42-2) of A@imsg.

In the example shown in FIG. 32, the registration request is addressed to "A@imsg" to request that "consumer_ep=1" (MPEG-4 streaming reception capability 44-1) of C@imsg be registered in relation to "provider_ep=1" (MPEG-4 streaming transmission capability 42-1) of A@imsg.

FIGS. 33A to 33D show examples of response messages returned from the client 32 when a registration request is accepted.

In the case in which the client 32 determines to accept the registration request shown in FIG. 30, the client 32 updates the registration information and returns a response message such as that shown in FIG. 33A to B@imsg (client 33) which is the issuer of the registration request.

In the case, the client 32 makes registration in response to the registration request shown in FIG. 31, a response message such as that shown in FIG. 33B is returned to B@imsg (client 33) which is the issuer of the request.

In the case, the client 32 makes registration in response to the registration request shown in FIG. 32, a response message such as that shown in FIG. 33C is returned to C@imsg (client 34) which is the issuer of the request.

When the client 32 receives a registration request, the client 32 may reject it. For example, when the registration request shown in FIG. 32 is received, if the client 32 determines to reject to registration request, the client 32 returns a response message such as that shown in FIG. 33D to the issuer of the request, that is, C@imsg.

By performing registration in the above-described manner, the client 32 acting as the provider can know which capability of each of clients 33 and 34 acting as consumers can be used in conjunction with some of the capabilities that the client 32 has.

Figure 34A:
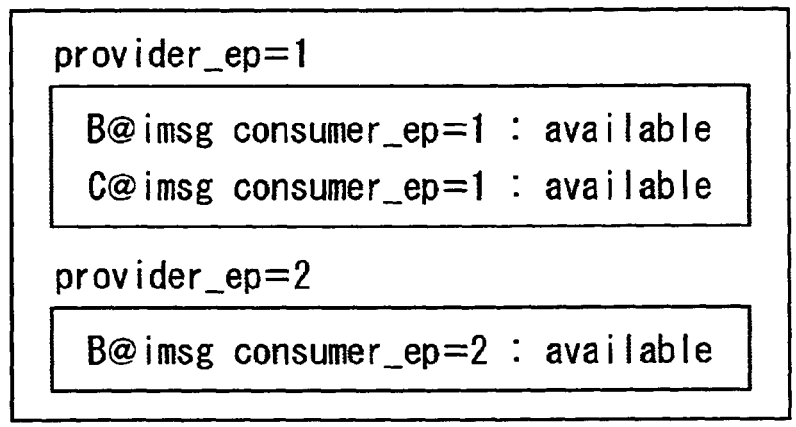
FIGS. 34A to 34C are diagrams showing examples of registration information managed by respective clients.
Figure 34B:
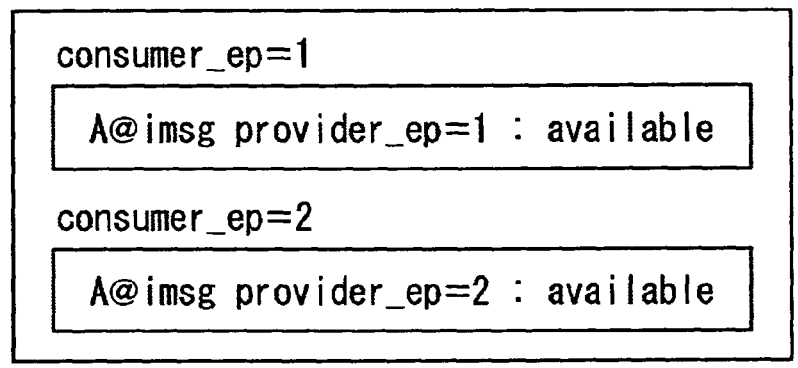
Figure 34C:
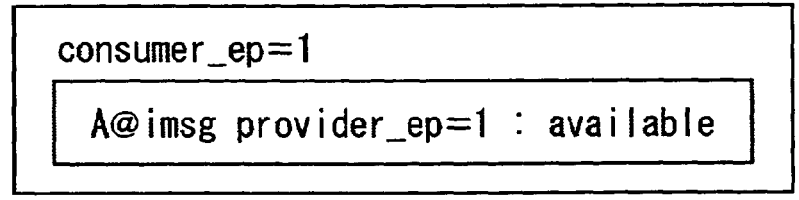

FIGS. 34A to 34C show examples of registration information managed by respective clients.

FIG. 34A shows an example of registration information managed by the client 32 acting as the provider. FIG. 34B shows an example of registration information managed by the client 33 acting as a consumer. FIG. 34C shows an example of registration information managed by the client 33 acting as a consumer. In any example, registered capabilities of consumers and the statuses thereof are managed on a capability-by-capability basis. The status of each capability is informed via sub-presence information, as will be described in detail later.

Any registration made by the provider in response to a consumer (client 33 or 34) can be cancelled in response to a deregistration request. For example, when the client 34 wants to cancel the registration made at the client 32, the client 34 sends a deregistration request such as that shown in FIG. 35A to the client 32.

In the example shown in FIG. 35A, the deregistration request is addressed to A@imsg (client 32) to request that consumer_ep=1" (MPEG-4 streaming reception capability 44-1) of C@imsg (client 34) registered in relation to "provider_ep=1" (MPEG-4 streaming transmission capability 42-1) of A@imsg be cancelled.

In accordance with the deregistration request, the client 32 updates the registration information such that the specified item of the registration is cancelled, and the client 32 returns a response message such as that shown in FIG. 35B to C@imsg (client 34).

If the provider (client 32) logs off, all registrations are cancelled and main presence information such as that shown in FIG. 35C is sent to consumers (clients 33 and 34).

When registration associated with some capability is made and thus registration information is updated in the above-described manner, the status of the capability is informed among relating clients by transmitting sub-presence information.

Figure 37:
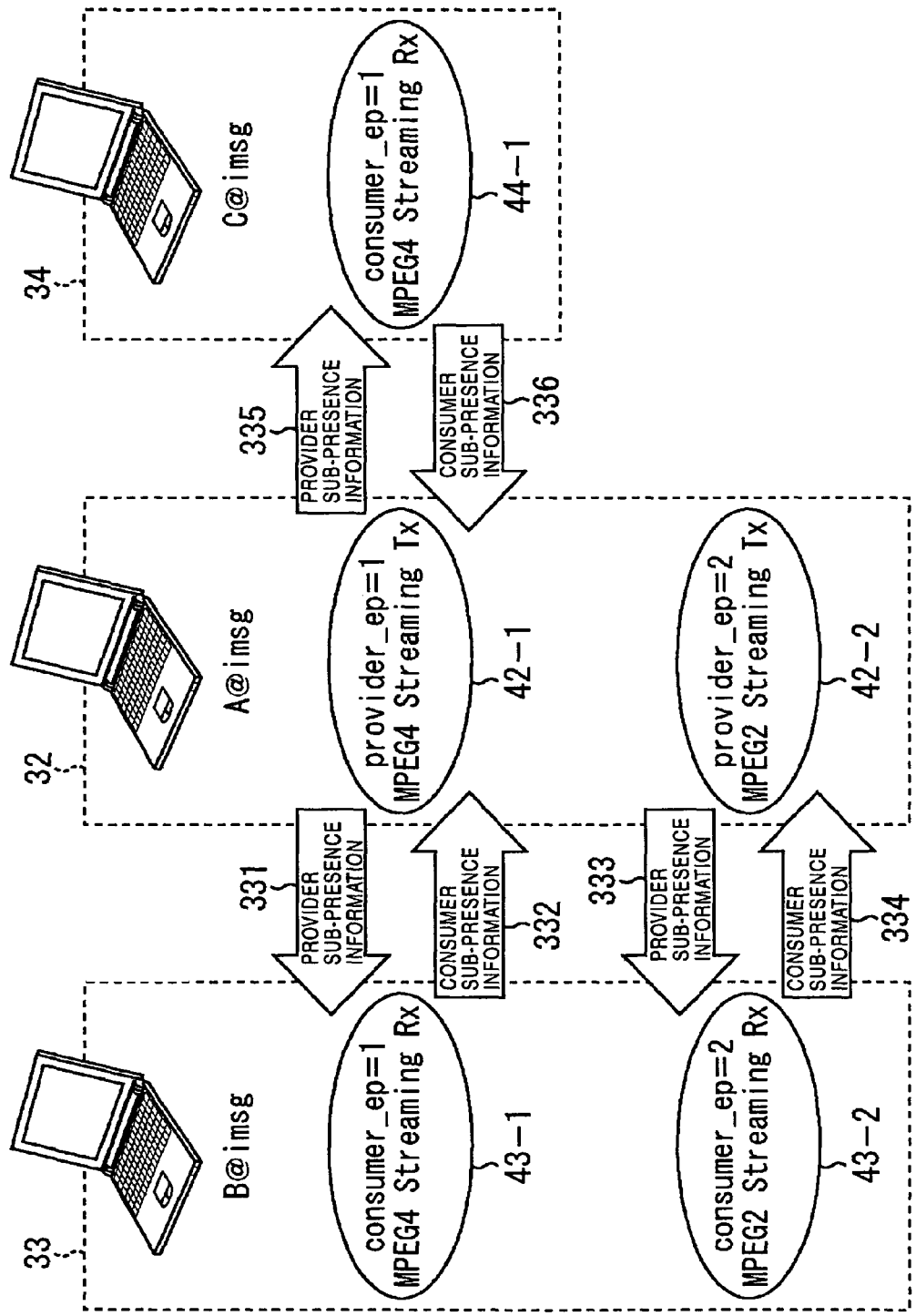
FIG. 37 is a diagram showing a manner in which sub-presence information is transmitted among clients.

Referring mainly to a timing chart shown in FIG. 36 and also referring to FIGS. 37 and 40 as required, a process of transmitting and receiving sub-presence information is described.

If the client 32 makes some registration, then, in step S291, the client 32 transmits provider sub-presence information 304A associated with the MPEG-4 streaming transmission capability 42-1 in a data format such as that shown in FIG. 38 to registered clients 33 (as represented by an arrow 331 in FIG. 37).

In the sub-presence information 303, the status of a capability is described between a tag <show> and a tag </show>. In the specific example shown in FIG. 38, the information type is "provider" and the information is addressed to "B@imsg" (client 33), wherein the information indicates that "provider_ep=1" (MPEG-4 streaming transmission capability 42-1) of A@imsg (client 32) is in a status "available".

If the client 33 receives this provider sub-presence information 304A in step S281 shown in FIG. 36, then, in step S282, the client 33 updates the registration information.

In step S283, the client 33 sends consumer sub-presence information 305A associated with the MPEG-4 streaming reception capability 43-1 to the client 32 (as represented by an arrow 332 in FIG. 37). If the client 32 receives this information in step S292, then, in step S293, the client 32 updates the registration information.

Thereafter, in step S294, the client 32 sends (as represented by an arrow 333 in FIG. 37) provider sub-presence information 304B associated with the MPEG-2 streaming transmission capability 42-2 in a data format such as that shown in FIG. 39. If the client 33 receives this information in step S284, then, in step S285, the client 33 updates the registration information.

In the example shown in FIG. 39, the information type is "provider" and the information is addressed to "B@imsg" (client 33), wherein the information indicates that "provider_ep=2" (MPEG-2 streaming transmission capability 42-2) of A@imsg (client 32) is in a status "available".

In step S286 in FIG. 36, the client 33 sends consumer sub-presence information 305B associated with the MPEG-2 streaming reception capability 43-2 (as represented by an arrow 334 in FIG. 37). If the client 32 receives this information in step S295, then, in step S296, the client 32 updates the registration information.

Similarly, in step S294, the client 32 also sends (as represented by an arrow 335 in FIG. 37) provider sub-presence information 304A associated with the MPEG-4 streaming transmission capability 42-1 in a data format such as that shown in FIG. 40 to a registered client 34. If the client 34 receives this information in step S301, then, in step S302, the client 34 updates the registration information.

In the example shown in FIG. 40, the information type is "provider" and the information is addressed to "C@imsg" (client 34), wherein the information indicates that "provider_ep=1" (MPEG-4 streaming transmission capability 42-1) of A@imsg (client 32) is in a status "available".

In step S303, the client 34 sends (as represented by an arrow 336) consumer sub-presence information 305A associated with the MPEG-4 streaming reception capability 44-1. If the client 32 receives this information in step S298, then, in step S299, the client 32 updates the registration information.

As described above, the client 32 acting as the provider supplies each provider sub-presence information 304 to clients 33 and 34 acting as consumers in accordance with the registration information, while the clients 33 and 34 acting as consumers supply consumer sub-presence information to the client 32 acting as the provider in accordance with the registration information.

This allows the respective clients to obtain information indicating the status of capabilities of friends registered.

When a change occurs in the capability of a client, the client supplies sub-presence information to inform that the change has occurred.

Figure 41:
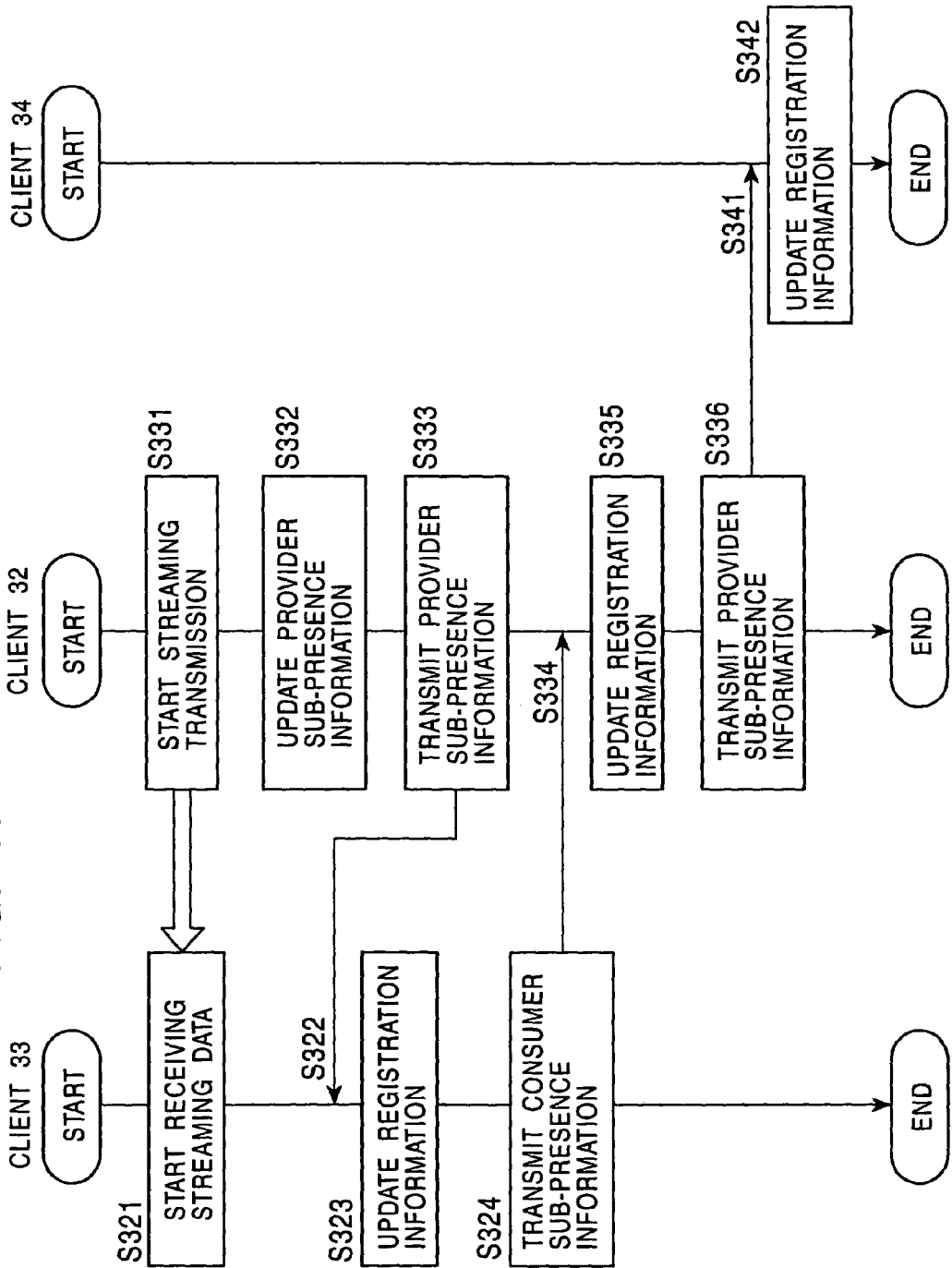
FIG. 41 is a timing chart showing a flow of a process performed after starting MPEG-4 streaming transmission.
Figure 42:
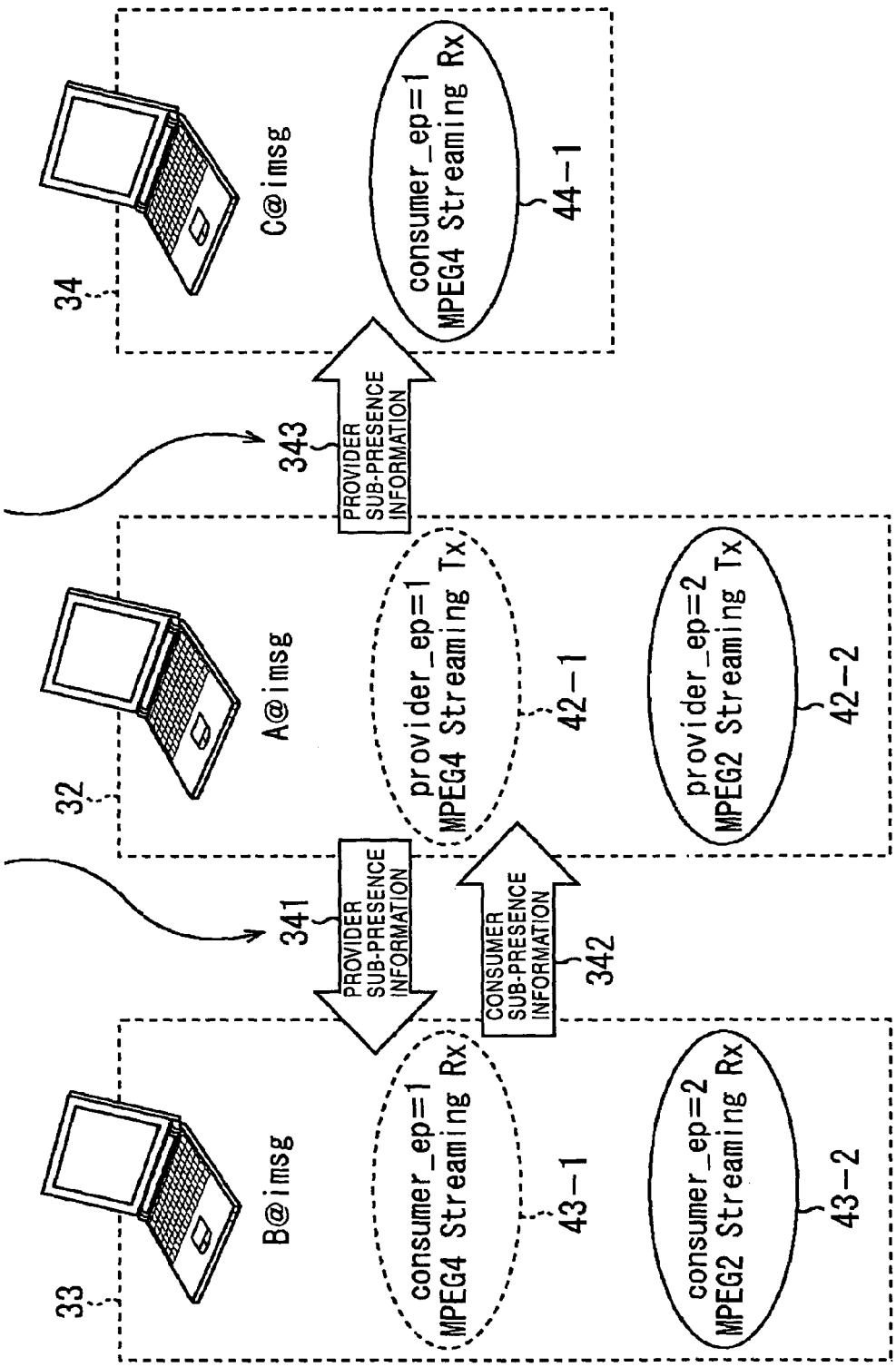
FIG. 42 is a diagram showing a manner in which, in the example shown in FIG. 41, sub-presence information is transmitted among clients.

Referring mainly to a timing chart shown in FIG. 41 and also referring to FIGS. 42 and 44 as required, a process is described which is performed after MPEG-4 streaming communication is started between the client 32 and the client 33.

If the client 32 starts, in step S331, transmission of MPEG-4 streaming data using the MPEG-4 streaming transmission capability 42-1, and if, in response, the client 33 starts in step S321 reception of the MPEG-4 streaming data using the MPEG-4 streaming reception capability 43-1, then the MPEG-4 streaming transmission capability 42-1 of the client 32 becomes unavailable for another transmission. Thus, in step S332, the client 32 updates the provider sub-presence information 304A such that the change in the status of the MPEG-4 streaming transmission capability 42-1 is reflected in the provider sub-presence information 304A.

Then in step S333, the client 32 supplies the updated provider sub-presence information 304A in a data format such as that shown in FIG. 43 to the client 33 (as represented by an arrow 341 in FIG. 42).

In the example shown in FIG. 43, the information type is "provider" and the information is addressed to "B@imsg" (client 33), wherein the information indicates that "provider_ep=1" (MPEG-4 streaming transmission capability 42-1) of A@imsg (client 32) is in a status "unavailable".

If the client 33 receives this provider sub-presence information 304A in step S322, then in step S323 the client 33 updates the registration information in accordance with the received information.

As with the client 32, starting of reception of streaming data causes the MPEG-4 streaming reception capability 43-1 of the client 33 to become unavailable for another reception, and thus in step S324, the client 33 updates the consumer sub-presence information 305A and supplies it to the client 32 (as represented by an arrow 342 in FIG. 42).

If the client 32 receives this consumer sub-presence information 305A in step S334, then in step S335 the client 32 updates the registration information in accordance with the received consumer sub-presence information 305A.

In the registration information managed by the client 32, not only the client 33 but also the client 34 is registered in relation to the MPEG-4 streaming transmission capability 42-1.

Therefore, in step S336, the client 32 also supplies updated provider sub-presence information 304A in a data format such as that shown in FIG. 44 to the client 34 (as represented by an arrow 343 in FIG. 42).

In the example shown in FIG. 44, the information type is "provider" and the information is addressed to "C@imsg" (client 34), wherein the information indicates that "provider_ep=1" (MPEG-4 streaming transmission capability 42-1) of A@imsg (client 32) is in a status "unavailable".

If the client 34 receives this provider sub-presence information 304A in step S341, then in step S342 the client 34 updates the registration information in accordance with the received consumer sub-presence information 304A.

Thus, the respective clients can obtain information indicating the statuses of capabilities of friends registered.

Figure 45:
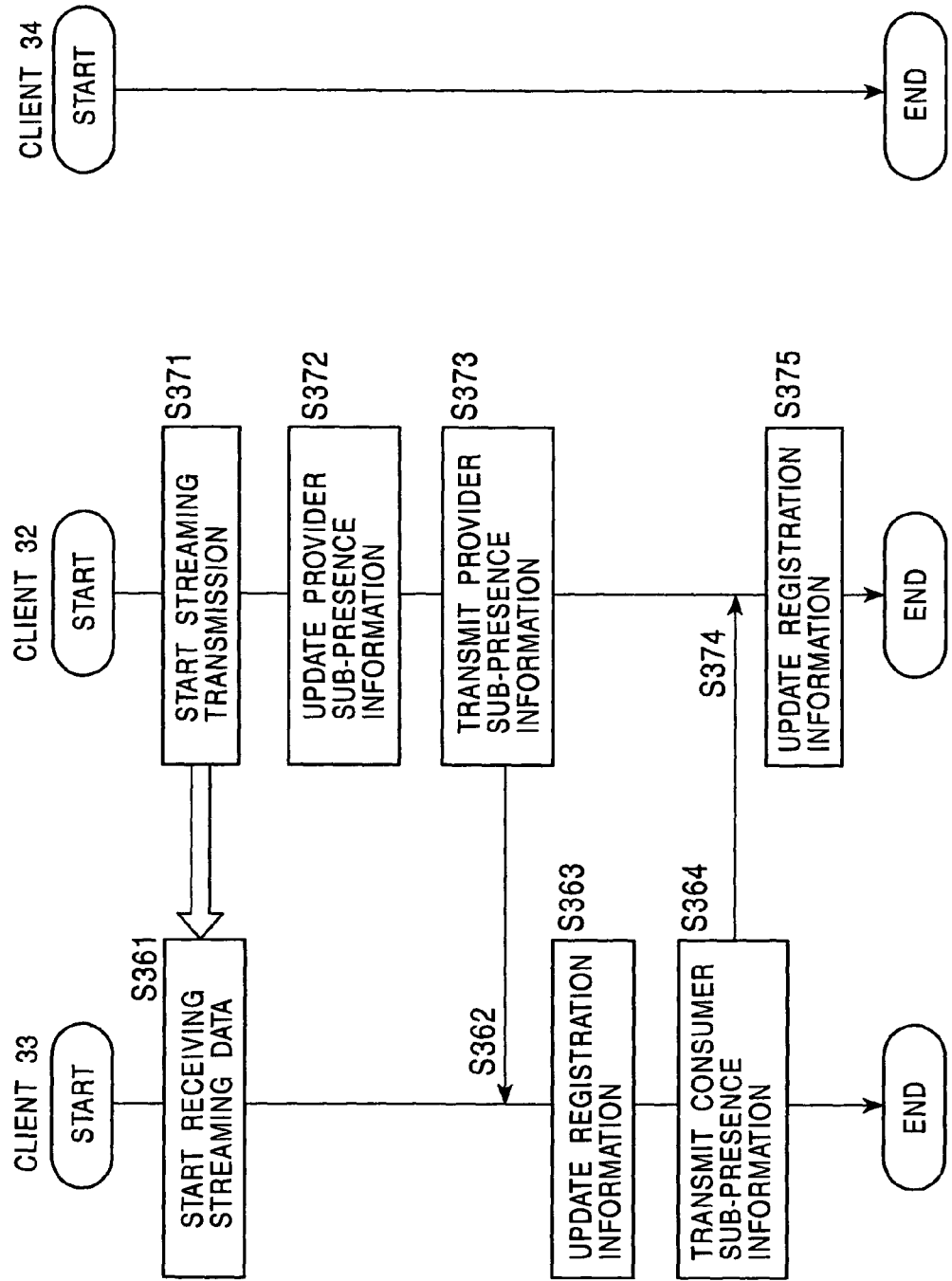
FIG. 45 is a timing chart showing a flow of a process performed after starting MPEG-2 streaming transmission.
Figure 46:
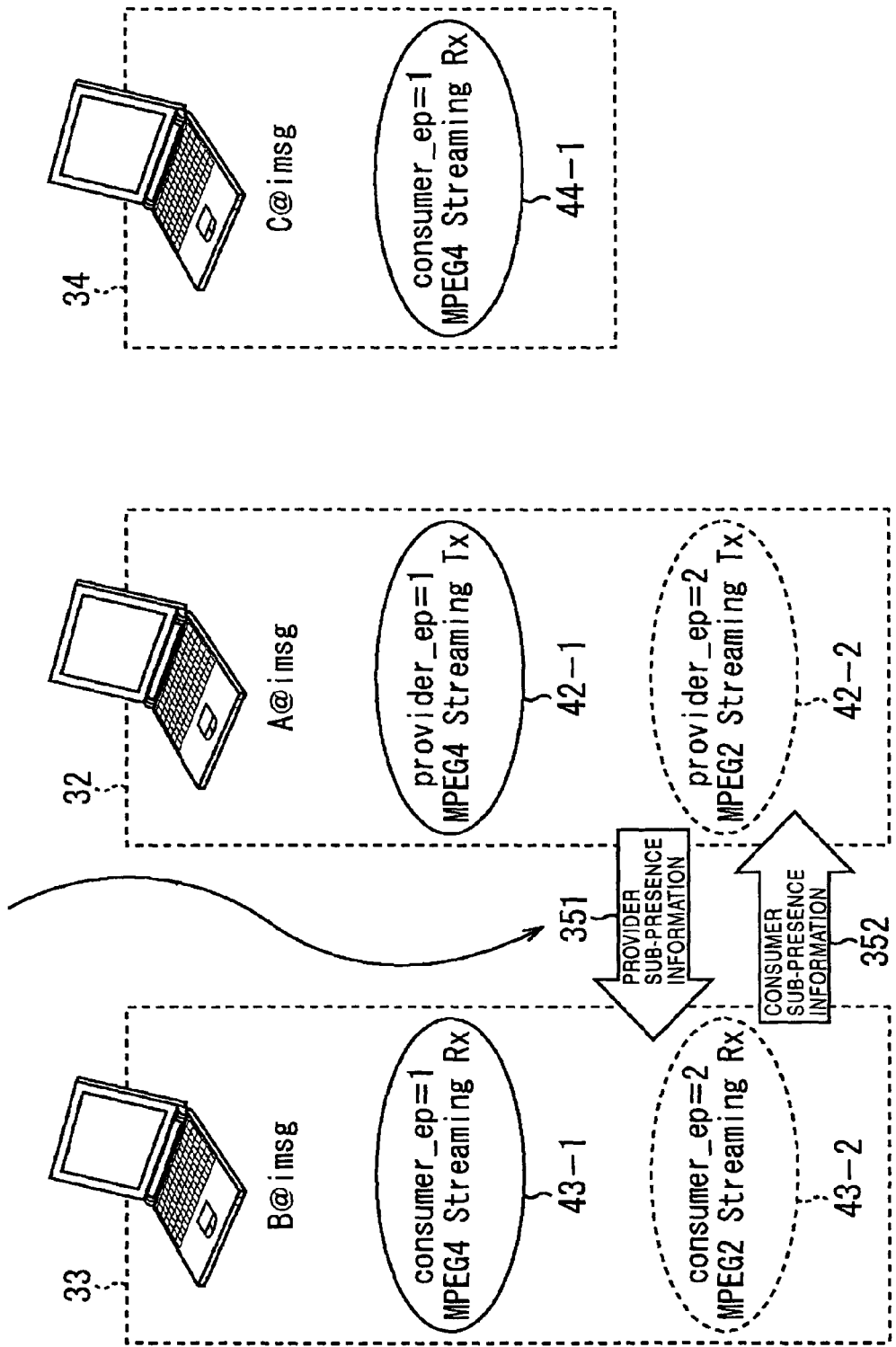
FIG. 46 is a diagram showing a manner in which, in the example shown in FIG. 45, sub-presence information is transmitted among clients.

Referring mainly to a timing chart shown in FIG. 45 and also referring to FIGS. 46 and 48 as required, a process is described which is performed after MPEG-2 streaming communication is started between the client 32 and the client 33.

If the client 32 starts, in step S371, transmission of MPEG-4 streaming data using the MPEG-2 streaming transmission capability 42-2, then, in response, the client 33 starts in step S361 reception of the MPEG-2 streaming data using the MPEG-2 streaming reception capability 43-2.

The start of transmission of MPEG-2 streaming data causes the MPEG-2 streaming transmission capability 42-2 of the client 32 to become unavailable for another transmission. Therefore, in step S372, the client 32 updates the provider sub-presence information 304B such that the change in the status is reflected in the provider sub-presence information 304B.

Then in step S373, the client 32 supplies the updated provider sub-presence information 304B in a data format such as that shown in FIG. 47 to the client 33 in accordance with the registration information (as represented by an arrow 351 in FIG. 46).

In the example shown in FIG. 47, the information type is "provider" and the information is addressed to "B@imsg" (client 33), wherein the information indicates that "provider_ep=2" (MPEG-2 streaming transmission capability 42-2) of A@imsg (client 32) is in a status "unavailable".

If the client 33 receives this provider sub-presence information 304B in step S362, then in step S363 the client 33 updates the registration information in accordance with the received consumer sub-presence information 304B.

The start of reception of MPEG-2 streaming data causes the MPEG-2 streaming reception capability 43-2 of the client 33 to become unavailable for another reception. Therefore, in step S364, the client 33 updates the consumer sub-presence information 305B such that the change in the status is reflected in the consumer sub-presence information 305B, and the client 33 supplies the updated provider sub-presence information 305B in a data format such as that shown in FIG. 48 to the client 32 (as represented by an arrow 352 in FIG. 46).

In the example shown in FIG. 48, the information type is "consumer" and the information is addressed to "A@imsg" (client 32), wherein the information indicates that "consumer_ep=2" (MPEG-2 streaming reception capability 42-2) of B@imsg (client 33) is in a status "unavailable".

If the client 32 receives this consumer sub-presence information 305B in step S374, then in step S375 the client 32 updates the registration information in accordance with the received consumer sub-presence information 305B.

In this case, the client 34 does not have the capability of using the MPEG-2 streaming transmission capability 42-2 of the client 32, and thus the client 34 is not registered in relation to the MPEG-2 streaming transmission capability 42-2 of the client 32. Therefore, when a change occurs in the status of the MPEG-2 streaming transmission capability 42-2, the client 32 does not supply the provider sub-presence information 304B to the client 34.

By supplying presence information in the above-described manner, it becomes possible for the provider and the consumers to obtain necessary and sufficient presence information associated with the capabilities, thereby allowing a reduction in load imposed on the process of transmitting information.

In the above embodiments, it is assumed that a provider has a streaming transmission capability and a consumer has a streaming reception capability. Alternatively, a client having a streaming reception capability may act as a provider, and a client having a streaming transmission capability may act as a consumer.

In this case, unlike the embodiments described above, a client 32 having a streaming transmission capability issues a registration request to clients 33 and 34 having a streaming reception capability.

Figure 49:
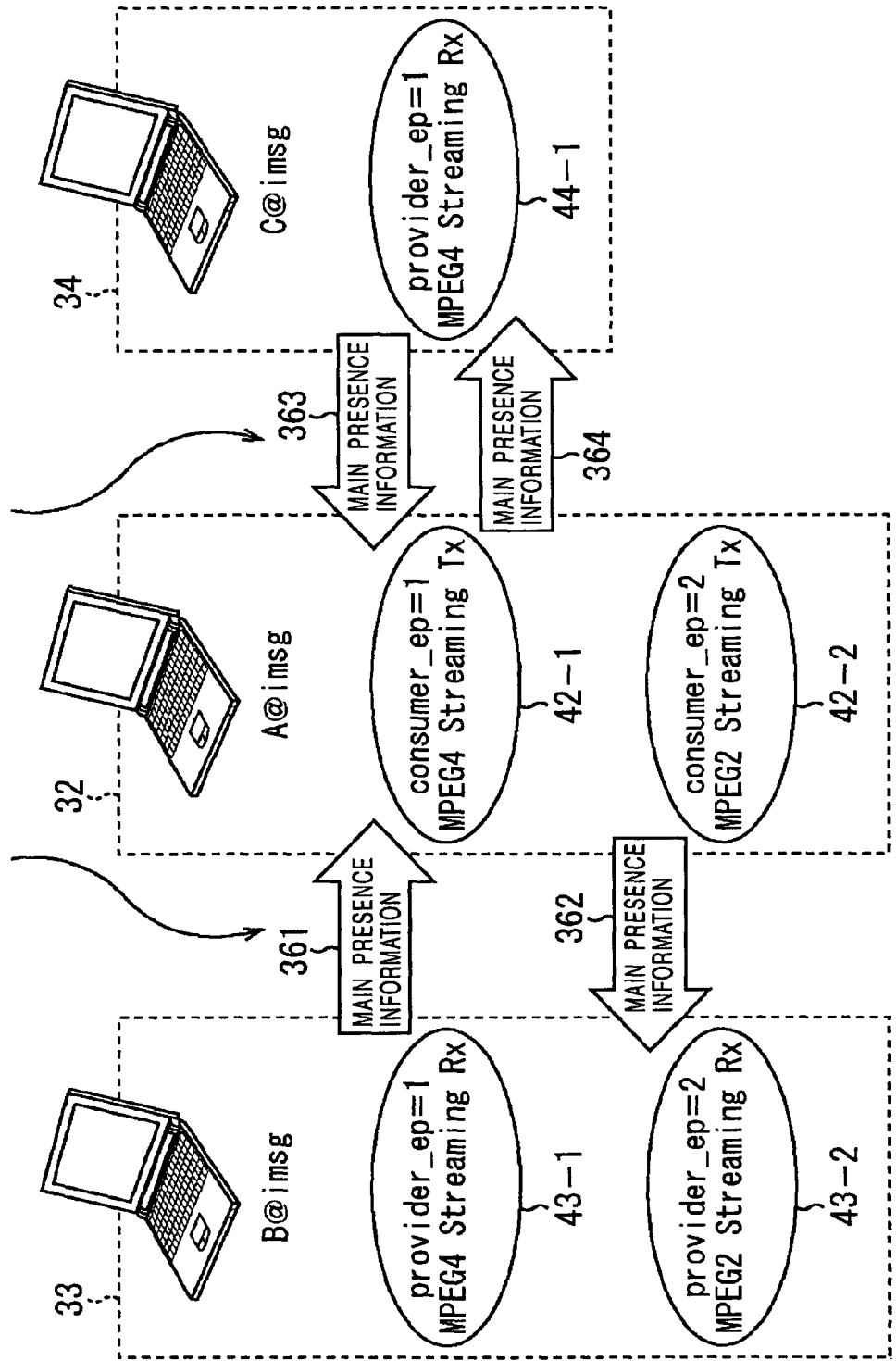
FIG. 49 is a diagram showing another example of a manner in which main presence information is transmitted among clients.

FIG. 49 shows a manner in which main presence information is transmitted between a provider having a streaming reception capability and a consumer having a streaming transmission capability.

Figure 50:
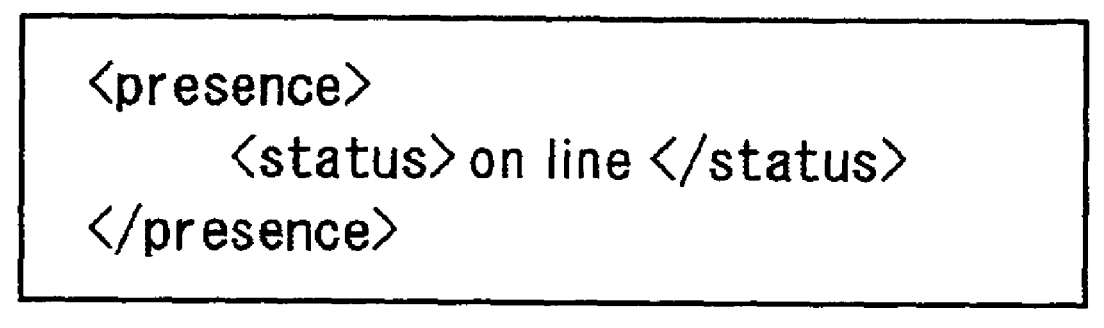

As in the previous embodiments, if A@imsg (client 32) logs in to an instant message communication service to which B@imsg (client 33) and C@imsg (client 34) have already logged in, the client 32 acting as a consumer sends main presence information 302 in a data format such as that shown in FIG. 50 to a server 31.

In the specific example shown in FIG. 50, the main presence information indicates that A@imsg is in a status "on line". The server 31 supplies this main presence information 302 to B@imsg and C@imsg in accordance with a friend list of A@imsg.

Furthermore, the server 31 supplies main presence information 302 associated with B@imsg and C@imsg in a data format such as that shown in FIGS. 51 and 52 to A@imsg. As shown in FIG. 51, the main presence information 302 associated with B@imsg includes information associated with provider capabilities (MPEG-4 streaming reception capability 43-1 and a MPEG-2 streaming reception capability 43-2) possessed by B@imsg acting as a provider. Similarly, as shown in FIG. 52, the main presence information 302 associated with C@imsg includes information associated with a provider capability (MPEG-4 streaming reception capability 44-1) possessed by C@imsg acting as a provider.

The flow of the process of transmitting and receiving main presence information is similar to the flow described earlier with reference to the timing chart shown in FIG. 25, and thus a duplicated description thereof is not given herein.

Furthermore, the main presence information is managed by the providers (clients 33 and 34) in a similar manner as described earlier with reference to the flow chart shown in FIG. 19, and thus the main presence information management process is not described in further detail herein. The main presence information is managed by the consumer (client 32) in a similar manner as described earlier with reference to the flow chart shown in FIG. 22, and thus it is not described in further detail herein.

A process associated with registration is described below.

Figure 53:
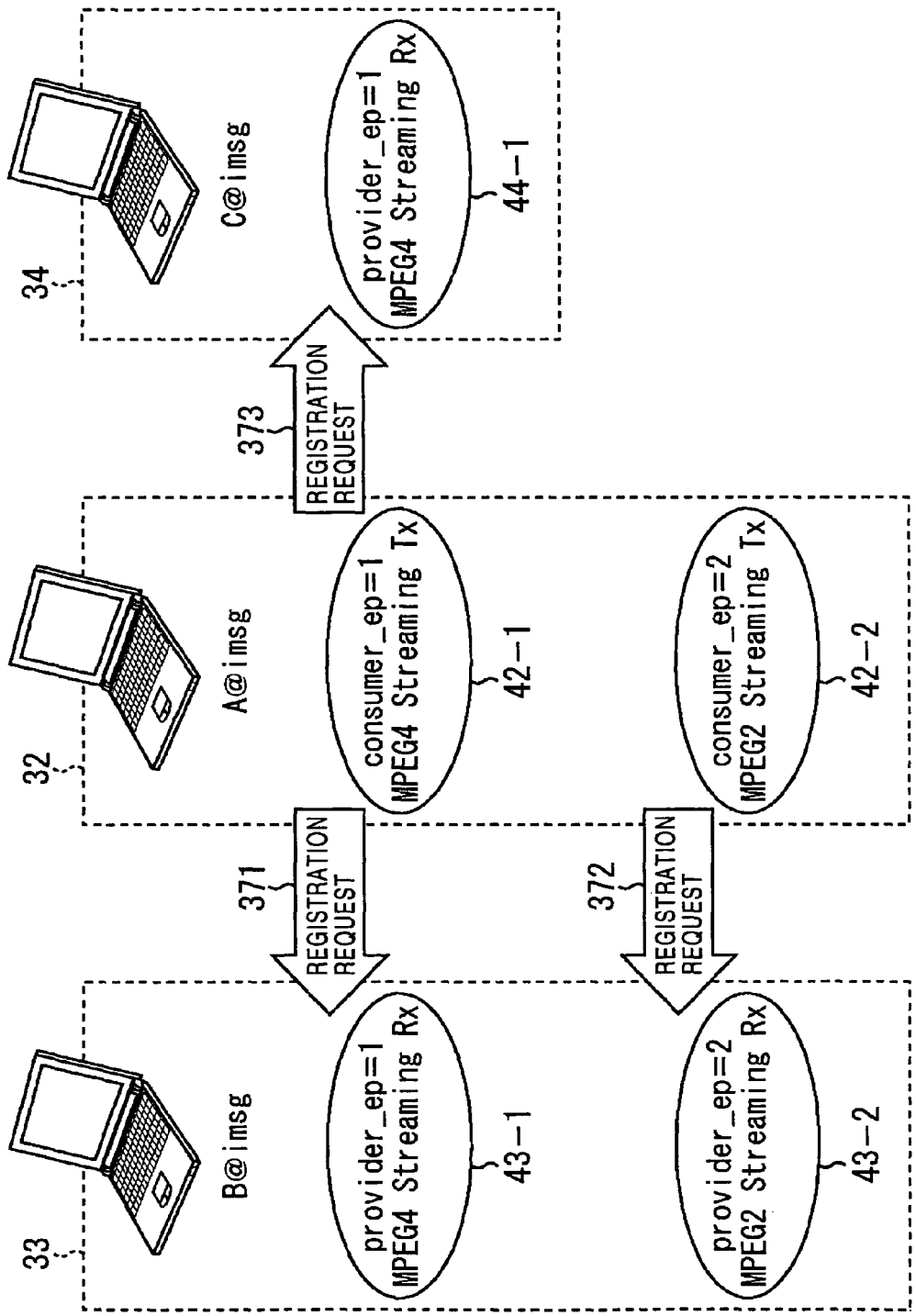
FIG. 53 is a diagram showing a manner in which a consumer sends a registration request to a provider.

In accordance with the received main presence information, A@imsg (client 32) acting as the consumer issues a registration request to request that A@imsg be registered in relation with available capabilities that B@imsg and C@imsg (client 33 or 34) acting as providers have (as represented by arrows 371 to 373 in FIG. 53).

FIG. 54 shows an example of a data format of the registration request issued by A@imsg as represented by the arrow 371 in FIG. 53 to request that A@imsg be registered in relation to the MPEG-4 streaming reception capability 43-1 of B@imsg. In this example, the registration request is addressed to "B@imsg", and it is requested that "consumer_ep=1" (MPEG-4 streaming transmission capability 42-1) of A@imsg be registered in relation to "provider_ep=1" (MPEG-4 streaming reception capability 43-1) of B@imsg.

FIG. 55 shows an example of a data format of the registration request issued by A@imsg as represented by the arrow 372 in FIG. 53 to request that A@imsg be registered in relation to the MPEG-2 streaming reception capability 43-2 of B@imsg. In this example, the registration request is addressed to "B@imsg", and it is requested that "consumer_ep=2" (MPEG-2 streaming transmission capability 42-2) of A@imsg be registered in relation to "provider_ep=2" (MPEG-2 streaming reception capability 43-2) of B@imsg.

FIG. 56 shows an example of a data format of the registration request issued by A@imsg as represented by the arrow 373 in FIG. 53 to request that A@imsg be registered in relation to the MPEG-4 streaming reception capability 44-1 of C@imsg. In this example, the registration request is addressed to "C@imsg", and it is requested that "consumer_ep=1" (MPEG-4 streaming transmission capability 42-1) of A@imsg be registered in relation to "provider_ep=1" (MPEG-4 streaming reception capability 44-1) of C@imsg.

In the registration process described above, the client 32 acting herein as a consumer performs a process similar to that performed by the clients 33 and 34 in FIG. 28, and the clients 33 and 34 acting herein as providers perform a process similar to that performed by the client 32 in FIG. 28.

Figure 20:
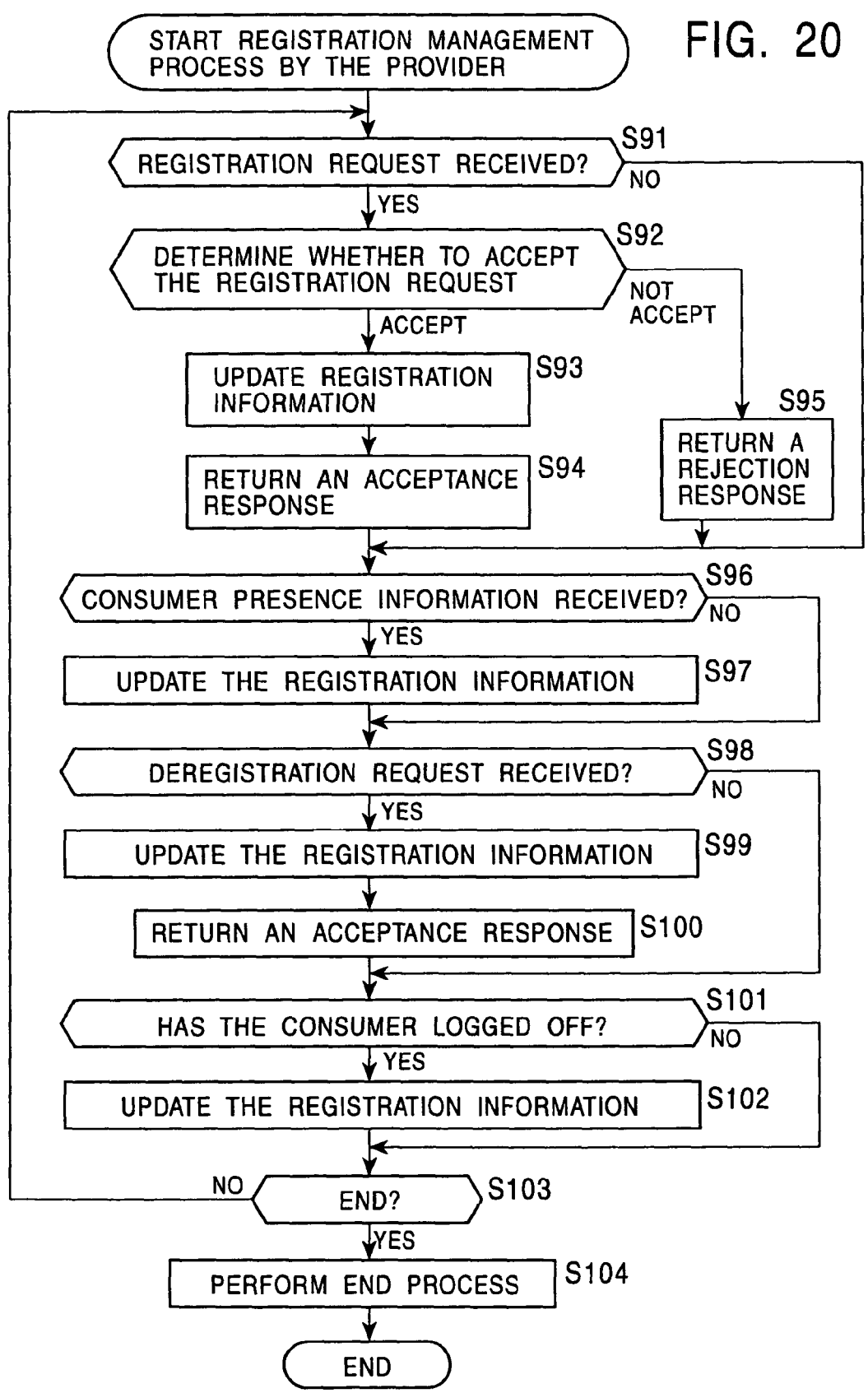
FIG. 20 is a flow chart showing a process of managing registration, performed by the provider.
Figure 23:
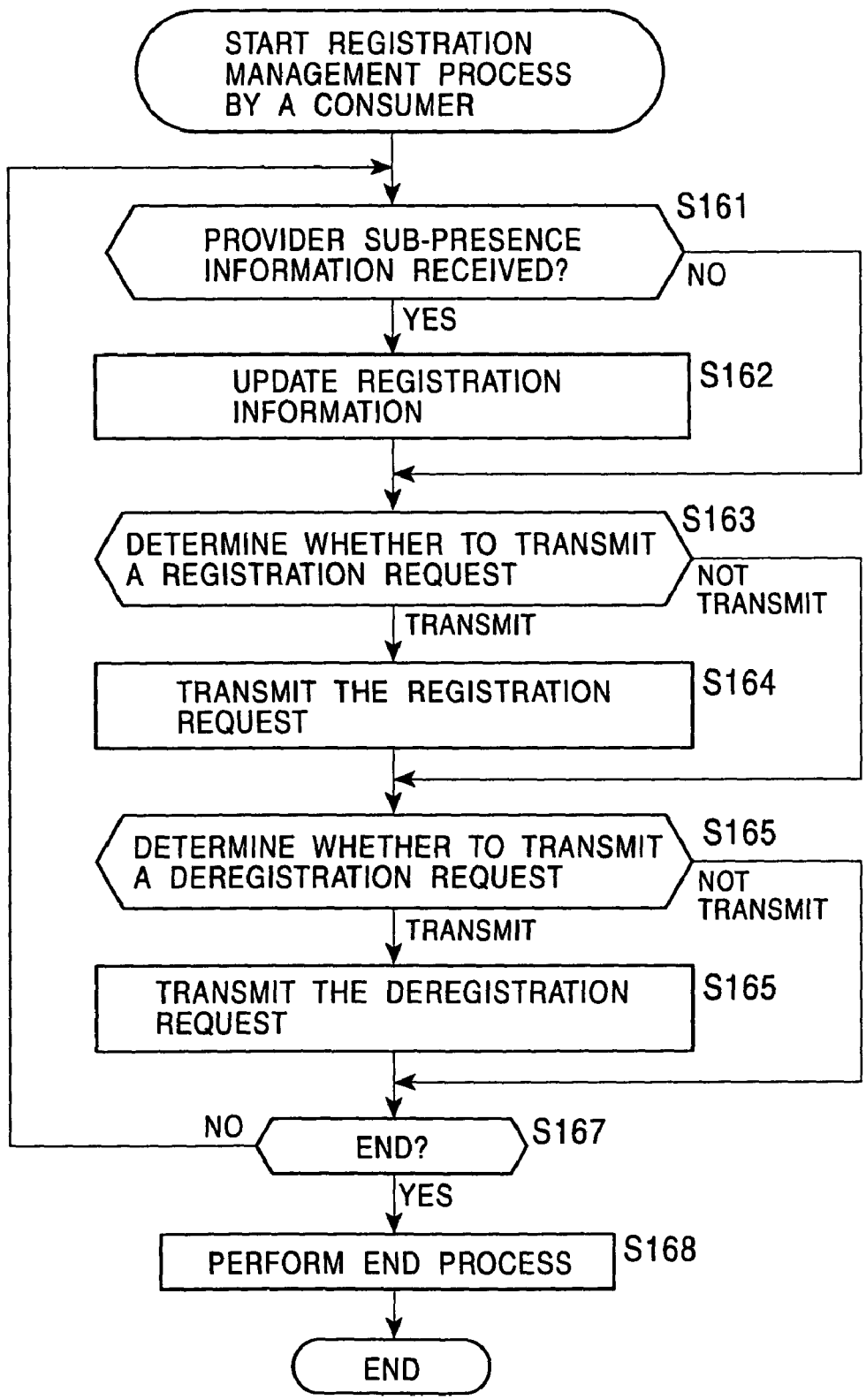
FIG. 23 is a flow chart showing a process of managing registration, performed by a consumer.

Thus, the client 32 acting as the consumer performs a registration management process in a similar manner to that shown in FIG. 23, and the clients 33 and 34 perform a registration management process in a similar manner to that shown in FIG. 20.

In the process of transmitting and receiving sub-presence information, the clients 32 acting as the consumer performs a process similar to that performed by the clients 33 and 34 shown in FIGS. 36, 41 and 45, and the clients 33 and 34 acting as providers perform a process similar to that performed by the client 32 shown in FIGS. 36, 41 and 45.

Thus, the client 32 acting as the consumer performs sub-presence information management process in a similar manner to that shown in FIG. 24, and the clients 33 and 34 acting as providers perform sub-presence information management process in a similar manner to that shown in FIG. 21.

As described above, also in the case in which a provider has a streaming reception capability and a consumer has a streaming transmission capability, it is possible for the provider and the consumer to obtain necessary and sufficient presence information associated with the capabilities, thereby allowing a reduction in load imposed on the process of transmitting information.

In the examples described above, each client serves only as either a provider or a consumer. However, whether a client acts as a provider or a consumer is determined by what capability the client has. A client may have capabilities which allow the client to act both a provider and a consumer.

Figure 57:
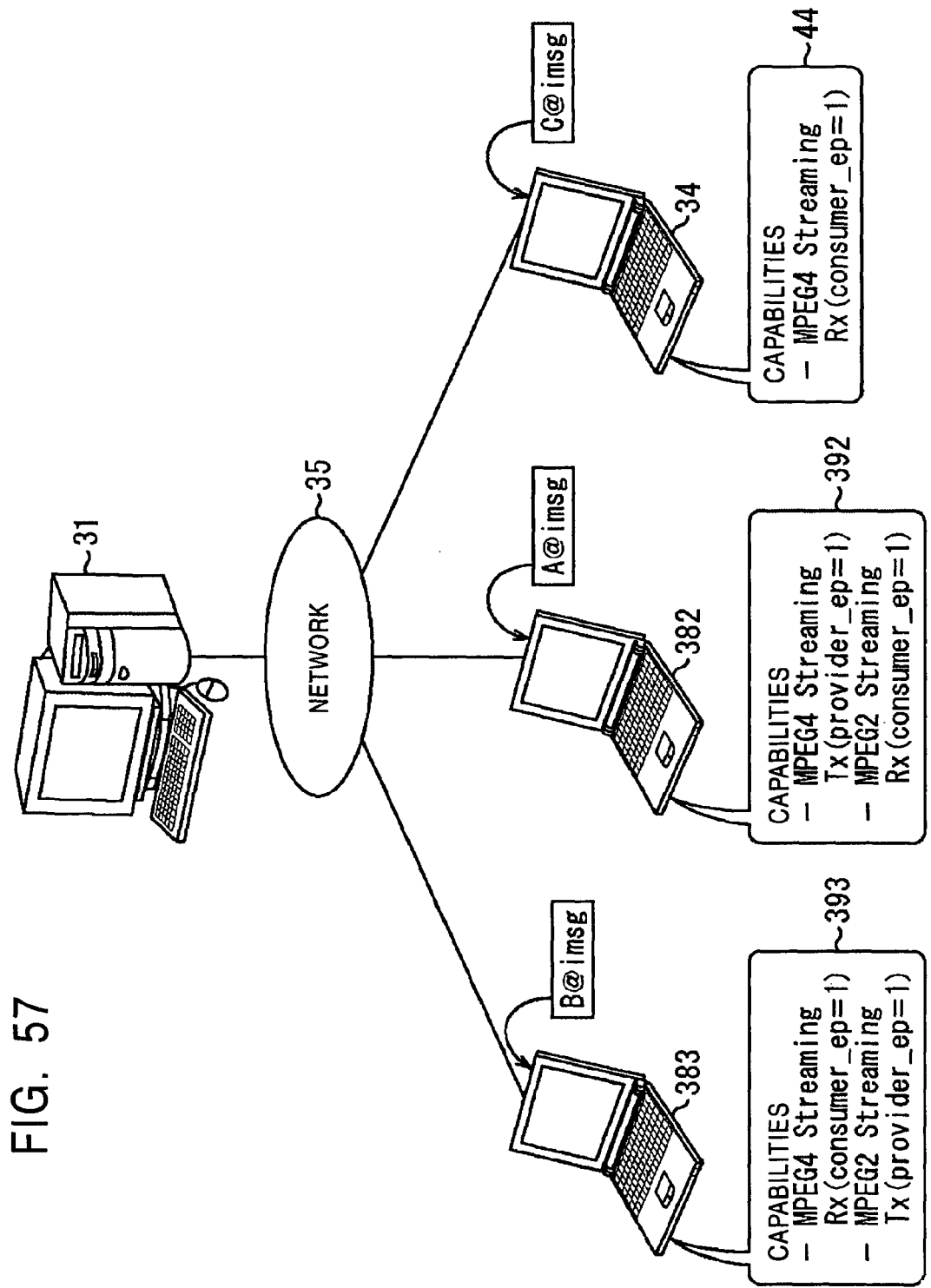
FIG. 57 is a diagram showing another example of an instant message communication system according to the present invention.

FIG. 57 shows another example of an instant message communication system according to the present invention.

The system shown in FIG. 57 is different from the instant message communication system shown in FIG. 4 in that each of A@imsg (client 382) and B@imsg (client 383) can act as both a provider and a consumer.

As can be seen from a capability list 392, the client 382 has a MPEG-4 streaming transmission capability 392-1 which allows it to act as a provider and also has a MPEG-2 streaming reception capability 392-2 which allows it to act as a consumer.

As can be seen from a capability list 393, the client 383 has a MPEG-4 streaming reception capability 393-1 which allows it to act as a consumer and also has a MPEG-2 streaming transmission capability 393-2 which allows it to act as a provider.

Figure 58:
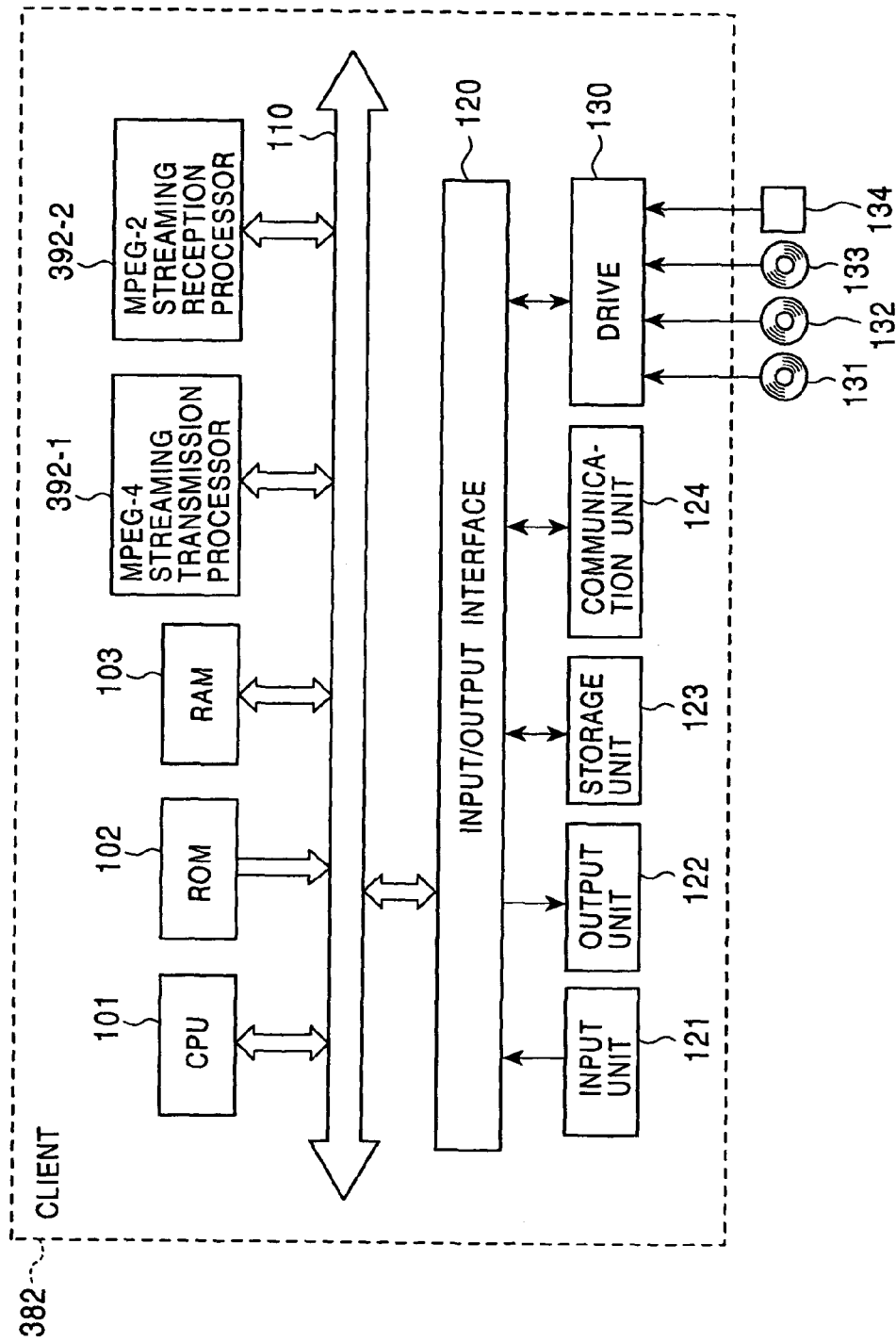
FIG. 58 is a block diagram showing an example of a construction of a client 382 shown in FIG. 57.

FIG. 58 shows an example of a construction of the client 382. As shown in FIG. 58, unlike the client 32 shown in FIG. 6, the client 382 includes both a MPEG-4 streaming transmission processor 392-1 and a MPEG-2 streaming reception processor 392-2.

The MPEG-4 streaming transmission processor 392-1 and the MPEG-2 streaming reception processor 392-2 are both connected to a bus 110. The MPEG-4 streaming transmission processor 392-1 is similar to the MPEG-4 streaming transmission processor 42-1 shown in FIG. 6 and performs, under the control of a CPU 101, a process associated with transmission of MPEG-4 streaming data. The MPEG-2 streaming transmission processor 392-2 is similar to the MPEG-2 streaming reception processor 43-2 shown in FIG. 7 and performs, under the control of the CPU 101, a process associated with transmission of MPEG-2 streaming data.

Figure 59:
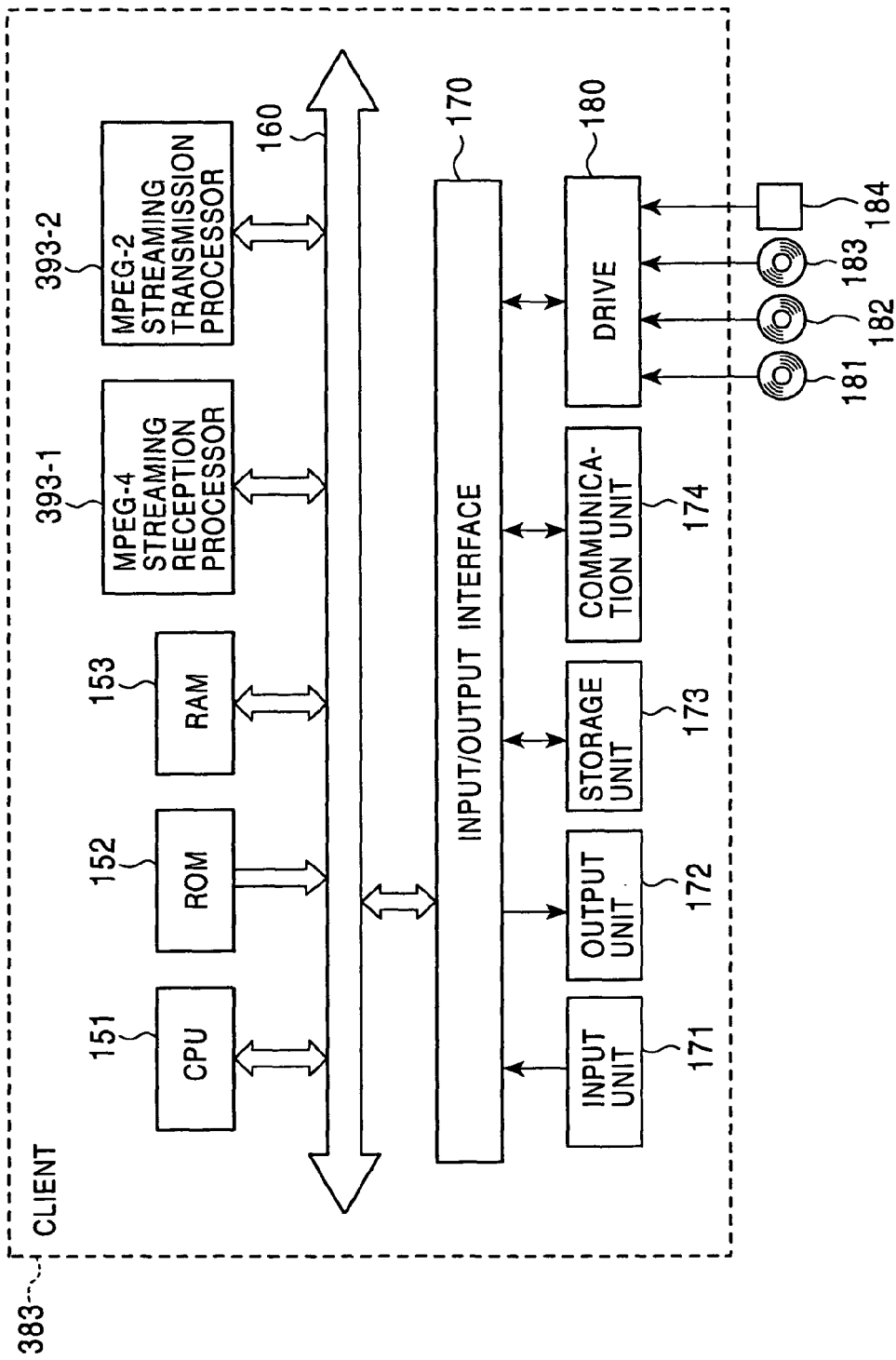
FIG. 59 is a block diagram showing an example of a construction of a client 383 shown in FIG. 57.

FIG. 59 shows an example of a construction of the client 383. As shown in FIG. 59, unlike the client 33 shown in FIG. 7, the client 383 includes both a MPEG-4 streaming reception processor 393-1 and a MPEG-2 streaming transmission processor 393-2.

The MPEG-4 streaming reception processor 393-1 and the MPEG-2 streaming transmission processor 393-2 are both connected to a bus 160. The MPEG-4 streaming reception processor 393-1 is similar to the MPEG-4 streaming reception processor 43-1 shown in FIG. 7 and performs, under the control of a CPU 151, a process associated with reception of MPEG-4 streaming data. The MPEG-2 streaming transmission processor 393-2 is similar to the MPEG-2 streaming transmission processor 42-2 and performs, under the control of the CPU 151, a process associated with transmission of MPEG-2 streaming data.

In this embodiment, presence information is represented in a similar format to that shown in FIG. 18 such that sub-presence information 303 of each of the clients 382 and 383 includes both provider sub-presence information 304 and consumer sub-presence information 305.

Figure 60:
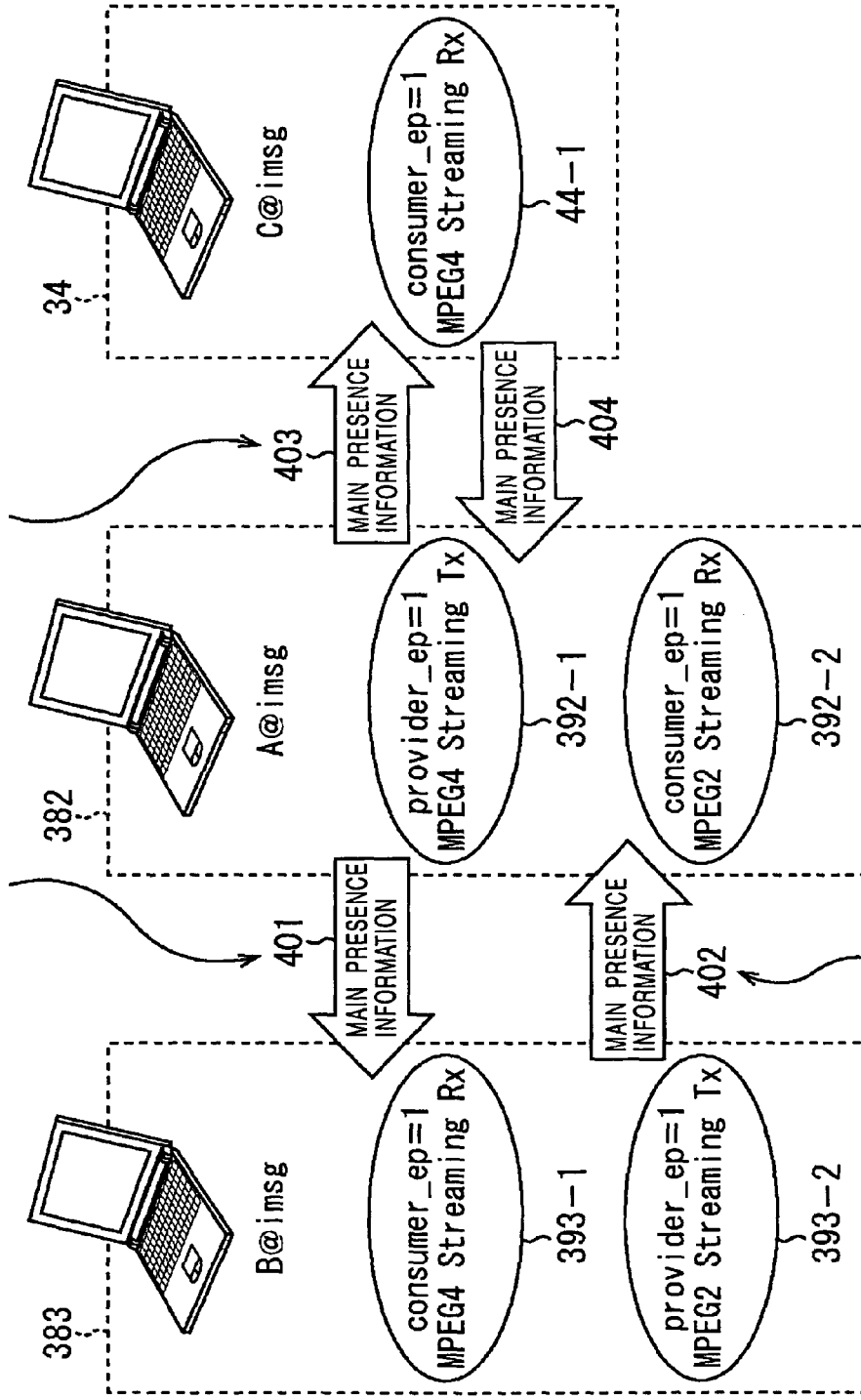
FIG. 60 is a diagram showing a manner in which main presence information is transmitted among clients.

A process of transmitting and receiving main presence information is described below. Also in this embodiment, as in the previous embodiments described above, main presence information indicating capabilities of a provider is supplied to a consumer. As shown in FIG. 60, the client 382 supplies main presence information to the clients 383 and 34 as represented by arrows 401 and 403 to inform the clients 383 and 34 that the client 382 has the MPEG-4 streaming transmission capability 392-1 which allows the client 382 to act as a provider. The client 383 supplies main presence information to the client 382 as represented by an arrow 402 to inform the client 382 that the client 383 has the MPEG-2 streaming transmission capability 393-2 which allows the client 383 to act as a provider.

The clients 382 and 383 perform both a presence information management process in a similar manner to that shown in FIG. 19 and a presence information management process in a similar manner to that shown in FIG. 22.

The client 34 has only the MPEG-4 streaming reception capability which allows the client 34 to act as a consumer, and thus the client 34 supplies main presence information to the client 382 as represented by an arrow 404 to inform of only the status of the client 34.

Figure 61:
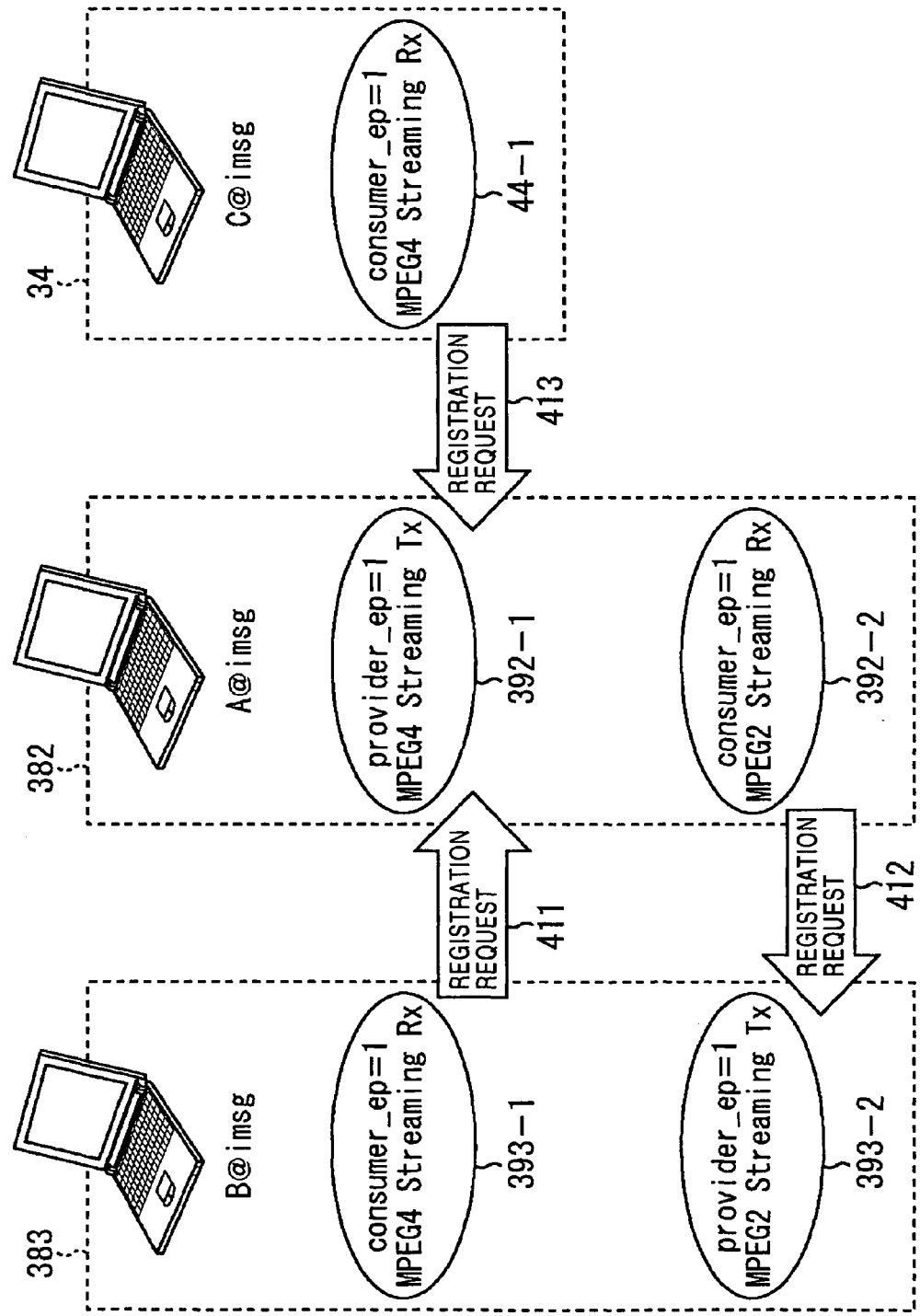
FIG. 61 is a diagram showing a manner in which a capability of a consumer is registered in relation to a capability of a provider.

In such a case, registration is performed as described below. As shown in FIG. 61, registration is performed on a capability-by-capability basis by the provider in response to a registration request issued by a consumer.

That is, as shown in FIG. 61, the client 383 having the MPEG-4 streaming reception capability 393-1 which allows the client 383 to act as a consumer issues a registration request as represented by an arrow 411 to request that the client 383 be registered at the client 382 in relation to the MPEG-4 streaming transmission capability 392-1 which allows the client 382 to act as a provider. On the other hand, the client 382 having the MPEG-2 streaming reception capability 392-2 which allows the client 382 to act as a consumer issues a registration request as represented by an arrow 412 to request that the client 382 be registered at the client 383 in relation to the MPEG-2 streaming transmission capability 393-2 which allows the client 383 to act as a provider.

The client 34 having only the MPEG-4 streaming reception capability 44-1 which allows the client 34 to act as a consumer issues a registration request as represented by an arrow 413 to request that the client 34 be registered at the client 382 in relation to the MPEG-4 streaming transmission capability 392-1.

In response, the client 382 registers, in relation to the MPEG-4 streaming transmission capability 392-1, both the MPEG-4 streaming reception capability 393-1 of the client 383 and the MPEG-4 streaming reception capability 44-1 of the client 34. On the other hand, the client 383 registers the MPEG-2 streaming reception capability 392-2 in relation to the MPEG-2 streaming transmission capability 393-2.

That is, each of the clients 382 and 383 performs both a registration management process similar to that shown in FIG. 20 and a registration management process similar to that shown in FIG. 23.

Furthermore, each of the clients 382 and 383 performs both a sub-presence information management process similar to that shown in FIG. 21 and a sub-presence information management process similar to that shown in FIG. 24, and each of the clients 382 and 383 performs a process needed to act as a provider and a process needed to act as a consumer independently of each other.

As described above, in the case in which one client has capabilities which allow the client to act as both a provider and a consumer, it is possible for all providers and consumers to obtain necessary and sufficient presence information associated with the capabilities, thereby allowing a reduction in load imposed on the process of transmitting information.

Figure 62:
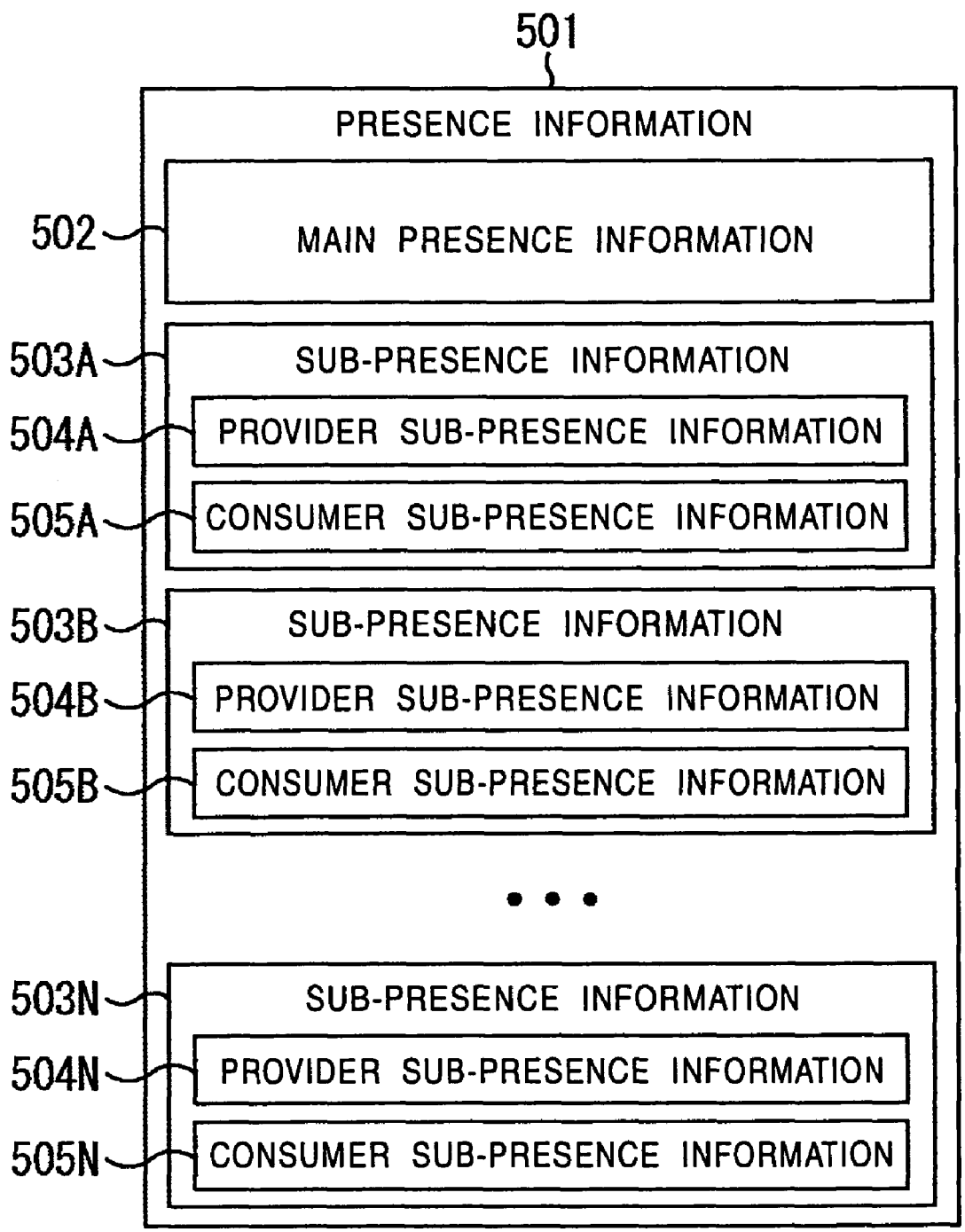
FIG. 62 is a diagram showing another example of presence information according to the present invention.

In the embodiments described above, sub-presence information 303 shown in FIG. 18 is supplied from a client to another client selected by the former client on the basis of the registration information managed by that client. Alternatively, a server may mange registration information associated with all clients and may supply sub-presence information 503 included in presence information 501 such as that shown in FIG. 62 to a proper client which needs the sup-presence information 503.

Figure 63:
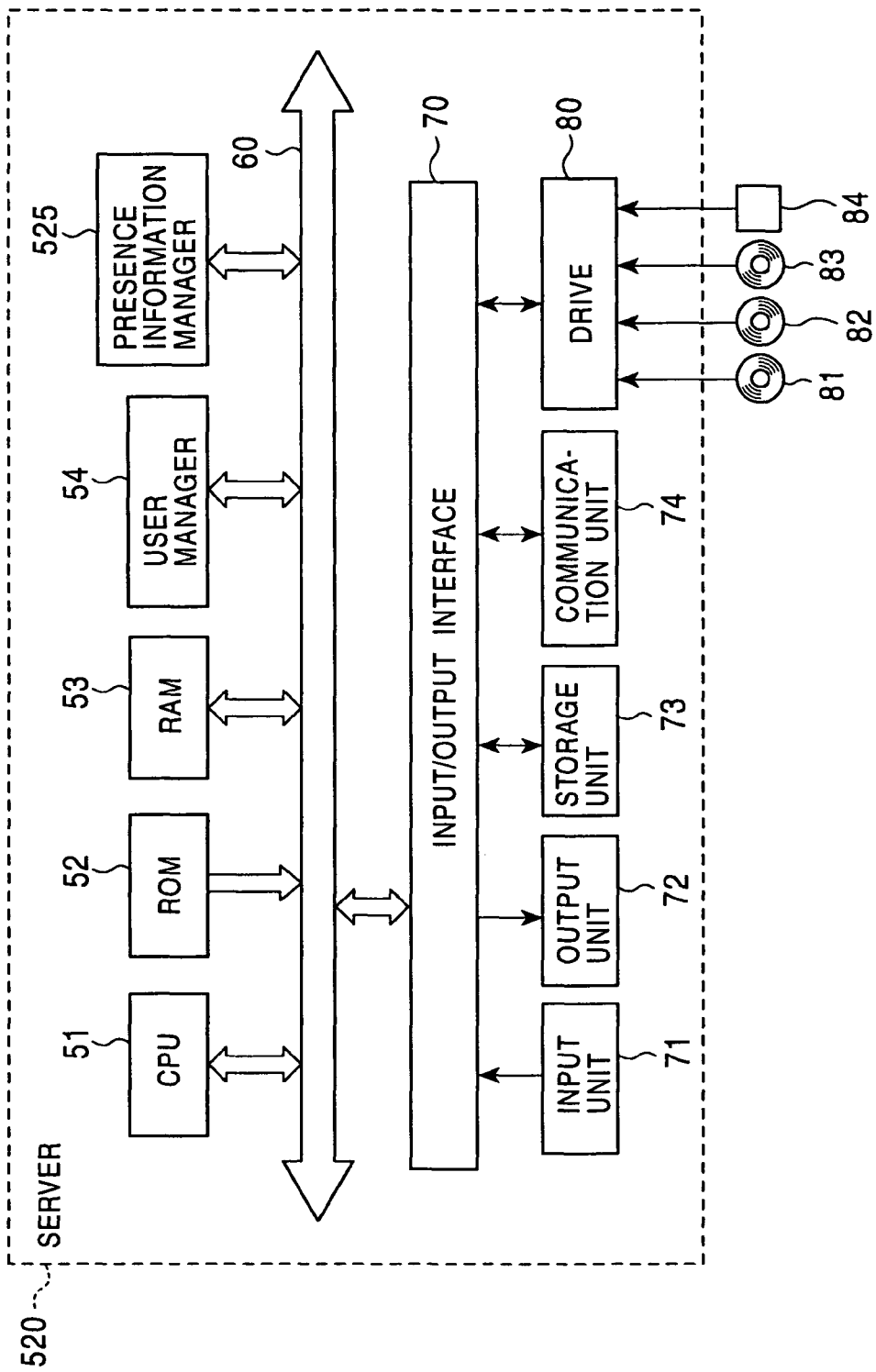
FIG. 63 is a block diagram showing an example of a construction of a server which manages presence information shown in FIG. 62.

In this case, as shown in FIG. 63, the server 520 is formed so as to additionally include a presence information manager 525 in addition to components similar to those of the server 31 shown in FIG. 5.

Under the control of a CPU 51, the presence information manager 525 manages a list 530 such as that shown in FIG. 64. The list 530 includes main presence information 531 including information indicating the statuses of respective clients, sub-presence information 532 including information indicating the statuses of capabilities of respective clients and information associated with registration, and friend lists 533 to 535 indicating friends registered by respective clients.

For example, if B@imsg having two capabilities which allow B@imsg to act as a consumer issues a registration request to the server 520 to request that the two capabilities of B@imsg be registered in relation to A@imsg's two respective capabilities which allow A@imsg to act as a provider, the server 520 produces registration information as shown in FIG. 65 in accordance with the registration request received from B@imsg, and the server 520 describes the resultant registration information as sub-presence information 532 in the list 530.

If the server 520 receives provider sub-presence information from A@imsg or consumer sub-presence information from B@imsg, the server 520 describes the received information in the sub-presence information 532 as shown in FIG. 66 and supplies it to proper friends.

Figure 67:
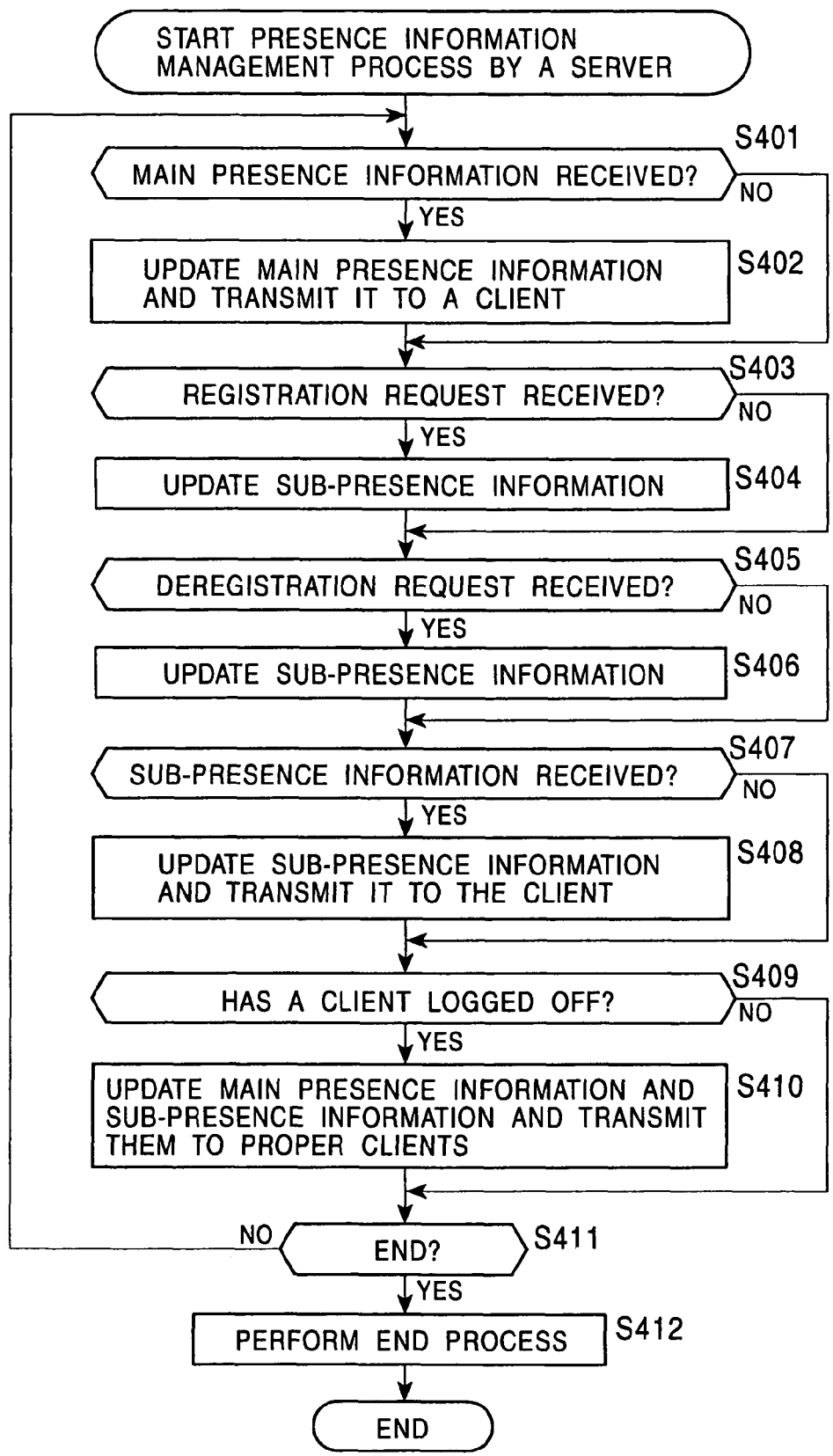
FIG. 67 is a flow chart showing a process of managing presence information, performed by the server shown in FIG. 63.

Referring to a flow chart shown in FIG. 67, a presence information management process performed by the server 520 is described below.

In step S401, the CPU 51 of the server 520 determines, by controlling a communication unit 74, whether main presence information 502 transmitted from a client has been acquired.

If it is determined that main presence information 502 has been acquired, the process proceeds to step S402. In step S402, the CPU 51 updates, by controlling the presence information manger 525, the main presence information 531 in the list 530 in accordance with the acquired main presence information 502, and the CPU 51 supplies the information to proper clients via a communication unit 74. Thereafter, the CPU 51 advances the process to step S403.

However, if it is determined in step S401 that the main presence information 502 has not been acquired, the CPU 51 advances the process to step S403 without performing step S402.

In step S403, the CPU 51 controls the communication unit 74 to determine whether a registration request has been received from a client. If it is determined that a registration request has been received, the CPU 51 advances the process to step S404. In step S404, the CPU 51 updates the sub-presence information 532 in the list 530 in accordance with the received registration request, by controlling the presence information manager 525. Thereafter, the CPU 51 advances the process to step S405.

However, if it is determined in step S403 that the registration request has not been received, the CPU 51 advances the process to step S405 without performing step S404.

In step S405, the CPU 51 determines, by controlling the communication unit 74, whether a deregistration request has been received. If it is determined that a deregistration request has been received, the CPU 51 advances the process to step S406. In step S406, the CPU 51 updates the sub-presence information 532 in the list 530 in accordance with the received deregistration request, by controlling the presence information manager 525. Thereafter, the CPU 51 advances the process to step S407.

However, if it is determined in step S405 that the deregistration request has not been received, the CPU 51 advances the process to step S407 without performing step S406.

In step S407, the CPU 51 determines, by controlling the communication unit 74, whether sub-presence information 503 transmitted from a client has been acquired. If it is determined that a sub-presence information has been received, the CPU 51 advances the process to step S408. In step S408, the CPU 51 updates, by controlling the presence information manger 525, the sub-presence information 532 in the list 530 in accordance with the acquired sub-presence information 503, and the CPU 51 supplies the information to proper clients via the communication unit 74. After completion of step S408, the CPU 51 advances the process to step S409.

In step S409, the CPU 51 determines, by controlling the communication unit 74, whether a client has logged off. If it is determined that a client has logged off, the CPU 51 advances the process to step S410. In step S410, the CPU 51 updates, by controlling the presence information manger 525, the main presence information 531 and the sub-presence information in the list 530 for the part of information associated with the client which has logged off, and the CPU 51 supplies the information to proper clients via the communication unit 74. After completion of step S410, the CPU 51 advances the process to step S411.

However, if it is determined in step S409 that the client has not yet logged off, the CPU 51 advances the process to step 411 without performing step S410.

In step S411, the CPU 51 determines whether to end the presence information management process in accordance with a command issued by a user. If it is determined that the process should not be ended, the CPU 51 returns the process to step S401 to repeat step S401 and following steps.

On the other hand, if it is determined in step S411 that the presence information management process should be ended, the CPU 51 advances the process to step S412 in which the CPU 51 performs an end process to complete the presence information management process.

In the above-described manner, the server 520 manages the presence information supplied from respective clients. This makes it unnecessary for each client to manage which one or more of other clients presence information should be sent to. This allows a further reduction in load imposed on the process of transmitting information associated with the statuses of capabilities.

In the embodiments described above, information described between a tag <show> and a tag </show> in the sub-presence information 303 or 503 is assumed to indicate the status ("available" or "unavailable") of a capability a client. Alternatively, other information may be described between a tag <show> and a tag </show>. For example, the information described herein may include additional information such as a title of streaming data, a comment, position information, or weather information.

In the embodiments described above, each client in the instant message communication system is assumed to be a personal computer. Alternatively, any device capable of performing communication via the network 35, such as a digital still camera, camcorder, a portable telephone, or a PDA (Personal Digital Assistants) device, may be used as a client.

In the embodiments described above, the instant message communication system is assumed to include one server and three clients. However, the number of clients and the number of servers are not limited to specific values. Furthermore, the instant message communication system may include a plurality of networks.

In the embodiments described above, in order to make it possible to transmit and receive presence information in the instant message communication service, each client is assumed to have one or more of the MPEG-4 streaming transmission capability, the MPEG-4 streaming reception capability, the MPEG-2 streaming transmission capability, and the MPEG-2 streaming reception capability. However, the capabilities are not limited to those, and each client may have any other capability to transmit or receive presence information.

In the present description, the term "system" is used to represent an entire set of apparatuses.

The process described above may be executed by hardware or software. When the processing sequence is executed by software, a program forming the software may be installed from a storage medium or via a network onto a computer which is provided as dedicated hardware or may be installed onto a general-purpose computer capable of performing various processes in accordance with various programs installed thereon.

Specific examples of non-transitory storage media usable for the above purpose include, as shown in FIGS. 5 to 8, are a magnetic disk 81 131, or 181 (such as a floppy disk), an optical disk 82, 132, 182, or 232 (such as a CD-ROM (Compact Disk-Read Only Memory) and a DVD (Digital Versatile Disk)), a magnetooptical disk 83, 133, 183, or 233 (such as a MD (Mini-Disc)), and a semiconductor memory 84, 134, 184, or 234, in the form of a package medium including a program stored thereon which is supplied to a user separately from a computer. A program may also be supplied to a user together with a computer including a CPU 51, 101, 151, or 201 or a built-in ROM or the like, in which the program has been preinstalled.

In the present description, the steps described in the program stored in the storage medium may be performed either in time sequence in accordance with the order described in the program or in a parallel or separate fashion.

As described above, the present invention makes it possible to transmit information among information processing apparatuses. In particular, the present invention makes it possible to transmit information associated with the status of capability available in communication among information processing apparatuses, without imposing a high load on the transmission process.

What is claimed is:

1. A non-transitory computer readable medium for storing a computer program that includes instructions which when executed on a computer causes the computer to execute a process, the computer being responsible for controlling a first information processing apparatus which communicates via a network with a plurality of other information processing apparatuses registered in advance as information processing apparatuses to communicate with, the process comprising:

outputting first information associated with at least one capability of the first information processing apparatus, to the other information processing apparatuses, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

registering, in response to a request of a second information processing apparatus of the other information processing apparatuses, a capability of the second information processing apparatus in correspondence with an identification of the second information processing apparatus and the at least one capability of the first information processing apparatus, thereby producing registration information, said capability of the second information processing apparatus being associated with the at least one capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard;

monitoring a state of the at least one capability of the first information processing apparatus, said state indicating an availability of the channel; and if a change in the state of the at least one capability is detected, outputting, in accordance with the registration information, second information indicating a change in the state of the at least one capability of the first information processing apparatus, to the second information processing apparatus, but not outputting the second information to the other information processing apparatuses that are registered in advance as information processing apparatuses to communicate with but do not have a capability associated with the at least one capability registered in the registration information.

2. A non-transitory computer readable medium according to claim 1, the process further comprising:

managing third information output from the second information processing apparatus in relation to corresponding registration information, the third information being associated with the details of the capability of the second information processing apparatus.

3. A non-transitory computer readable medium according to claim 1, wherein in outputting the first information, the first information is output to an information managing apparatus which manages the information associated with the other information processing apparatuses and the information associated with the first information processing apparatus, and in outputting the second information, the second information is output to the information managing apparatus.

4. A non-transitory computer readable medium according to claim 1, wherein the first information includes information indicating, in the form of a list, the status of the first information processing apparatus and capabilities of the first information processing apparatus, the second information includes information indicating the status of each capability of the first information processing apparatus, and outputting of the first information and outputting of the second information are performed using an instant message presence capability.

5. A non-transitory computer readable medium according to claim 1, wherein the first information is associated with a plurality of capabilities, the process further comprising:

registering, in response to a request of a third information processing apparatus of the other information processing apparatuses, a capability of the third information processing apparatus that is different than the capability of the second information processing apparatus, in correspondence with an identification of the third information processing apparatus and a second capability of the first information processing apparatus, thereby producing second registration information;

monitoring a state of the second capability of the first information processing apparatus; and if a change in the state of the second capability is detected, outputting, in accordance with the second registration information, third information indicating a change in the state of the second capability of the first information processing apparatus, to the third information processing apparatus, but not outputting the third information to the other information processing apparatuses, including the second information processing apparatus, that do not have a capability associated with the second capability registered in the second registration information.

6. An information processing method for a first information processing apparatus which communicates via a network with a plurality of other information processing apparatuses registered in advance as information processing apparatuses to communicate with, the method comprising:

outputting first information associated with at least one capability of the first information processing apparatus, to the other information processing apparatuses, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

registering, in response to a request of a second information processing apparatus of the other information processing apparatuses, a capability of the second information processing apparatus in correspondence with an identification of the second information processing apparatus and the at least one capability of the first information processing apparatus, thereby producing registration information, said capability of the second information processing apparatus being associated with the at least one capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard;

monitoring a state of the at least one capability of the first information processing apparatus, said state indicating an availability of the channel; and if a change in the state of the capability is detected, outputting, in accordance with the registration information, second information indicating a change monitored in the state of the capability of the first information processing apparatus, to the second information processing apparatus, but not outputting the second information to the other information processing apparatuses that are registered in advance as information processing apparatuses to communicate with but do not have a capability associated with the at least one capability registered in the registration information.

7. An information processing method according to claim 6, further comprising:

managing third information output from the second information processing apparatus in relation to corresponding registration information, the third information being associated with the details of the capability of the second information processing apparatus.

8. An information processing method according to claim 6, wherein in outputting the first information, the first information is output to an information managing apparatus which manages the information associated with the other information processing apparatuses and the information associated with the first information processing apparatus, and in outputting the second information, the second information is output to the information managing apparatus.

9. An information processing method according to claim 6, wherein the first information includes information indicating, in the form of a list, the status of the first information processing apparatus and capabilities of the first information processing apparatus, the second information includes information indicating the status of each capability of the first information processing apparatus, and outputting of the first information and outputting of the second information are performed using an instant message presence capability.

10. A first information processing apparatus which communicates via a network with a plurality of other information processing apparatuses registered in advance as information processing apparatuses to communicate with, the first information processing apparatus comprising:

a main processor configured to provide:

a first output unit which outputs first information associated with at least one capability of the first information processing apparatus, to the other information processing apparatuses, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

a registration unit which registers, in response to a request of a second information processing apparatus of the other information processing apparatuses, a capability of the second information processing apparatus in correspondence with an identification of the second information processing apparatus and the at least one capability of the first information processing apparatus, thereby producing registration information, said capability of the second information processing apparatus being associated with the at least one capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard;

a monitoring unit which monitors a state of the at least one capability of the first information processing apparatus, said state indicating an availability of the channel; and a second output unit which outputs, if a change in the state of the at least one capability is detected, in accordance with the registration information, second information indicating a change in the state of the at least one capability of the first information processing apparatus, to the second information processing apparatus, but not outputting the second information to the other information processing apparatuses that are registered in advance as information processing apparatuses to communicate with but do not have a capability associated with the at least one capability registered in the registration information.

11. A first information processing apparatus according to claim 10, further comprising:
a management unit, provided by the main processor, which manages third information output from the second information processing apparatus in relation to corresponding registration information, the third information being associated with the details of the capability of the second information apparatus.

12. A first information processing apparatus according to claim 10, wherein the first output unit outputs the first information to an information managing apparatus which manages the information associated with the other information processing apparatuses and the information associated with the first information processing apparatus, and the second output unit outputs the second information to the information managing apparatus.

13. A first information processing apparatus according to claim 10, wherein the first information includes information indicating, in the form of a list, the status of the first information processing apparatus and capabilities of the first information processing apparatus, the second information includes information indicating the status of each capability of the first information processing apparatus, and outputting of the first information and outputting of the second information are performed using an instant message presence capability.

14. A non-transitory computer readable medium for storing a computer program that includes instructions which when executed on a computer causes the computer to execute a process, the computer being responsible for controlling a first information processing apparatus which communicates via a network with a plurality of other information processing apparatuses registered in advance as information processing apparatuses to communicate with, the process comprising:
outputting first information associated with at least one capability of the first information processing apparatus, to the other information processing apparatuses, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;
requesting, via the network, one or more of the other information processing apparatuses, having an available capability, to register the first information processing apparatus and the at least one capability of the first information processing apparatus in correspondence with an identification of the first information processing apparatus and the capability of the one or more of the other information processing apparatuses, said capability of the one or more of the other information processing apparatuses being associated with the at least one capability of the first information processing apparatus such that if the separate processor on the first information processing apparatus performs one of transmitting and receiving streaming content data for a particular compression standard, the capability of the one or more of the other information processing apparatuses corresponds to a separate processor on the one or more of the other information processing apparatuses, the separate processor on the one or more of the other information processing apparatuses being configured to perform at least the other of transmitting and receiving streaming content data for the particular compression standard;
monitoring a state of the at least one capability of the first information processing apparatus, said state indicating an availability of the channel; and
if a change in the state of the at least one capability is detected, outputting second information indicating a change in the state of the at least one capability of the first information processing apparatus, to the one or more of the other information processing apparatuses to which the registration request is issued in the requesting step, but not outputting the second information to the other information processing apparatuses that are registered in advance as information processing apparatuses to communicate with but did not receive a request in the requesting step.

15. A non-transitory computer readable medium according to claim 14, the process further comprising:
managing third information in relation to the at least one capability of the first information processing apparatus, the third information being associated with the details of the capability of the one or more of the other information processing apparatuses to which the registration request is issued in the requesting step, the third information being output from the one or more of other information processing apparatuses to which the registration request is issued in the requesting step.

16. A non-transitory computer readable medium according to claim 14, wherein in outputting the first information, the first information is output to an information managing apparatus which manages the information associated with the other information processing apparatuses and the information associated with the first information processing apparatus, and in outputting the second information, the second information is output to the information managing apparatus.

17. A non-transitory computer readable medium according to claim 14, wherein the first information includes information indicating the status of the first information processing apparatus, the second information includes information indicating the status of each capability of the first information processing apparatus, and outputting of the first information and outputting of the second information are performed using an instant message presence capability.

18. An information processing method for a first information processing apparatus which communicates via a network with a plurality of other information processing apparatuses registered in advance as information processing apparatuses to communicate with, the method comprising:
outputting first information associated with at least one capability of the first information processing apparatus, to the other information processing apparatuses, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

requesting, via the network, one or more of the other information processing apparatuses, having an available capability, to register the first information processing apparatus and the at least one capability of the first information processing apparatus in correspondence with an identification of the first information processing apparatus and the capability of the one or more of the other information processing apparatuses, said capability of the one or more of the other information processing apparatuses being associated with the at least one capability of the first information processing apparatus such that if the separate processor on the first information processing apparatus performs one of transmitting and receiving streaming content data for a particular compression standard, the capability of the one or more of the other information processing apparatuses corresponds to a separate processor on the one or more of the other information processing apparatuses, the separate processor on the one or more of the other information processing apparatuses being configured to perform at least the other of transmitting and receiving streaming content data for the particular compression standard;

monitoring a state of the at least one capability of the first information processing apparatus, said state indicating an availability of the channel; and if a change in the state of the at least one capability is detected, outputting second information indicating a change in the state of the at least one capability of the first information processing apparatus, to the one or more of the other information processing apparatuses to which the registration request is issued in the requesting step, but not outputting the second information to the other information processing apparatuses that are registered in advance as information processing apparatuses to communicate with but did not receive a request in the requesting step.

19. An information processing method according to claim 18, further comprising:

managing third information in relation to the at least one capability of the first information processing apparatus, the third information being associated with the details of the capability of the one or more of the other information processing apparatuses to which the registration request is issued in the requesting step, the third information being output from the one or more of other information processing apparatuses to which the registration request is issued in the requesting step.

20. An information processing method according to claim 18, wherein in outputting the first information, the first information is output to an information managing apparatus which manages the information associated with the other information processing apparatuses and the information associated with the first information processing apparatus, and in outputting the second information, the second information is output to the information managing apparatus.

21. An information processing method according to claim 18, wherein the first information includes information indicating the status of the first information processing apparatus, the second information includes information indicating the status of each capability of the first information processing apparatus, and outputting of the first information and outputting of the second information are performed using an instant message presence capability.

22. A first information processing apparatus which communicates via a network with a plurality of other information processing apparatuses registered in advance as information processing apparatuses to communicate with, the first information processing apparatus comprising:

a main processor configured to provide:

a first output unit which outputs first information associated with at least one capability of the first information processing apparatus, to the other information processing apparatuses, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

a registration request unit which requests, via the network, one or more of the other information processing apparatuses, having an available capability, to register the first information processing apparatus and the at least one capability of the first information processing apparatus in correspondence with an identification of the first information processing apparatus and the capability of the one or more of the other information processing apparatuses, said capability of the one or more of the other information processing apparatuses being associated with the at least one capability of the first information processing apparatus such that if the separate processor on the first information processing apparatus performs one of transmitting and receiving streaming content data for a particular compression standard, the capability of the one or more of the other information processing apparatuses corresponds to a separate processor on the one or more of the other information processing apparatuses, the separate processor on the one or more of the other information processing apparatuses being configured to perform at least the other of transmitting and receiving streaming content data for the particular compression standard;

a monitoring unit which monitors a state of the capability of the first information processing apparatus, said state indicating an availability of the channel; and a second output unit which outputs, if a change in the state of the at least one capability is detected, second information indicating a change in the state of the at least one capability of the first information processing apparatus, to the one or more of the other information processing apparatuses to which the registration request is issued by the registration request unit, but not outputting the second information to the other information processing apparatuses that are registered in advance as information processing apparatuses to communicate with but did not receive a registration request from the registration request unit.

23. A first information processing apparatus according to claim 22, further comprising:

a management unit, provided by the main processor, which manages third information in relation to the at least one capability of the first information processing apparatus, the third information being associated with the details of the capability of the one or more of the other information processing apparatuses to which the registration request is issued by the registration request unit, the third information being output from the one or more of other information processing apparatuses to which the registration request is issued.

24. A first information processing apparatus according to claim 22, wherein the first output unit outputs the first information to an information managing apparatus which manages the information associated with the other information processing apparatuses and the information associated with the present information processing apparatus, and the second output unit outputs the second information to the information managing apparatus.

25. A first information processing apparatus according to claim 22, wherein the first information includes information indicating the status of the first information processing apparatus, the second information includes information indicating the status of each capability of the first information processing apparatus, and outputting of the first information and outputting of the second information are performed using an instant message presence capability.

26. A non-transitory computer readable medium for storing a computer program that includes instructions which when executed on a computer causes the computer to execute a process, the computer being responsible for controlling a first information processing apparatus which communicates via a network with a plurality of other information processing apparatuses registered in advance as information processing apparatuses to communicate with, the process comprising:

outputting first information associated with capabilities of the first information processing apparatus, to the other information processing apparatuses;

registering, in response to a request from a second information processing apparatus of the other information processing apparatuses, a capability of the second information processing apparatus in correspondence with an identification of the second information processing apparatus and a first capability of the first information processing apparatus, thereby producing registration information, said first capability indicating a presence of a first channel used by the first information processing apparatus to perform at least one of transmitting and receiving streaming content data for a particular compression standard, wherein each separate capability included in the first information corresponds to a separate processor on the first information processing apparatus, each separate processor on the first information processing apparatus being configured to perform one of transmitting and receiving streaming content data for a particular compression standard, said capability of the second information processing apparatus being associated with the first capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard;

monitoring a state of the first capability of the first information processing apparatus, said state of the first capability indicating an availability of the first channel;

if a change in the state of the first capability is detected, outputting, in accordance with the registration information, second information indicating a change in the state of the first capability, to the second information processing apparatus, but not outputting the second information to the other information processing apparatuses that are registered in advance as information processing apparatuses to communicate with but do not have a capability associated with the first capability registered in the registration information;

requesting, via the network, one or more of the other information processing apparatuses, having an available capability, to register the first information processing apparatus and a second capability of the first information processing apparatus in correspondence with an identification of the first information processing apparatus and the capability of the one or more of the other information processing apparatuses, said second capability indicating a presence of a second channel used by the first information processing apparatus to perform at least one of transmitting and receiving streaming content data for a particular compression standard;

monitoring a state of the second capability of the first information processing apparatus, said state of the second capability indicating an availability of the second channel; and if a change in the state of the second capability is detected, outputting third information indicating a change in the state of the second capability, to the one or more of the other information processing apparatuses to which the registration request is issued in the requesting step, but not outputting the third information to the other information processing apparatuses that are registered in advance as information processing apparatuses to communicate with but did not receive a request in the requesting step.

27. A non-transitory computer readable medium according to claim 26, the process further comprising:

managing fourth information output from the second information processing apparatus in relation to corresponding registration information, the fourth information being associated with the details of the capability of the second information processing apparatus registered in the registration step; and managing fifth information in relation to the second capability of the first information processing apparatus, the fifth information being associated with the details of the capability of one or more of the other information processing apparatuses to which the registration request is issued in the requesting step, the fifth information being output from the one or more of other information processing apparatuses to which the registration request is issued in the requesting step.

28. A non-transitory computer readable medium according to claim 26, wherein in outputting the first information, the first information is output to an information managing apparatus which manages the information associated with the other information processing apparatuses and the information associated with the first information processing apparatus, in outputting the second information, the second information is output to the information managing apparatus, and in outputting the third information, the third information is output to the information managing apparatus.

29. A non-transitory computer readable medium according to claim 26, wherein the first information includes information indicating, in the form of a list, the status of the first information processing apparatus and the capabilities of the first information processing apparatus, the second information includes information indicating the status of the first capability of the first information processing apparatus, the third information includes status information indicating the status of the second capability of the first information processing apparatus, and outputting of the first, second, and third information is performed using an instant message presence capability.

30. An information processing method for a first information processing apparatus which communicates via a network with a plurality of other information processing apparatuses registered in advance as information processing apparatuses to communicate with, the method comprising:

outputting first information associated with capabilities of the first information processing apparatus, to the other information processing apparatuses;

registering, in response to a request from a second information processing apparatus of the other information processing apparatuses, a capability of the second information processing apparatus in correspondence with an identification of the second information processing apparatus and a first capability of the first information processing apparatus, thereby producing registration information, said first capability indicating a presence of a first channel used by the first information processing apparatus to perform at least one of transmitting and receiving streaming content data for a particular compression standard, wherein each separate capability included in the first information corresponds to a separate processor on the first information processing apparatus, each separate processor on the first information processing apparatus being configured to perform one of transmitting and receiving streaming content data for a particular compression standard, said capability of the second information processing apparatus being associated with the first capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard;

monitoring a state of the first capability of the first information processing apparatus, said state of the first capability indicating an availability of the first channel;

if a change in the state of the first capability is detected, outputting, in accordance with the registration information, second information indicating a change in the state of the first capability, to the second information processing apparatus, but not outputting the second information to the other information processing apparatuses that are registered in advance as information processing apparatuses to communicate with but do not have a capability associated with the first capability registered in the registration information;

requesting, via the network, one or more of the other information processing apparatuses, having an available capability, to register the first information processing apparatus and a second capability of the first information processing apparatus in correspondence with an identification of the first information processing apparatus and the capability of the one or more of the other information processing apparatuses, said second capability indicating a presence of a second channel used by the first information processing apparatus to perform at least one of transmitting and receiving streaming content data for a particular compression standard;

monitoring a state of the second capability of the first information processing apparatus, said state of the second capability indicating an availability of the second channel; and if a change in the state of the second capability is detected, outputting third information indicating a change in the state of the second capability, to the one or more of the other information processing apparatuses to which the registration request is issued in the registration request step, but not outputting the third information to the other information processing apparatuses that are registered in advance as information processing apparatuses to communicate with but did not receive a request in the requesting step.

31. An information processing method according to claim 30, further comprising:

managing fourth information output from the second information processing apparatus in relation to corresponding registration information, the fourth information being associated with the details of the capability of the second information processing apparatus; and managing fifth information in relation to the second capability of the first information processing apparatus, the fifth information being associated with the details of the capability of one or more of the other information processing apparatuses to which the registration request is issued in the requesting step, the fifth information being output from the one or more of other information processing apparatuses to which the registration request is issued in the requesting step.

32. An information processing method according to claim 30, wherein in outputting the first information, the first information is output to an information managing apparatus which manages the information associated with the other information processing apparatuses and the information associated with the first information processing apparatus, in outputting the second information, the second information is output to the information managing apparatus, and in outputting the third information, the third information is output to the information managing apparatus.

33. An information processing method according to claim 30, wherein the first information includes information indicating, in the form of a list, the status of the first information processing apparatus and the capabilities of the first information processing apparatus, the second information includes information indicating the status of the first capability of the first information processing apparatus, the third information includes status information indicating the status of the second capability of the first information processing apparatus, and outputting of the first, second, and third information is performed using an instant message presence capability.

34. A first information processing apparatus which communicates via a network with a plurality of other information processing apparatuses registered in advance as information processing apparatuses to communicate with, the first information processing apparatus comprising:

a main processor configured to provide:

a first output unit which outputs first information associated with capabilities of the first information processing apparatus, to the other information processing apparatuses;

a registration unit which registers, in response to a request from a second information processing apparatus of the other information processing apparatuses, a capability of the second information processing apparatus in correspondence with an identification of the second information processing apparatus and a first capability of the first information processing apparatus, thereby producing registration information, said first capability indicating a presence of a first channel used by the first information processing apparatus to perform at least one of transmitting and receiving streaming content data for a particular compression standard, wherein each separate capability included in the first information corresponds to a separate processor on the first information processing apparatus, each separate processor on the first information processing apparatus being configured to perform one of transmitting and receiving streaming content data for a particular compression standard, said capability of the second information processing apparatus being associated with the first capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard;

a monitoring unit which monitors a state of the first capability of the first information processing apparatus, said state of the first capability indicating an availability of the first channel;

a second output unit which outputs, if a change in the state of the first capability is detected, in accordance with the registration information, second information indicating a change in the state of the first capability, to the second information processing apparatus, but not outputting the second information to the other information processing apparatuses that are registered in advance as information processing apparatuses to communicate with but do not have a capability associated with the first capability registered in the registration information;

a registration request unit which requests, via the network, one or more of the other information processing apparatuses, having an available capability, to register the first information processing apparatus and a second capability of the first information processing apparatus in correspondence with an identification of the first information processing apparatus and the capability of the one or more of the other information processing apparatuses, said second capability indicating a presence of a second channel used by the first information processing apparatus to perform at least one of transmitting and receiving streaming content data for a particular compression standard;

a second monitoring unit which monitors a state of the second capability of the first information processing apparatus, said state of the second capability indicating an availability of the second channel; and a third output unit which outputs means for outputting third information, if a change in the state of the second capability is detected, indicating a change in the state of the second capability, to the one or more of the other information processing apparatuses to which the registration request is issued, but not outputting the third information to the other information processing apparatuses that are registered in advance as information processing apparatuses to communicate with but did not receive a request from the registration request unit.

35. A first information processing apparatus according to claim 34, further comprising:

a first management unit, provided by the main processor, which manages fourth information output from the second information processing apparatus in relation to corresponding registration information, the fourth information being associated with the details of the capability of the second information processing apparatus registered by the registration unit; and a second management unit, provided by the main processor, which manages fifth information in relation to the second capability of the first information processing apparatus, the fifth information being associated with the details of the capability of the one or more of the other information processing apparatuses to which the registration request is issued by the registration request unit, the fifth information being output from the one or more of other information processing apparatuses to which the registration request is issued.

36. A first information processing apparatus according to claim 34, wherein the first output unit outputs the first information to an information managing apparatus which manages the information associated with the other information processing apparatuses and the information associated with the first information processing apparatus, the second output unit outputs the second information to the information managing apparatus, and the third output unit outputs the third information to the information managing apparatus.

37. A first information processing apparatus according to claim 34, wherein the first information includes information indicating, in the form of a list, the status of the first information processing apparatus and the capabilities of the first information processing apparatus, the second information includes information indicating the status of the first capability of the first information processing apparatus, the third information includes status information indicating the status of the second capability of the first information processing apparatus, and outputting of the first, second, and third information is performed using an instant message presence capability.

38. A non-transitory computer readable medium for storing a computer program that includes instructions which when executed on a computer causes the computer to execute a process, the computer being responsible for controlling an information managing apparatus which manages information transmitted and received via a network among a plurality of information processing apparatuses registered in advance as information processing apparatuses to communicate with, the process comprising:

managing first information supplied from a first information processing apparatus of the information processing apparatuses, the first information being associated with at least one capability of the first information processing apparatus, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

outputting the first information managed in the step of managing the first information, for use by the other information processing apparatuses;

managing second information in which a capability of a second information processing apparatus corresponding to the at least one capability of the first information processing apparatus is requested to be registered with the first information processing apparatus, said capability of the second information processing apparatus being associated with the at least one capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard; and if the first information processing apparatuses detects a change in a state of the at least one capability, said state indicating an availability of the channel corresponding to the at least one capability, outputting third information indicating a monitored change in the state of the at least one capability of the first information processing apparatus, the third information being supplied from the first information processing apparatus to the second information processing apparatus, but the third information is not supplied to other information processing apparatuses that are registered in advance as information processing apparatuses to communicate with the first information processing apparatus but do not have a capability associated with the at least one capability registered in the first information processing apparatus.

39. A non-transitory computer readable medium according to claim 38, wherein the first information includes information indicating, in the form of a list, the status of the first information processing apparatus or capabilities of the first information processing apparatus, the second information includes status information indicating the status of the second information processing apparatus, and outputting of the first information and outputting of the second information are performed using an instant message presence capability.

40. An information processing method for an information managing apparatus which manages information transmitted and received via a network among a plurality of information processing apparatuses registered in advance as information processing apparatuses to communicate with, the method comprising:

managing first information supplied from a first information processing apparatus of the information processing apparatuses, the first information being associated with at least one capability of the first information processing apparatus, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

outputting the first information managed in the step of managing the first information, for use by the other information processing apparatuses;

managing second information in which a capability of a second information processing apparatus corresponding to the at least one capability of the first information processing apparatus is requested to be registered with the first information processing apparatus, said capability of the second information processing apparatus being associated with the at least one capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard; and if the first information processing apparatus detects a change in a state of the at least one capability, said state indicating an availability of a respective channel corresponding to the at least one capability, outputting third information indicating a monitored change in the state of the at least one capability of the first information processing apparatus, the third information being supplied from the first information processing apparatus to the second information processing apparatus, but the third information is not supplied to other information processing apparatuses that are registered in advance as information processing apparatuses to communicate with the first information processing apparatus but do not have a capability associated with the at least one capability registered in the first information processing apparatus.

41. An information processing method according to claim 40, wherein the first information includes information indicating, in the form of a list, the status of the first information processing apparatus or capabilities of the first information processing apparatus, the second information includes status information indicating the status of the second information processing apparatus, and outputting of the first information and outputting of the second information are performed using an instant message presence capability.

42. An information managing apparatus for managing information transmitted and received via a network among a plurality of information processing apparatuses registered in advance as information processing apparatuses to communicate with, comprising:

a main processor configured to provide:

a first management unit which manages first information supplied from a first information processing apparatus of the information processing apparatuses, the first information being associated with at least one capability of the first information processing apparatus, said at least one capability indicating a presence of a channel used by the first information processing apparatus to perform at least one of transmitting and receiving streaming content data for a particular compression standard, wherein each separate capability outputted in the first information corresponds to a separate processor on the first information processing apparatus, each separate processor on the first information processing apparatus being configured to perform one of transmitting and receiving streaming content data for a particular compression standard;

a first output unit which outputs the first information managed by the first management unit, for use by the other information processing apparatuses;

a second management unit which manages second information in which a capability of a second information processing apparatus corresponding to the at least one capability of the first information processing apparatus is requested to be registered with the first information processing apparatus, said capability of the second information processing apparatus being associated with the at least one capability of the first information processing apparatus such that if the separate processor on the first information processing apparatus performs one of transmitting and receiving streaming content data for a particular compression standard, the capability of the second information processing apparatus corresponds to a separate processor on the second information processing apparatus, the separate processor on the second information processing apparatus being configured to perform at least the other of transmitting and receiving streaming content data for the particular compression standard; and second output unit which outputs, if the first information processing apparatus detects a change in a state of the at least one capability, said state indicating an availability of the channel corresponding to the at least one capability, outputting third information indicating a monitored change in the state of the at least one capability of the first information processing apparatus, the third information being supplied from the first information processing apparatus to the second information processing apparatus, but the third information is not supplied to other information processing apparatuses that are registered in advance as information processing apparatuses to communicate with the first information processing apparatus but do not have a capability associated with the at least one capability registered in the first information processing apparatus.

43. An information managing apparatus according to claim 42, wherein the first information includes information indicating, in the form of a list, the status of the first information processing apparatus or capabilities of the first information processing apparatus, the second information includes status information indicating the status of the second information processing apparatus, and outputting of the first information and outputting of the second information are performed using an instant message presence capability.

* * * * *